(12) United States Patent
Busbee et al.

(10) Patent No.: US 11,497,275 B2
(45) Date of Patent: *Nov. 15, 2022

(54) 3D PRINTED ARTICLES OF FOOTWEAR WITH PARTICLES

(71) Applicant: Kornit Digital Technologies Ltd., Rosh HaAyin (IL)

(72) Inventors: Travis Alexander Busbee, Somerville, MA (US); Avin Dhoble, Waltham, MA (US); Noah Tremblay, Pepperell, MA (US); Clara H. Rhee, Somerville, MA (US); Sean Christopher Troiano, Somerville, MA (US)

(73) Assignee: Kornit Digital Technologies Ltd., Rosh HaAyin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/907,100

(22) Filed: Feb. 27, 2018

(65) Prior Publication Data

US 2019/0037969 A1 Feb. 7, 2019

Related U.S. Application Data

(60) Provisional application No. 62/555,930, filed on Sep. 8, 2017, provisional application No. 62/555,930, filed
(Continued)

(51) Int. Cl.
*A43D 8/00* (2006.01)
*A43B 23/02* (2006.01)
(Continued)

(52) U.S. Cl.
CPC ............ *A43B 23/0245* (2013.01); *A43B 1/14* (2013.01); *A43B 13/04* (2013.01);
(Continued)

(58) Field of Classification Search
CPC ..................................................... B33Y 80/10
See application file for complete search history.

(56) References Cited

U.S. PATENT DOCUMENTS 3,053,454 A 9/1962 Waterfill
3,982,663 A 9/1976 Larkin
(Continued)

FOREIGN PATENT DOCUMENTS

CN 1612785 5/2005
CN 101084186 12/2007
(Continued)

OTHER PUBLICATIONS

International Search Report and Written Opinion for PCT/US2018/020000 dated Jul. 6, 2018.
(Continued)

*Primary Examiner* — William P Watkins, III

(57) ABSTRACT

The present invention generally relates to methods of printing articles using three-dimensional printing and other printing techniques, and to articles formed from such techniques, including the printing of articles of footwear containing particles. Certain embodiments are generally directed to composites comprising particles (e.g., reinforcing particles), for example, rubber particles. The particles may be used, for example, to increase slip or abrasion resistance. The composites may also contain polyurethanes or other compounds, e.g., to facilitate fabrication, e.g., using three-dimensional printing and other printing techniques. Other embodiments are directed to methods of making or using such articles. For example, in some embodiments, a composite may be prepared by mixing particles (e.g., reinforcing particles) with at least a first fluid and a second fluid within a nozzle, such as a microfluidic printing nozzle, which may be used to direct the resulting product onto a substrate.

20 Claims, 16 Drawing Sheets

Related U.S. Application Data on Sep. 8, 2017, provisional application No. 62/555,930, filed on Sep. 8, 2017, provisional application No. 62/555,930, filed on Sep. 8, 2017, provisional application No. 62/503,261, filed on May 8, 2017, provisional application No. 62/464,363, filed on Feb. 27, 2017.

(51) Int. Cl.

| | | |
|---|---|---|
| B41J 2/175 | (2006.01) | |
| B05B 13/04 | (2006.01) | |
| B29D 35/12 | (2010.01) | |
| B01F 27/50 | (2022.01) | |
| B01F 27/09 | (2022.01) | |
| B01F 27/117 | (2022.01) | |
| B33Y 10/00 | (2015.01) | |
| B33Y 70/00 | (2020.01) | |
| B33Y 80/00 | (2015.01) | |
| B29C 64/165 | (2017.01) | |
| B29C 64/336 | (2017.01) | |
| A43B 1/14 | (2006.01) | |
| A43B 13/04 | (2006.01) | |
| B29C 64/112 | (2017.01) | |
| B05B 15/55 | (2018.01) | |
| B05B 15/25 | (2018.01) | |
| B05B 7/04 | (2006.01) | |
| B05B 7/06 | (2006.01) | |
| B05B 12/14 | (2006.01) | |
| B33Y 30/00 | (2015.01) | |
| A43B 13/14 | (2006.01) | |
| B29K 75/00 | (2006.01) | |
| B29K 105/04 | (2006.01) | |
| B29L 31/50 | (2006.01) | |

(52) U.S. Cl.
CPC ............ *A43B 23/0215* (2013.01); *A43D 8/00* (2013.01); *B01F 27/092* (2022.01); *B01F 27/117* (2022.01); *B01F 27/50* (2022.01); *B05B 13/0405* (2013.01); *B29C 64/165* (2017.08); *B29C 64/336* (2017.08); *B29D 35/122* (2013.01); *B29D 35/126* (2013.01); *B33Y 10/00* (2014.12); *B33Y 70/00* (2014.12); *B33Y 80/00* (2014.12); *B41J 2/175* (2013.01); *A43B 13/14* (2013.01); *B05B 7/0408* (2013.01); *B05B 7/068* (2013.01); *B05B 12/1418* (2013.01); *B05B 15/25* (2018.02); *B05B 15/55* (2018.02); *B29C 64/112* (2017.08); *B29K 2075/00* (2013.01); *B29K 2105/04* (2013.01); *B29L 2031/50* (2013.01); *B33Y 30/00* (2014.12)

(56) References Cited

U.S. PATENT DOCUMENTS

| | | | |
|---|---|---|---|
| 4,078,576 | A | 3/1978 | Punch et al. |
| 4,708,292 | A | 11/1987 | Gammons |
| 5,335,992 | A | 8/1994 | Holl |
| 5,385,953 | A | 1/1995 | McClellan |
| 5,820,354 | A | 10/1998 | Wild et al. |
| 5,979,787 | A | 11/1999 | Scarpa |
| 6,165,406 | A | 12/2000 | Jang et al. |
| 8,333,330 | B2 | 12/2012 | Schuetze et al. |
| 8,758,263 | B1 | 6/2014 | Rahimian et al. |
| 9,375,051 | B2 | 6/2016 | Doremus et al. |
| 9,421,565 | B2 | 8/2016 | Lewis et al. |
| 9,453,142 | B2 | 9/2016 | Rolland et al. |
| 9,491,987 | B2 | 11/2016 | Antonelli et al. |
| 10,076,876 | B2 | 9/2018 | Mark et al. |
| 10,119,108 | B2 | 11/2018 | Maggiore |
| 10,254,499 | B1 | 4/2019 | Cohen et al. |
| 10,442,910 | B2 | 10/2019 | Baghdadi et al. |
| 10,716,358 | B2 | 7/2020 | Reinhardt et al. |
| 10,806,208 | B2 | 10/2020 | Busgen et al. |
| 10,932,515 | B2 | 3/2021 | Busbee |
| 2004/0126254 | A1 | 7/2004 | Chen et al. |
| 2004/0187714 | A1 | 9/2004 | Napadensky et al. |
| 2004/0253365 | A1 | 12/2004 | Warren et al. |
| 2006/0035034 | A1 | 2/2006 | Matsumoto et al. |
| 2008/0026190 | A1 | 1/2008 | King et al. |
| 2008/0132597 | A1 | 6/2008 | Nozawa et al. |
| 2009/0143765 | A1 | 6/2009 | Slocum et al. |
| 2010/0140852 | A1 | 6/2010 | Kritchman et al. |
| 2011/0189785 | A1 | 8/2011 | Gutmann et al. |
| 2011/0315291 | A1* | 12/2011 | Abad ................ C08L 53/00 152/450 |
| 2013/0320598 | A1 | 12/2013 | Atkins et al. |
| 2014/0020191 | A1 | 1/2014 | Jones et al. |
| 2014/0020192 | A1* | 1/2014 | Jones ................ A43B 13/14 12/146 B |
| 2014/0027952 | A1 | 1/2014 | Fan et al. |
| 2014/0137965 | A1 | 5/2014 | Truitt et al. |
| 2014/0182170 | A1 | 7/2014 | Wawrousek et al. |
| 2015/0142159 | A1 | 5/2015 | Chang |
| 2015/0230562 | A1 | 8/2015 | Jones et al. |
| 2015/0336298 | A1 | 11/2015 | Dean |
| 2015/0352787 | A1 | 12/2015 | Humbert et al. |
| 2016/0021969 | A1 | 1/2016 | Lettow, II et al. |
| 2016/0107396 | A1 | 4/2016 | Berman |
| 2016/0192741 | A1 | 7/2016 | Mark |
| 2016/0205963 | A1 | 7/2016 | Saal et al. |
| 2016/0219982 | A1 | 8/2016 | Waatti |
| 2016/0235158 | A1 | 8/2016 | DesJardins et al. |
| 2016/0299047 | A1 | 10/2016 | Molla et al. |
| 2016/0374428 | A1 | 12/2016 | Kormann et al. |
| 2016/0374431 | A1 | 12/2016 | Tow |
| 2017/0050374 | A1 | 2/2017 | Minardi et al. |
| 2017/0122322 | A1 | 5/2017 | Zinniel et al. |
| 2017/0156444 | A1 | 6/2017 | Guest et al. |
| 2017/0164899 | A1 | 6/2017 | Yang et al. |
| 2017/0203406 | A1 | 7/2017 | Ganapathiappan et al. |
| 2017/0238870 | A1 | 8/2017 | Lee et al. |
| 2017/0251713 | A1 | 9/2017 | Warner et al. |
| 2017/0265582 | A1 | 9/2017 | Walker et al. |
| 2017/0319368 | A1 | 11/2017 | Selner |
| 2018/0029291 | A1 | 2/2018 | Matzner et al. |
| 2018/0133670 | A1 | 5/2018 | Lewis et al. |
| 2018/0353308 | A1* | 12/2018 | Tompkins ............ A61F 2/7812 |
| 2018/0369910 | A1 | 12/2018 | Gunther et al. |
| 2019/0037960 | A1 | 2/2019 | Busbee et al. |
| 2019/0037961 | A1 | 2/2019 | Busbee et al. |
| 2019/0039299 | A1 | 2/2019 | Busbee et al. |
| 2019/0039309 | A1 | 2/2019 | Busbee et al. |
| 2019/0039310 | A1 | 2/2019 | Busbee et al. |
| 2019/0039311 | A1 | 2/2019 | Busbee et al. |
| 2019/0246741 | A1 | 8/2019 | Busbee et al. |
| 2019/0248089 | A1 | 8/2019 | Busbee et al. |
| 2019/0283394 | A1 | 9/2019 | Ashcroft et al. |
| 2019/0322884 | A1 | 10/2019 | Bloomfield et al. |
| 2019/0387839 | A1 | 12/2019 | Dua et al. |
| 2020/0181351 | A1 | 6/2020 | Bailey et al. |
| 2021/0037908 | A1 | 2/2021 | Busbee |
| 2021/0039306 | A1 | 2/2021 | Busbee et al. |
| 2021/0039399 | A1 | 2/2021 | Busbee |
| 2021/0186151 | A1 | 6/2021 | Gross |
| 2021/0321713 | A1 | 10/2021 | Busbee |
| 2022/0000212 | A1 | 1/2022 | Busbee |

FOREIGN PATENT DOCUMENTS

| | | |
|---|---|---|
| CN | 101995479 | 3/2011 |
| CN | 103126182 | 6/2013 |
| CN | 103909655 A | 7/2014 |
| CN | 104191616 A | 12/2014 |
| CN | 104786506 A | 7/2015 |
| CN | 104875389 A | 9/2015 |
| CN | 205058637 U | 3/2016 |
| CN | 105722663 | 6/2016 |

(56) References Cited

FOREIGN PATENT DOCUMENTS

| CN | 205741716 U | 11/2016 |
| CN | 106331236 A | 1/2017 |
| DE | 102015016464 | 6/2017 |
| EP | 1882514 | 1/2008 |
| EP | 2594146 | 5/2013 |
| EP | 2955004 | 12/2015 |
| JP | 03-201809 | 9/1991 |
| JP | 3201809 | 1/2016 |
| JP | 2019-022986 | 2/2019 |
| WO | WO 03/041875 | 5/2003 |
| WO | WO 2012/109612 | 8/2012 |
| WO | WO 2015/112254 | 7/2015 |
| WO | WO 2015/200173 | 12/2015 |
| WO | WO 2016/164562 | 10/2016 |
| WO | WO 2016/191329 A1 | 12/2016 |
| WO | WO 2016/209872 A1 | 12/2016 |
| WO | PCT/US2018/019993 | 6/2018 |
| WO | WO 2018/115874 A1 | 6/2018 |
| WO | PCT/US2018/020000 | 7/2018 |
| WO | WO 2018/157148 | 8/2018 |
| WO | WO 2022/047025 | 3/2022 |

OTHER PUBLICATIONS

International Search Report and Written Opinion for PCT/US2018/019993 dated Jun. 8, 2018.
[No Author Listed], Amtel restructuring—again. Rubber News. Sep. 8, 2009. 4 pages.
Bauman, Surface-modified rubber particles for polyurethanes. Plastic Additives. Polymer Science and Technology Series. 1998;1:584-9.
Piszczyk et al., Polyurethane/ground tire rubber composite foams based on polyglycerol: Processing, mechanical and thermal properties. Journal of Reinforced Plastics and Composites. 2015;10 pages.
Sanjay, Effect of Crumb-Rubber Particle Size on Mechanical Response of Polyurethane Foam Composites. Oklahoma State University Masters Thesis. Jul. 2014. 55 pages.
Shan et al., Study of Flexible Polyurethane Foams Reinforced with Coir Fibres and Tyre Particles. International Journal of Applied Physics and Mathematics. 2012;2(2):123-30.
Subramaniyan et al., Mechanical Behavior of Polyurethane Composite Foams from Kenaf Fiber and Recycled Tire Rubber Particles. Applied Mechanics and Materials. 2013;315:861-6. Epub Apr. 10, 2013.
U.S. Appl. No. 15/907,122, filed Feb. 27, 2018, Busbee et al.
U.S. Appl. No. 15/907,128, filed Feb. 27, 2018, Busbee et al.
U.S. Appl. No. 15/907,160, filed Feb. 27, 2018, Busbee et al.
U.S. Appl. No. 15/907,147, filed Feb. 27, 2018, Busbee et al.
U.S. Appl. No. 15/907,137, filed Feb. 27, 2018, Busbee et al.
U.S. Appl. No. 15/907,085, filed Feb. 27, 2018, Busbee et al.
U.S. Appl. No. 17/003,089, filed Aug. 26, 2020, Busbee.
U.S. Appl. No. 17/003,106, filed Aug. 26, 2020, Busbee.
U.S. Appl. No. 17/003,118, filed Aug. 26, 2020, Busbee.
Final Official Action dated Dec. 2, 2021 From the U.S. Patent and Trademark Office Re. U.S. Appl. No. 15/907,085. (7 Pages).
Final Official Action dated Mar. 7, 2022 from U.S. Patent and Trademark Office Re. U.S. Appl. No. 15/907,128, (21 pages).
International Preliminary Report on Patentability dated Sep. 6, 2019 From the International Bureau of WIPO Re. Application No. PCT/US2018/020000. (12 Pages).
International Search Report and the Written Opinion dated Dec. 5, 2021 From the International Searching Authority Re. Application No. PCT/US2021/047745. (23 Pages).
International Search Report and the Written Opinion dated Dec. 9, 2021 From the International Searching Authority Re. Application No. PCT/US2021/047738. (9 Pages).
Notification of Office Action and Search Report dated Aug. 23, 2021 From the State Intellectual Property Office of the People's Republic of China Re. Application No. 201880027758.0 and Its Translation of Office Action Into English. (42 Pages).
Official Action dated Feb. 19, 2021 from U.S. Patent and Trademark Office Re. U.S. Appl. No. 15/907,085. (9 pages).
Official Action dated Mar. 21, 2022 from U.S. Patent and Trademark Office Re. Application No. 15/907/085. (8 pages).
Restriction Official Action dated May 29, 2020 From the U.S. Patent and Trademark Office Re. U.S. Appl. No. 15/907,085. (7 Pages).
Supplementary European Search Report and the European Search Opinion dated Nov. 19, 2020 From the European Patent Office Re. Application No. 18758170.7. (13 Pages).
Official Action dated Jun. 16, 2022 from U.S. Patent and Trademark Office Re. U.S. Appl. No. 17/003,089. (30 pages).
Official Action dated Feb. 23, 2021 From U.S. Patent and Trademark Office Re. U.S. Appl. No. 15/907,128. (22 Pages).
Official Action dated Sep. 23, 2021 from U.S. Patent and Trademark Office Re. U.S. Appl. No. 15/907,128, (20 pages).
Official Action dated Apr. 30, 2020 from U.S. Patent and Trademark Office Re. U.S. Appl. No. 15/907,128. (16 Pages).
Restriction Official Action dated Feb. 14, 2020 From U.S. Patent and Trademark Office Re. U.S. Appl. No. 15/907,128. (9 Pages).
Official Action dated Apr. 14, 2021 From the U.S. Patent and Trademark Office Re. U.S. Appl. No. 15/907,122. (66 Pages).
Official Action dated Nov. 26, 2021 From the U.S. Patent and Trademark Office Re. U.S. Appl. No. 15/907,122, (66 Pages).
Restriction Official Action dated Oct. 2, 2020 From the U.S. Patent and Trademark Office Re. U.S. Appl. No. 15/907,122. (7 Pages).
Notification of Office Action and Search Report dated Jul. 26, 2022 From the China National Intellectual Property Administration Re. Application No. 201880027758.0 and Its Translation Into English. (27 Pages).

\* cited by examiner

1 – motor
2 – impeller
3 – particles
4 – nozzle
5 – carrier polymer
6 – filler material feed
7 – polymer carrier feed
8 – printed composite

3D PRINTED ARTICLES OF FOOTWEAR WITH PARTICLES

RELATED APPLICATIONS

This application claims priority to U.S. Provisional Application No. 62/555,930, filed Sep. 8, 2017, U.S. Provisional Application No. 62/555,874, filed Sep. 8, 2017, U.S. Provisional Application No. 62/555,941, filed Sep. 8, 2017, U.S. Provisional Application No. 62/555,886, filed Sep. 8, 2017, U.S. Provisional Application No. 62/503,261, filed May 8, 2017 and U.S. Provisional Application No. 62/464,363, filed Feb. 27, 2017, which are incorporated herein by reference in their entirety.

FIELD

The present invention generally relates to methods of printing articles using three-dimensional printing and other printing techniques, and to articles formed from such techniques, including the printing of articles of footwear containing particles.

BACKGROUND

The manufacture of composites may involve the expensive and environmentally hazardous synthesis and incorporation of new materials. In addition, the properties of composites may be difficult to control. Improved methods of manufacture of composites are thus needed.

SUMMARY

The present invention generally relates to methods of printing articles using three-dimensional printing and other printing techniques, and to articles formed from such techniques, including the printing of articles of footwear containing particles. The subject matter of the present invention involves, in some cases, interrelated products, alternative solutions to a particular problem, and/or a plurality of different uses of one or more systems and/or articles.

In one aspect, the present invention is generally directed to an article. In one set of embodiments, the article is a 3D-printed article for use in footwear. In some embodiments, the article includes a 3D-printed article having a gradient in a property between a first portion and a second portion, wherein the 3D-printed article is a single integrated material, and wherein the property is selected from the group consisting of average largest dimension of particles (e.g., reinforcing particles), weight percent of particles (e.g., reinforcing particles), volume percent of particles (e.g., reinforcing particles), compression strength, slip resistance, abrasion resistance, density, stiffness, heat deflection temperature, pore concentration, pore size, and coefficient of thermal expansion.

In some embodiments, the article is an article for use in footwear. In some embodiments, the article includes a 3D-printed composite comprising a plurality of particles (e.g., reinforcing particles) having a largest numerical average dimension of greater than or equal to 10 microns and less than or equal to 400 microns.

In some embodiments, the article comprises a polymeric structure. The article may comprise particles (e.g., reinforcing particles) distributed in the polymeric structure to form a gradient of the weight percent of particles (e.g., reinforcing particles) in the polymeric structure. In some embodiments, a textile is adhered to the polymeric structure.

In some embodiments, the article comprises a polymeric structure and an unexpanded chemical blowing agent in at least a portion of the polymeric structure. In some embodiments, a textile is adhered to at least a portion of the polymeric structure.

In another aspect, the present invention is generally directed to a method. In some cases, the method includes a method for printing an article, e.g., 3D-printing an article. In one set of embodiments, the method includes flowing a first fluid through a first inlet into a nozzle; flowing a second fluid through a second inlet into the nozzle; flowing particles (e.g., reinforcing particles) into the nozzle; mixing the first fluid, the second fluid, and the particles (e.g., reinforcing particles) to form a mixture within the nozzle; and printing the mixture onto a substrate from the nozzle.

The method, in another set of embodiments, includes flowing a fluid into a microfluidic printing nozzle, flowing particles (e.g., reinforcing particles) into the nozzle, mixing the fluid and the particles (e.g., reinforcing particles) within the microfluidic printing nozzle using an impeller to form a mixture, and printing the mixture onto a substrate.

In one set of embodiments, the method includes flowing a first fluid through a first inlet and a second fluid through a second inlet into a microfluidic printing nozzle, where the first fluid comprises a foam precursor and the second fluid comprises a cell-forming agent, homogenously mixing the first fluid and the second fluid to form a mixture, and printing the mixture onto a substrate.

The method, in another set of embodiments, includes flowing a fluid into a microfluidic printing nozzle, mixing the fluid with a gas within the microfluidic printing nozzle using an impeller to form a froth comprising bubbles of the gas dispersed within the fluid, and printing the froth onto a substrate.

In another set of embodiments, the method comprises acts of mixing a first fluid and a second fluid in a mixing chamber to form a foam precursor, flowing the foam precursor and a cell-forming agent into a microfluidic printing nozzle, rotating an impeller within the microfluidic printing nozzle to form a mixture of the foam precursor and the cell-forming agent, and printing the mixture onto a substrate.

The method, in still another set of embodiments, comprises flowing at least two inputs into a mixing nozzle to form a first mixture comprising a blowing agent. The method may further comprise flowing at least two inputs into a mixing nozzle to form a second mixture. A first region comprising the first mixture may be deposited to form a first elastomer. A second region comprising the second mixture may be deposited to form a second elastomer. At least the first region of the article may be heated to a temperature greater than or equal to the activation temperature of the blowing agent. In some embodiments, heating at least the first region of the article causes differential expansion between the first region and the second region of the article and physical deformation of the article.

In another aspect, the present invention is generally directed to a device. In some embodiments, the device is a device for printing, e.g., 3D-printing. According to one set of embodiments, the device comprises a first microfluidic printing nozzle comprising a first mixing chamber and a first impeller disposed therein, a second microfluidic printing nozzle comprising a second mixing chamber and a second impeller disposed therein, the second nozzle further comprising an input in fluid communication with an outlet of the first nozzle, and a controller configured and arranged to independently control rotation of the first impeller and the second impeller.

In another set of embodiments, the device comprises a microfluidic printing nozzle comprising a mixing chamber and an impeller disposed therein, a heat source or a cooling source in thermal communication with the nozzle, and a controller constructed and arranged to control rotation of the impeller.

The device, in yet another set of embodiments, includes a microfluidic printing nozzle comprising a mixing chamber and an impeller disposed therein, and a controller constructed and arranged to laterally move the impeller within the microfluidic printing nozzle.

The nozzle may be controlled, for example, using a computer or other controller, in order to control the deposition of the product onto the substrate. In some cases, gases or other materials may be incorporated into the product within the nozzle, e.g., to form a foam.

Other advantages and novel features of the present invention will become apparent from the following detailed description of various non-limiting embodiments of the invention when considered in conjunction with the accompanying figures.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
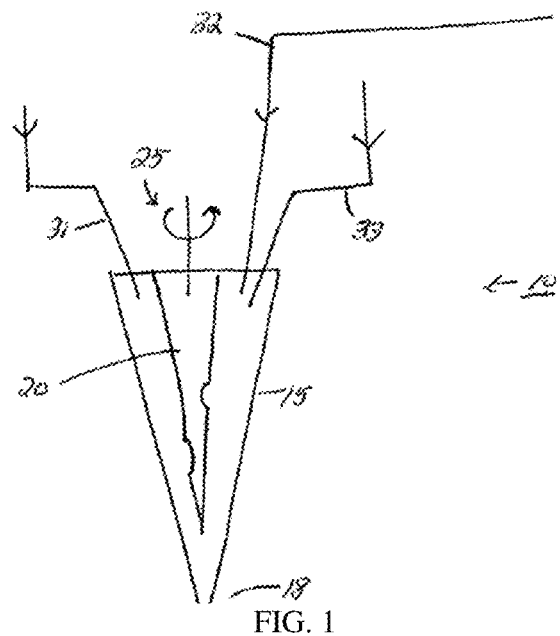
FIG. 1 illustrates a system comprising a nozzle for printing materials, in accordance with one embodiment of the invention.

The present invention generally relates to the printing of materials using three-dimensional printing and other printing techniques, and to articles formed from such techniques. In some embodiments, the articles may be articles for use in footwear. Certain embodiments are generally directed to composites comprising particles (e.g., reinforcing particles), for example, rubber particles. The particles may be used, for example, to increase slip or abrasion resistance. The composites may also contain polyurethanes or other compounds, e.g., to facilitate fabrication, e.g., using three-dimensional printing and other printing techniques. Other embodiments are directed to methods of making or using such articles. For example, in some embodiments, a composite may be prepared by mixing particles (e.g., reinforcing particles) with at least a first fluid and a second fluid within a nozzle, such as a microfluidic printing nozzle, which may be used to direct the resulting product onto a substrate.

In some embodiments, an article that is printed (e.g., 3D-printed) may comprise a composite. In some embodiments, a composite may comprise a matrix and a plurality of particles (e.g., reinforcing particles). The matrix may include materials such as polyurethane or other suitable polymers, which may be used to facilitate manufacturing of articles. Examples of polyurethanes and other suitable polymers include those described in greater detail below. In some embodiments, the composite may comprise a foam, although this is not a requirement in every embodiment. The particles (e.g., reinforcing particles), in some cases, may provide for increased slip resistance, e.g., due to increased friction. In some cases, the particles may provide increased toughness or resistance to abrasion, for example, of a surface. In certain cases, the particles may be used for texture, for example, to produce a coarser or more bumpy surface texture to an article, to produce a certain appearance or "sheen" to the surface of an article, or the like. In some embodiments, the reinforcing particles may comprise rubber. The rubber may arise from any suitable source, and may include virgin and/or recycled rubber. The rubber may be natural rubber and/or synthetically produced rubber. Examples of rubber include, but are not limited to, ground tire rubber, recycled tire rubber, or the like. The rubber forming the particles may comprise a variety of polymers, including but not limited to, natural rubber (e.g., latex rubber), styrene butadiene (SBR), polyacrylics, polyvinyl acetate (PVA), polyvinyl chloride (PVC), polychloroprene (neoprene), polyurethanes, butyl rubbers, or the like. Combinations of these and/or other rubbers may also be used in some cases. It should be noted that in some cases, the exact composition of polymers in rubber particles is unknown. As examples, the rubber may arise from a variety of natural sources (and thus comprise a variety of different polymers), the rubber may have been recycled from different sources (e.g., tires, pencil erasers, balloons, footwear, or the like), etc. For example, in one set of embodiments, recycled rubber from sources such as discarded tires may be formed into particles using techniques such as mechanical grinding, cryogenic grinding, milling, cutting, shredding, screening, etc.

In addition, in other embodiments, other materials may be used for reinforcing particles, e.g., in addition to and/or instead of rubber particles. Non-limiting examples include silica, fumed silica, silicon carbide, titanium dioxide, fibers, carbon, carbon fiber, gypsum, glass fiber, calcium carbonates, nanorods, microrods, carbon fibers, thermoplastics, or the like. In some embodiments, the particles may comprise silicone particles, wax particles, or polytetrafluoroethylene particles, or combinations thereof. In some embodiments, the particles (e.g., reinforcing particles) may comprise a thermoplastic polyurethane that has a blowing agent inside that has yet to be expanded, or an expanded thermoplastic polyurethane. In some embodiments, the particles (e.g., reinforcing particles) comprise a blowing agent that decomposes to gas above an activation temperature. In some embodiments, the particles comprise azodicarbonamide particles, sodium bicarbonate particles, hydrazine particles, toluenesulfonylhydrazine particles, or oxybisbenzenesulfonylhydrazine particles, or combinations thereof. In some embodiments, reinforcing particles may comprise hollow or solid spheres. Such spheres may comprise, as non-limiting examples, glass or polyurethane. For example, the spheres may be hollow elastomer spheres (e.g., hollow polyurethane spheres), and the density of a composite including these spheres may be reduced relative to the density of a substantially similar composite not including these spheres.

Particles (e.g., reinforcing particles) may, in some embodiments, have a largest numerical average dimension of at least 10 microns, at least 20 microns, at least 30 microns, at least 40 microns, at least 50 microns, at least 60 microns, at least 70 microns, at least 80 microns, at least 90 microns, at least 100 microns, at least 150 microns, at least 200 microns, at least 250 microns, at least 300 microns, at least 350 microns, at least 400 microns, at least 500 microns, at least 700 microns, or at least 900 microns. In some embodiments, the particles (e.g., reinforcing particles) may have a largest numerical average dimension of at most 1000 microns, at most 900 microns, at most 700 microns, at most 500 microns, at most 400 microns, at most 350 microns, at most 300 microns, at most 250 microns, at most 200 microns, at most 150 microns, at most 100 microns, at most 90 microns, at most 80 microns, at most 70 microns, at most 60 microns, at most 50 microns, at most 40 microns, at most 30 microns, or at most 20 microns. Combinations of the above-referenced ranges are also possible (e.g., at least 10 microns and at most 1000 microns, or at least 50 microns and at most 400 microns, or at least 50 microns and at most 250 microns). The particles may be spherical and/or non-spherical. In some cases, the particles may be present in a range of sizes and/or shapes (e.g., as in the case of crumb rubber or ground tire rubber).

In some embodiments, the surfaces of the particles (e.g., reinforcing particles) may be functionalized. Functionalization is given its ordinary meaning in the art and may refer to the process of changing the surface chemistry of a material (e.g., particles, e.g., reinforcing particles, e.g., comprising rubber). In some embodiments, functionalization involves covalently and/or non-covalently attaching molecules to the material. In some embodiments, functionalization of the particles (e.g., reinforcing particles) is carried out prior to mixing the particles (e.g., reinforcing particles) with other material(s) (e.g., a first fluid, a first fluid and a second fluid, etc.). This functionalization of particles (e.g., reinforcing particles) may be carried out in order to improve, as non-limiting examples, certain aspects of the process of mixing the particles (e.g., reinforcing particles) with other materials (e.g., fluids), or properties of a three-dimensionally printed composite that results from depositing (e.g., 3D-printing) the resulting mixture onto a substrate and allowing it to solidify.

For example, by functionalizing the particles (e.g., reinforcing particles) prior to introducing the particles into a mixing nozzle, into which one or more other materials (e.g., fluids) are also introduced, the process of mixing the particles (e.g., reinforcing particles) with the one or more materials (e.g., fluids) may be improved by reducing the viscosity of the composition in the mixing nozzle. In this example, the composition in the mixing nozzle comprises the particles (e.g., reinforcing particles) and one or more materials (e.g., fluids). As another non-limiting example, functionalizing the particles (e.g., reinforcing particles) prior to introducing the particles into a mixing nozzle, into which one or more other materials (e.g., fluids) are also introduced, may improve the mechanical properties (e.g., decrease the maximum local stiffness, increase the overall toughness) of a three-dimensionally printed composite that results from depositing (e.g., 3D-printing) the resulting mixture onto a substrate and allowing it to solidify. These mechanical property improvements may be compared to a substantially similar composite comprising non-functionalized particles (e.g., reinforcing particles).

In some embodiments, functionalization of the particles (e.g., reinforcing particles) may improve the properties of the composition in the mixing nozzle and/or of the deposited (e.g., 3D-printed) solidified composite by means of, as a non-limiting example, improving the dispersion (e.g., minimizing aggregation) of the particles (e.g., reinforcing particles) in the matrix (e.g., comprising polyurethane) of the composite. This may be useful, for example, in embodiments in which the particles (e.g., reinforcing particles) are introduced into a mixing nozzle at a high loading relative to the total volume of the composition (e.g., greater than or equal to 50 volume percent of the composition in the mixing nozzle). As a non-limiting example, the surfaces of the particles (e.g., reinforcing particles) may be functionalized with a silane. Non-limiting examples of silanes include (3-aminopropyl)triethoxysilane, 3-glycidyloxy propyltriethoxysilane, 3-glycidyloxy propyltrimethoxysilane, polyether-functional trimethoxysilane, and vinylsilane. Other non-limiting examples of chemical groups with which to functionalize the surfaces of the particles (e.g., reinforcing particles) include alkyl groups, hydroxyl groups, isocyanate groups, amine groups, amide groups, aromatic groups, glycidyl groups, epoxide groups, vinyl groups, acrylate groups, and methacrylate groups. The surfaces of the particles (e.g., reinforcing particles) may be functionalized, as another non-limiting example, to facilitate bonding (e.g., covalently bonding) of the particles to the matrix material, e.g., chemically. This may result, for example, in higher strength and/or abrasion resistance than in a substantially similar composite wherein the particles (e.g., reinforcing particles) are not bound. In some cases, at least 50%, at least 75%, or at least 90% of the surfaces of the particles may be functionalized, e.g., with silanes and/or other functional moieties as discussed herein.

In some embodiments, the incorporation of particles (e.g., reinforcing particles) into a composite may result in a change (e.g., an improvement) in the performance of the composite with respect to one or more properties (e.g., abrasion resistance, slip resistance, or the like). As a non-limiting example, a composite having particles (e.g., reinforcing particles) may have greater abrasion resistance and/or greater slip resistance than a substantially similar composite lacking such particles. As another non-limiting example, a composite may have a lower overall density than a substantially similar composite lacking particles (e.g., reinforcing particles).

In some embodiments, the incorporation of a certain type of particle (e.g., reinforcing particle) into the matrix of the composite may result in a change (e.g., an improvement) in the performance of the composite with respect to one or more properties (e.g., physical properties, environmental sustainability, cost, or the like). In some cases, the use of a filler (e.g., ground tire rubber) may be beneficial in the object of environmental sustainability. As a non-limiting example, less waste may be produced in producing a composite comprising recycled materials, such as ground tire rubber particles.

In addition, certain aspects of the invention are generally directed to methods for printing an article, for example, an article comprising a composite (e.g., a composite comprising particles, e.g., reinforcing particles).

Figure 16:
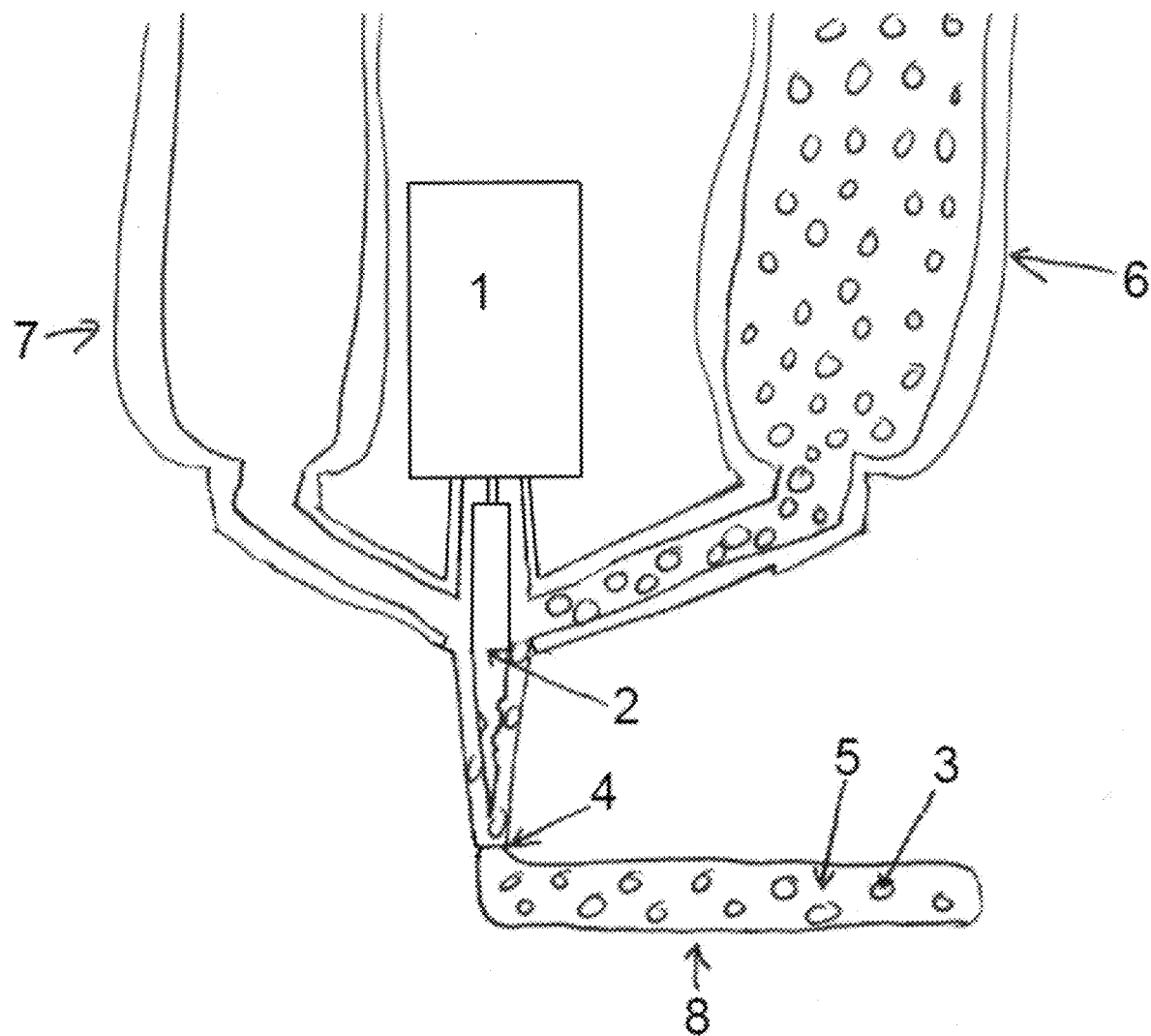
FIG. 16 illustrates a mixing nozzle and associated hardware printing a composite material in accordance with another embodiment of the invention.

In some embodiments, printing an article (e.g., comprising a composite) may include flowing particles (e.g., reinforcing particles, e.g., comprising recycled tire rubber) into a nozzle (see, e.g., FIG. 16). The nozzle may be a microfluidic printing nozzle. In some cases, the particles (e.g., reinforcing particles) flowing into the nozzle are contained within a fluid entering the nozzle. If more than one fluid enters the nozzle, the particles (e.g., reinforcing particles) may be in any one or more of the fluids. The particles (e.g., reinforcing particles) may also enter into a nozzle in some cases through an inlet separate from fluids entering the nozzle, e.g., the particles may enter the nozzle in a dry state in some cases. The particles may be moved through the inlet into the nozzle by, for example, a pumping subsystem (e.g., an auger system). According to some embodiments, printing an article may include mixing the particles (e.g., reinforcing particles) in the nozzle with a fluid or a plurality of fluids within the nozzle, to form a mixture. In some embodiments, the mixture comprises a froth. Examples of nozzles that can be used include those discussed in more detail below. See also U.S. Pat. Apl. Ser. No. 62/464,363, entitled "Techniques and Systems for Three-Dimensional Printing of Foam and Other Materials," filed Feb. 27, 2017, incorporated herein by reference in its entirety.

In some embodiments, the particles (e.g., reinforcing particles) may be present in an article, e.g., after formation, such that the article has a weight percent of particles (e.g., reinforcing particles) of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, or at least 85 wt % with respect to the total weight of the article. In some embodiments, the article has a weight percent of particles (e.g., reinforcing particles) of at most 90 wt %, at most 85 wt %, at most 80 wt %, at most 75 wt %, at most 70 wt %, at most 65 wt %, at most 60 wt %, at most 55 wt %, at most 50 wt %, at most 45 wt %, at most 40 wt %, at most 35 wt %, at most 30 wt %, at most 25 wt %, at most 20 wt %, at most 15 wt %, or at most 10 wt % with respect to the total weight of the article. Combinations of the above-referenced ranges are also possible (e.g., at least 5 wt % and at most 90 wt %).

In some embodiments, the particles (e.g., reinforcing particles) may be present in an article, e.g., after formation, such that the article has a volume percent of particles (e.g., reinforcing particles) of at least 5 vol %, at least 10 vol %, at least 15 vol %, at least 20 vol %, at least 25 vol %, at least 30 vol %, at least 35 vol %, at least 40 vol %, at least 45 vol %, at least 50 vol %, at least 55 vol %, at least 60 vol %, at least 65 vol %, or at least 70 vol % with respect to the total volume of the article. In some embodiments, the article has a volume percent of particles (e.g., reinforcing particles) of at most 74 vol %, at most 70 vol %, at most 65 vol %, at most 60 vol %, at most 55 vol %, at most 50 vol %, at most 45 vol %, at most 40 vol %, at most 35 vol %, at most 30 vol %, at most 25 vol %, at most 20 vol %, at most 15 vol %, or at most 10 vol % with respect to with respect to the total volume of the article. Combinations of the above-referenced ranges are also possible (e.g., at least 5 vol % and at most 74 vol %).

In some embodiments, as discussed in more detail below, printing a mixture onto a substrate may comprise depositing the mixture onto a substrate in a layer. In some embodiments, printing the mixture onto a substrate may comprise depositing the mixture onto a substrate in a plurality of layers. Printing in a plurality of layers may involve depositing the mixture onto a substrate in a first layer (e.g., along a line) and then depositing the mixture onto a substrate in a second layer (e.g., along the same line, in a perpendicular line to that of the first layer, etc.). Printing (e.g., 3D-printing) a plurality of layers may involve depositing a material in a pre-determined shape with a high degree of precision and control, using for example a robotic positioning system coupled with a controller. Those of ordinary skill in the art will be aware of systems and methods for 3D-printing, which typically involves the formation of 3-dimensional shapes, e.g., as opposed to 2-dimensional coatings that take the shape of the surface that they are applied to.

A variety of 3D-printing techniques are known to those of ordinary skill in the art, and include, but are not limited to, additive manufacturing techniques such as direct ink writing (DIW), stereolithography (SL), fused deposition modeling (FDM), laser sintering, laminated object manufacturing (LOM), doctor blading, material spraying, and material jetting. In some embodiments, for example, 3D-printing comprises depositing a first material in a first layer via additive manufacturing, removing at least some material in the first layer via subtractive manufacturing, and after removing the at least some material in the first layer, depositing a second material in the first layer via additive manufacturing. In some embodiments, additive manufacturing comprises at least one member selected from the group consisting of: direct ink writing (DIW), stereolithography (SL), fused deposition modeling (FDM), laser sintering, laminated object manufacturing (LOM), doctor blading, material spraying, and material jetting.

In some embodiments, subtractive manufacturing comprises at least one member selected from the group consisting of: milling, drilling, cutting, etching, grinding, sanding, planing, and turning.

In some embodiments, 3D-printing comprises receiving, by a processing device, a 3D model of an object to be printed; receiving, by the processing device, information including at least one material property of a material to be 3D-printed; and generating, by the processing device, a set of sensor-based printer control parameters to print the object based, at least in part, on the sensor input. In some implementations, the processing device is further adapted to execute instructions for initiating 3D-printing of the object in the 3D-printer; receiving, during 3D-printing, the input from the sensor associated with the 3D-printing; and adjusting at least one printing property based on the sensor input. In some variations, the sensor is a force probe, a weight sensor, an optical camera, an imaging device, an in-line imaging device, a profilometer, a laser measurement device, a 3D scanner, or an automatic digital multimeter.

In another non-limiting implementation, 3D-printing includes obtaining model data representing a 3D model of an object. This implementation also includes processing the model data to generate a set of commands to direct a 3D-printer to extrude a material to form a physical model associated with the object. The set of commands is executable to cause an extruder (e.g., comprising a mixing nozzle) of the 3D printer to deposit a first portion of the material corresponding to a first portion of the physical model, to clean, to purge, or to clean and purge the extruder after depositing the first portion of the material, and to deposit a second portion of the material after cleaning the extruder. The second portion of the material corresponds to a second portion of the physical model.

In certain embodiments, a printed article (e.g., a 3D-printed article comprising a composite) may have a smallest dimension of greater than 10 mm, greater than 12 mm, greater than 14 mm, greater than 16 mm, greater than 18 mm, or greater than 20 mm.

In certain embodiments, a printed article (e.g., a 3D-printed article comprising a composite) may have an average largest dimension of particles (e.g., reinforcing particles) of at least 10 microns, at least 20 microns, at least 30 microns, at least 40 microns, at least 50 microns, at least 60 microns, at least 70 microns, at least 80 microns, at least 90 microns, at least 100 microns, at least 150 microns, at least 200 microns, at least 250 microns, at least 300 microns, at least 350 microns, at least 400 microns, at least 500 microns, at least 700 microns, or at least 900 microns. In some embodiments, the printed article may have an average largest dimension of particles (e.g., reinforcing particles) of at most 1000 microns, at most 900 microns, at most 700 microns, at most 500 microns, at most 400 microns, at most 350 microns, at most 300 microns, at most 250 microns, at most 200 microns, at most 150 microns, at most 100 microns, at most 90 microns, at most 80 microns, at most 70 microns, at most 60 microns, at most 50 microns, at most 40 microns, at most 30 microns, or at most 20 microns. Combinations of the above-referenced ranges are also possible (e.g., at least 10 microns and at most 1000 microns, or at least 50 microns and at most 400 microns, or at least 50 microns and at most 250 microns).

In certain embodiments, a printed article (e.g., a 3D-printed article comprising a composite) may have a compression strength of at least 0.1 MPa, at least 0.5 MPa, at least 1 MPa, at least 5 MPa, at least 10 MPa, at least 20 MPa, at least 40 MPa, at least 80 MPa, at least 100 MPa, at least 200 MPa, at least 300 MPa, or at least 400 MPa. In some embodiments, a printed article may have a compression strength of at most 500 MPa, at most 400 MPa, at most 300 MPa, at most 200 MPa, at most 100 MPa, at most 80 MPa, at most 40 MPa, at most 20 MPa, at most 10 MPa, at most 5 MPa, at most 1 MPa, or at most 0.5 MPa. Combinations of the above-referenced ranges are also possible (e.g., at least 0.1 MPa and at most 500 MPa).

In some embodiments, an article comprising a composite that is printed (e.g., 3D-printed) may comprise two or more portions, wherein one or more properties (e.g., average largest dimension of particles (e.g., reinforcing particles), average concentration of particles (e.g., reinforcing particles) e.g. weight percent of particles (e.g., reinforcing particles), surface roughness, compression strength, slip resistance, abrasion resistance, density, stiffness, heat deflection temperature, pore concentration, pore size, and coefficient of thermal expansion) of a first portion may differ from one or more properties of a second portion. In some embodiments, the difference in properties between the first portion and the second portion may comprise a gradient of the one or more properties (e.g., the property or properties may vary relatively smoothly from a first value in the first portion to a second value in the second portion). In other embodiments, there may be a sharp change in one or more of the properties at a boundary of one or more of the first portion and the second portion. In some embodiments, the article may be adhered to a textile. In some embodiments, the article may comprise a polymer. In some embodiments, the article may be a component of a shoe upper. Examples of methods of producing such particles, e.g., having differences between a first portion and a second portion, are discussed in more detail below.

In some embodiments, a method of printing an article may comprise flowing at least two inputs into a mixing nozzle to form a first mixture comprising a blowing agent. In some embodiments, one of the at least two inputs to form the first mixture comprises an isocyanate and another of the at least two inputs to form the first mixture comprises a polyol system containing the blowing agent. In some embodiments, the method further comprising flowing at least a third input comprising a polyol system into the mixing nozzle to form the first mixture. In some embodiments, the method may comprise depositing a first region comprising the first mixture to form a first elastomer.

In some embodiments, the method may comprise flowing at least two inputs into a mixing nozzle to form a second mixture. In some embodiments, one of the at least two inputs to form the second mixture comprises an isocyanate and another of the at least two inputs to form the second mixture comprises a polyol system. In some embodiments, the second mixture comprises a blowing agent. In some embodiments, the method further comprises flowing at least a third input comprising a polyol system containing a blowing agent into the mixing nozzle to form the second mixture. In some embodiments, the method may comprise depositing a second region adjacent to the first region, comprising the second mixture to form a second elastomer.

In some embodiments, the method may comprise heating at least the first region of the article (e.g., at least the first region and the second region of the article) to a temperature greater than or equal to the activation temperature of the blowing agent. In some embodiments, heating at least the first region of the article causes differential expansion between the first region and the second region of the article and physical deformation of the article.

In some embodiments, as a non-limiting example, input Part A may comprise isocyanate, input Part B' may comprise a polyol system, and input Part B" may comprise a polyol system with a blowing agent. When Part A and Part B' are mixed, an elastomer. When Part A and Part B" are mixed, an elastomer that will expand when activated results. When Part A is mixed with Part B' and Part B", an elastomer that will expand to a lesser extent than pure Part A with pure Part B" (e.g., when in the same ratio as Part A to Part B' and Part B" combined) results. If a fourth input were added, then stiffness as well as expansion on activation could be controlled.

In certain embodiments, a printed article (e.g., a 3D-printed article) that comprises at least two portions, at least one of which comprises a composite (e.g., a printed article that comprises at least a first portion comprising an elastomer and a second portion comprising a elastomer containing a blowing agent) may have a ratio of a property (e.g., average largest dimension of particles (e.g., reinforcing particles), average concentration of particles (e.g., reinforcing particles), surface roughness, compression strength, slip resistance, abrasion resistance, density, stiffness, heat deflection temperature, pore concentration, pore size, and/or coefficient of thermal expansion) of the second portion of the printed article to the same property of the first portion of the printed article of greater than or equal to 1.05, greater than or equal to 1.1, greater than or equal to 1.2, greater than or equal to 1.3, greater than or equal to 1.5, greater than or equal to 2, or greater than or equal to 5. In some embodiments, a ratio of the property of the second portion of the printed article to the same property of the first portion of the printed article may be less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 10).

In some embodiments, the gradient in a property (e.g., volume percent of particles, e.g., reinforcing particles) in the article may be present from the surface of the article to greater than or equal to 10 microns, greater than or equal to 20 microns, greater than or equal to 30 microns greater than or equal to 50 microns, greater than or equal to 100 microns, greater than or equal to 500 microns, greater than or equal to 1000 microns, or greater than or equal to 10000 microns below the surface of the article. In some embodiments, the gradient in the property may be present throughout the thickness of the article.

If two portions having different properties are present, the portions may differ for a variety of reasons, for example, different particle compositions, different particle shapes, different particle sizes, different densities of particles, or the like. Combinations of any of these are also possible. As a non-limiting example, if two average particle sizes are present, then each of the average particle sizes may independently be those described herein. In certain embodiments, as another example, a printed article (e.g., a 3D-printed article) that comprises at least two portions comprising particles (e.g., reinforcing particles) may have a ratio of the average largest dimension of particles (e.g., reinforcing particles) in a first portion of the printed article to the average largest dimension of particles (e.g., reinforcing particles) in a second portion of the printed article of greater than or equal to 1.05, greater than or equal to 1.1, greater than or equal to 1.2, greater than or equal to 1.3, greater than or equal to 1.5, greater than or equal to 2, or greater than or equal to 5. In some embodiments, a ratio of the average largest dimension of particles (e.g., reinforcing particles) in the second portion of the printed article to the average largest dimension of particles (e.g., reinforcing particles) in the first portion of the printed article may be less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 10).

In certain embodiments, a printed article (e.g., a 3D-printed article) that comprises at least one portion comprising a composite (e.g., a printed article that comprises at least a first portion comprising a composite) may have a weight percent of particles (e.g., reinforcing particles) in the first portion of the printed article of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, or at least 85 wt % with respect to the total weight of the article. In some embodiments, the first portion of the printed article has a weight percent of particles (e.g., reinforcing particles) of at most 90 wt %, at most 85 wt %, at most 80 wt %, at most 75 wt %, at most 70 wt %, at most 65 wt %, at most 60 wt %, at most 55 wt %, at most 50 wt %, at most 45 wt %, at most 40 wt %, at most 35 wt %, at most 30 wt %, at most 25 wt %, at most 20 wt %, at most 15 wt %, or at most 10 wt % with respect to the total weight of the article. Combinations of the above-referenced ranges are also possible (e.g., at least 5 wt % and at most 90 wt %).

In certain embodiments, a printed article (e.g., a 3D-printed article) that comprises at least two portions comprising a composite (e.g., a printed article that comprises at least a first portion comprising a composite and a second portion comprising a composite) may have a weight percent of particles (e.g., reinforcing particles) in the first portion of the printed article of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, or at least 85 wt % with respect to the total weight of the article. In some embodiments, the second portion of the printed article has a weight percent of particles (e.g., reinforcing particles) of at most 90 wt %, at most 85 wt %, at most 80 wt %, at most 75 wt %, at most 70 wt %, at most 65 wt %, at most 60 wt %, at most 55 wt %, at most 50 wt %, at most 45 wt %, at most 40 wt %, at most 35 wt %, at most 30 wt %, at most 25 wt %, at most 20 wt %, at most 15 wt %, or at most 10 wt % with respect to the total weight of the article. Combinations of the above-referenced ranges are also possible (e.g., at least 5 wt % and at most 90 wt %).

In certain embodiments, a printed article (e.g., a 3D-printed article) that comprises at least two portions comprising a composite (e.g., a printed article that comprises at least a first portion comprising a composite and a second portion comprising a composite) may have a ratio of the weight percent of particles (e.g., reinforcing particles) in the second portion of the printed article to the weight percent of particles (e.g., reinforcing particles) in the first portion of the printed article of greater than or equal to 1.05, greater than or equal to 1.1, greater than or equal to 1.2, greater than or equal to 1.3, greater than or equal to 1.5, greater than or equal to 2, or greater than or equal to 5. In some embodiments, a ratio of the weight percent of particles (e.g., reinforcing particles) in the second portion of the printed article to the weight percent of particles (e.g., reinforcing particles) in the first portion of the printed article may be less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 10). In certain embodiments, a printed article (e.g., a 3D-printed article) that comprises at least one portion comprising a composite (e.g., a printed article that comprises at least a first portion comprising a composite) may have a compression strength in the first portion of the printed article of at least 0.1 MPa, at least 0.5 MPa, at least 1 MPa, at least 5 MPa, at least 10 MPa, at least 20 MPa, at least 40 MPa, at least 80 MPa, at least 100 MPa, at least 200 MPa, at least 300 MPa, or at least 400 MPa. In some embodiments, the first portion of the printed article may have a compression strength of at most 500 MPa, at most 400 MPa, at most 300 MPa, at most 200 MPa, at most 100 MPa, at most 80 MPa, at most 40 MPa, at most 20 MPa, at most 10 MPa, at most 5 MPa, at most 1 MPa, or at most 0.5 MPa. Combinations of the above-referenced ranges are also possible (e.g., at least 0.1 MPa and at most 500 MPa).

In certain embodiments, a printed article (e.g., a 3D-printed article) that comprises at least two portions comprising a composite (e.g., a printed article that comprises at least a first portion comprising a composite and a second portion comprising a composite) may have a compression strength in the second portion of the printed article of at least 0.1 MPa, at least 0.5 MPa, at least 1 MPa, at least 5 MPa, at least 10 MPa, at least 20 MPa, at least 40 MPa, at least 80 MPa, at least 100 MPa, at least 200 MPa, at least 300 MPa, or at least 400 MPa. In some embodiments, the second portion of the printed article may have a compression strength of at most 500 MPa, at most 400 MPa, at most 300 MPa, at most 200 MPa, at most 100 MPa, at most 80 MPa, at most 40 MPa, at most 20 MPa, at most 10 MPa, at most 5 MPa, at most 1 MPa, or at most 0.5 MPa. Combinations of the above-referenced ranges are also possible (e.g., at least 0.1 MPa and at most 500 MPa).

In certain embodiments, a printed article (e.g., a 3D-printed article) that comprises at least two portions comprising a composite (e.g., a printed article that comprises at least a first portion comprising a composite and a second portion comprising a composite) may have a ratio of compression strength in the second portion of the printed article to compression strength in the first portion of the printed article of greater than or equal to 1.05, greater than or equal to 1.1, greater than or equal to 1.2, greater than or equal to 1.3, greater than or equal to 1.5, greater than or equal to 2, or greater than or equal to 5. In some embodiments, a ratio of compression strength in the second portion of the printed article to compression strength in the first portion of the printed article may be less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 10).

In certain embodiments, a printed article (e.g., a 3D-printed article) that comprises at least two portions comprising a composite (e.g., a printed article that comprises at least a first portion comprising a composite and a second portion comprising a composite) may have a ratio of slip resistance in the second portion of the printed article to slip resistance in the first portion of the printed article of greater than or equal to 1.05, greater than or equal to 1.1, greater than or equal to 1.2, greater than or equal to 1.3, greater than or equal to 1.5, greater than or equal to 2, or greater than or equal to 5. In some embodiments, a ratio of slip resistance in the second portion of the printed article to slip resistance in the first portion of the printed article may be less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 10).

In certain embodiments, a printed article (e.g., a 3D-printed article) that comprises at least two portions comprising a composite (e.g., a printed article that comprises at least a first portion comprising a composite and a second portion comprising a composite) may have a ratio of abrasion resistance in the second portion of the printed article to abrasion resistance in the first portion of the printed article of greater than or equal to 1.05, greater than or equal to 1.1, greater than or equal to 1.2, greater than or equal to 1.3, greater than or equal to 1.5, greater than or equal to 2, or greater than or equal to 5. In some embodiments, a ratio of abrasion resistance in the second portion of the printed article to abrasion resistance in the first portion of the printed article may be less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 10).

In some embodiments, the particles (e.g., reinforcing particles) may be incorporated in order to modify the finish of the printed article. The term finish is given its ordinary meaning in the art and may refer to the appearance experienced by the viewer. As non-limiting examples, the finish may be characterized as shiny or matte.

In some embodiments, the particles (e.g., reinforcing particles) may comprise a blowing agent, e.g., solid particles that decompose, above a certain activation temperature, into a gas. In some embodiments, the activation temperature of the blowing agent may be greater than the curing (e.g., the maximum temperature in the curing profile) of the matrix of the printed article by e.g. at least 2 degrees Celsius, at least 5 degrees Celsius, at least 10 degrees Celsius, at least 20 degrees Celsius, at least 30 degrees Celsius, or at least 50 degrees Celsius. In some embodiments, the activation temperature of the blowing agent may be less than or equal to the curing temperature of the matrix of the printed article by e.g. at least 2 degrees Celsius, at least 5 degrees Celsius, at least 10 degrees Celsius, at least 20 degrees Celsius, at least 30 degrees Celsius, or at least 50 degrees Celsius. The term activation temperature is given its ordinary meaning in the art and may refer to the temperature at or above which a blowing agent comprising solid particles decomposes into a gas. The term curing temperature is given its ordinary meaning in the art and may refer to the temperature at or above which the matrix of the printed article (e.g., comprising polyurethane) solidifies by e.g. crosslinking.

In some embodiments, the blowing agent may be incorporated into the printed article by introducing a fluid comprising a blowing agent concentrate as one of the inputs of a mixing nozzle (e.g., a microfluidic printing nozzle) system with a plurality of inputs. In some embodiments, the blowing agent concentrate may be made to flow into the mixing nozzle at a constant rate, such that the volume fraction of solid particles comprising blowing agent in the matrix of the printed article is constant throughout the printed object. In some embodiments, the blowing agent concentrate may be made to flow into the mixing nozzle at a varying rate, such that the volume fraction of solid particles comprising blowing agent in the matrix of the printed article varies throughout the printed object.

In some embodiments, the blowing agent concentrate is made to flow into the mixing nozzle at a varying rate as dictated by a computer. In some embodiments, the blowing agent concentrate is digitally made to flow into the mixing nozzle at a varying rate, such that a greater volume fraction of blowing agent is incorporated into at least a first portion of the printed article where shrinkage of the matrix during curing is predicted and/or known to cause warping of the printed article, and a smaller volume fraction of blowing agent is incorporated into at least a second portion of the printed article where shrinkage of the matrix during curing is predicted and/or known not to cause warping of the printed article.

In some embodiments, in the case where shrinkage of the matrix during curing is known to cause warping of at least a first portion of a printed article, measurement of the extent of warping of at least a first portion of a first printed article, in which the first printed article is printed and cured without the activation of a blowing agent, maybe conducted to determine the locations of warping. These determined locations of warping can be used to design the incorporation of varying volume fractions of blowing agent in at least a first portion and a second portion of a second printed article, in which a greater volume fraction of blowing agent is incorporated in at least the first portion of the second printed article to reduce warping (e.g., resulting from shrinkage during curing of the matrix) by means of volumetrically expanding at least the first portion of the second printed article by heating at least the first portion of the second printed article above the activation temperature of the blowing agent. The measurement of the extent of warping of the first printed article at locations throughout the first printed article may in some embodiments, as a non-limiting example, be accomplished by the inclusion of markings in the first printed article and then video-tracking of the change in position of these markings with curing.

In some embodiments, the matrix may shrink during curing by at least about 0.5% by volume, at least about 1% by volume, at least about 2% by volume, at least about 3% by volume, at least about 4% by volume, at least about 5% by volume, at least about 10% by volume, at least about 15% by volume, at least about 20% by volume, at least about 30% by volume, or at least about 40% by volume. In some embodiments, the matrix may shrink during curing by at most about 50% by volume, at most about 40% by volume, at most about 30% by volume, at most about 20% by volume, at most about 15% by volume, at most about 10% by volume, at most about 5% by volume, most about 4% by volume, at most about 3% by volume, or at most about 2% by volume.

In some embodiments, heating at least a first portion of a printed article, comprising the blowing agent, at or above the activation temperature of the blowing agent causes a volumetric expansion of the printed article. In some embodiments, the at least a first portion of the printed article may volumetrically expand (e.g., upon heating at or above the blowing agent activation temperature) by at least about 1% by volume, at least about 2% by volume, at least about 3% by volume, at least about 4% by volume, at least about 5% by volume, at least about 10% by volume, at least about 15% by volume, at least about 20% by volume, at least about 30% by volume, or at least about 40% by volume. In some embodiments, the at least a first portion of the printed article may volumetrically expand (e.g., upon heating at or above the blowing agent activation temperature) by at most about 50% by volume, at most about 40% by volume, at most about 30% by volume, at most about 20% by volume, at most about 15% by volume, at most about 10% by volume, at most about 5% by volume, most about 4% by volume, at most about 3% by volume, or at most about 2% by volume.

In some embodiments, the blowing agent incorporated into at least a first portion of a printed article may be present in a volume fraction such that the volumetric expansion provided by the blowing agent is within about 50%, within about 40%, within about 30%, within about 20%, within about 10%, within about 5%, within about 2%, within about 1%, or within about 0.5% of the volumetric shrinkage provided by the curing of the matrix.

Figure 19:
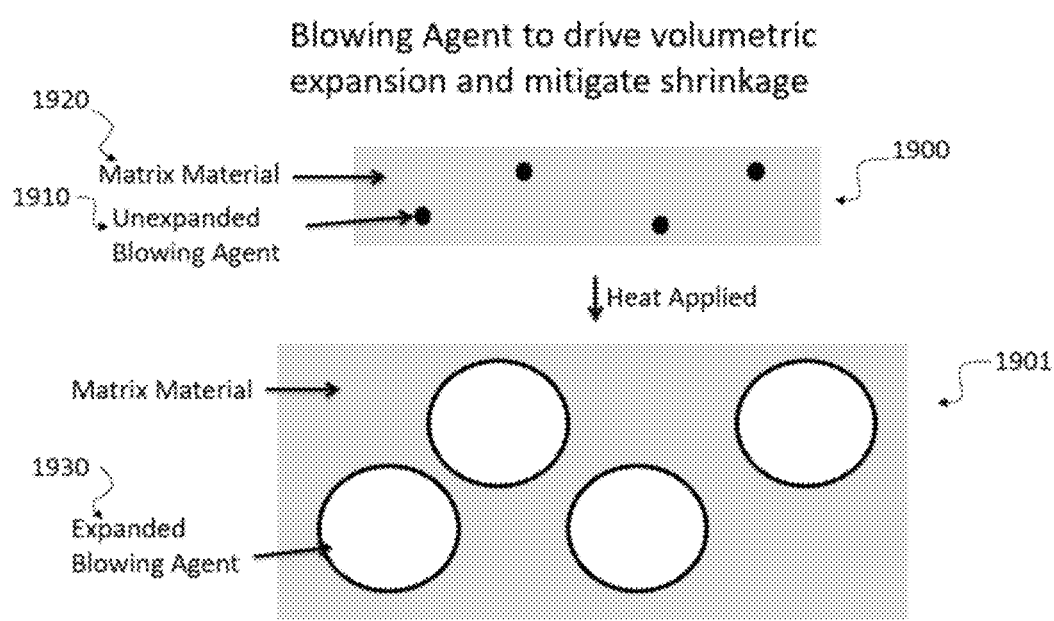
FIG. 19 illustrates a non-limiting schematic diagram of a printed article comprising a blowing agent dispersed throughout the printed article with global blowing agent activation and volumetric expansion of the printed article, in certain embodiments of the invention.

In a non-limiting set of embodiments, the printed article (FIG. 19, initial printed article 1900) may initially comprise unexpanded blowing agent (FIG. 19, 1910) prior to heating the printed article, in which unexpanded blowing agent is homogeneously distributed throughout the matrix (FIG. 19, 1920) of the printed article. In this non-limiting set of embodiments, heat is applied throughout the printed article such that the resulting printed article (FIG. 19, 1901) comprises expanded blowing agent (FIG. 19, 1930), resulting in a volumetrically expanded printed article.

A non-limiting set of methods of making article 1900 (FIG. 19) may comprise depositing (e.g., by extrusion through a nozzle) at least a first layer comprising both matrix and blowing agent in a volume percentage as described herein. A non-limiting set of methods of making article 1901 (FIG. 19) may comprise at least one method of the non-limiting set of methods of making article 1900 followed by applying heat to the entirety of the printed article at or above the activation temperature of the blowing agent and the curing temperature of the matrix for a duration such that the matrix solidifies and the blowing agent expands to form article 1901.

In some embodiments, the volume fraction of solid blowing agent in the printed article may be at least about 0.01 volume percent, at least about 0.1 volume percent, at least about 1 volume percent, at least about 5 volume percent, at least about 10 volume percent, at least about 20 volume percent, at least about 30 volume percent, or at least about 40 volume percent. In some embodiments, the volume fraction of solid blowing agent in the printed article may be at most about 50 volume percent, at most about 40 volume percent, at most about 30 volume percent, at most about 20 volume percent, at most about 10 volume present, at most about 5 volume percent, at most about 1 volume percent, or at most about 0.1 volume percent.

In some embodiments, solid particles of blowing agent may be incorporated into the entire printed article such that the solid particles are homogeneously dispersed in the matrix at a constant volume fraction.

In some embodiments, the surface of the printed article may be exposed to a temperature at or above both the curing temperature of the matrix and the activation temperature of the blowing agent for a brief period of time, such that only the blowing agent at the surface of the printed article is activated. In some embodiments, such treatment of the printed article results in a surface with a matte finish. In some embodiments, the surface of the printed article may be exposed to a temperature above both the curing temperature of the matrix and the activation temperature of the blowing agent by at least about 0 degrees Celsius, at least about 1 degree Celsius, at least about 2 degrees Celsius, at least about 5 degrees Celsius, at least about 10 degrees Celsius, at least about 15 degrees Celsius, at least about 20 degrees Celsius, at least about 25 degrees Celsius, at least about 30 degrees Celsius, at least about 40 degrees Celsius, or at least about 50 degrees Celsius. In some embodiments, the surface of the printed article may be exposed to a temperature above both the curing temperature of the matrix and the activation temperature of the blowing agent by at most about 60 degrees Celsius, at most about 50 degrees Celsius, at most about 40 degrees Celsius, at most about 30 degrees Celsius, and most about 25 degrees Celsius, at most about 20 degrees Celsius, at most about 15 degrees Celsius, at most about 10 degrees Celsius, at most about 5 degrees Celsius, at most about 2 degrees Celsius, or at most about 1 degree Celsius.

In some embodiments, the surface of the printed article may be exposed to a temperature at or above both the curing temperature of the matrix and the activation temperature of the blowing agent for less than or equal to about 300 seconds, less than or equal to about 240 seconds, less than or equal to about 180 seconds, less than or equal to about 120 seconds, less than or equal to about 60 seconds, less than or equal to about 30 seconds, less than or equal to about 20 seconds, less than or equal to about 10 seconds, less than or equal to about 5 seconds, less than or equal to about 2 seconds, or less than or equal to about 1 second.

In some embodiments, a concentrated hot air nozzle maybe used to locally expose the surface of at least a first portion of a printed article to a temperature at or above both the curing temperature of the matrix and the activation temperature of the blowing agent. In some embodiments, the at least a first portion that was locally exposed with a concentrated hot air nozzle has a matte finish.

Figure 17:
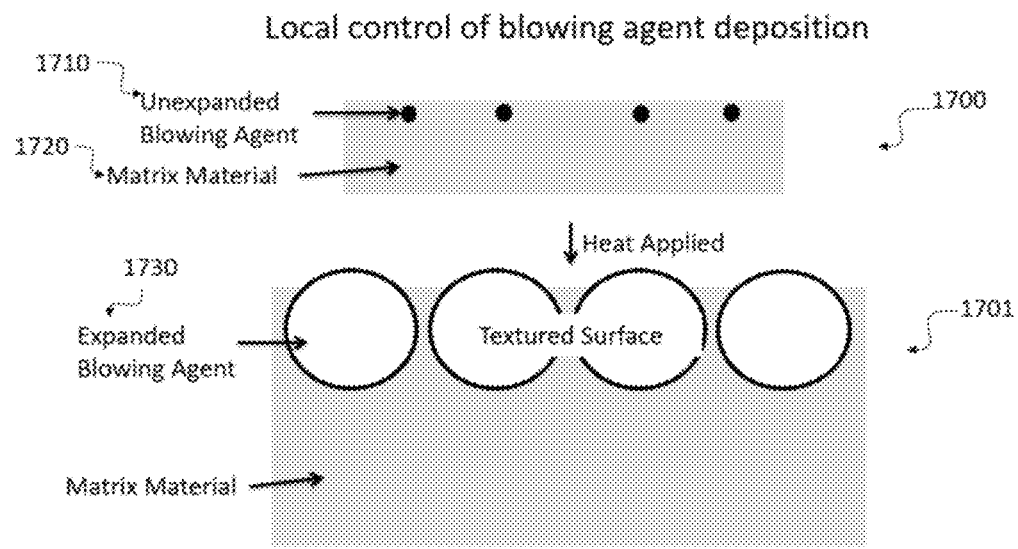
FIG. 17 illustrates a non-limiting schematic diagram of a printed article comprising a blowing agent in the surface layer, according to certain embodiments of the invention.

In some embodiments, the particles (e.g., reinforcing particles) may comprise solid particles comprising a blowing agent that may be incorporated into at least a first portion of the printed article. In some embodiments, the solid particles comprising a blowing agent may be incorporated into the printed article in a gradient. In some embodiments, at least a second portion of the printed article is free of solid particles comprising a blowing agent. In a non-limiting set of embodiments, the surface layer of the printed article (FIG. 17, initial printed article 1700) may initially comprise unexpanded blowing agent (FIG. 17, 1710) prior to heating the printed article, and the remainder of the printed article that is not the surface layer may be free of unexpanded blowing agent and comprise the matrix (FIG. 17, 1720). In this non-limiting set of embodiments, heat is applied to the surface of the printed article or to the entire printed article such that the resulting printed article (FIG. 17, 1701) has a surface layer comprising expanded blowing agent (FIG. 17, 1730), resulting in a textured surface that may have a matte finish.

A non-limiting set of methods of making article 1700 (FIG. 17) may comprise depositing (e.g., by extrusion through a nozzle) at least a first layer comprising matrix and free of blowing agent, followed by depositing at least a first surface layer comprising both matrix and blowing agent in a volume percentage as described herein. A non-limiting set of methods of making article 1701 (FIG. 17) may comprise at least one method of the non-limiting set of methods of making article 1700 followed by applying heat to the surface layer or the entirety of the printed article at or above both the curing temperature of the matrix and the activation temperature of the blowing agent for a duration such that the matrix solidifies and the blowing agent expands to form article 1701.

In some embodiments, local activation of the blowing agent may be accomplished by local application of heat to at least a first portion of the printed article in which the blowing agent has been incorporated (e.g., by flowing through a mixing nozzle). In some embodiments, a printed article that has been cured may comprise bubbles (e.g., that have been formed from the activation of the blowing agent) and may additionally comprise solid particles comprising a blowing agent that were intentionally left not activated. In this case, in some embodiments, the entire printed article was heated at or above the curing temperature of the matrix, and at least a first portion of the printed article was heated at or above the activation temperature of the blowing agent. In some embodiments, at least a second portion of the printed article was heated at or above the activation temperature of the blowing agent, in which case, e.g., the solid particles comprising a blowing agent remaining as solid particles had an activation temperature above the curing temperature of the matrix.

Figure 18:
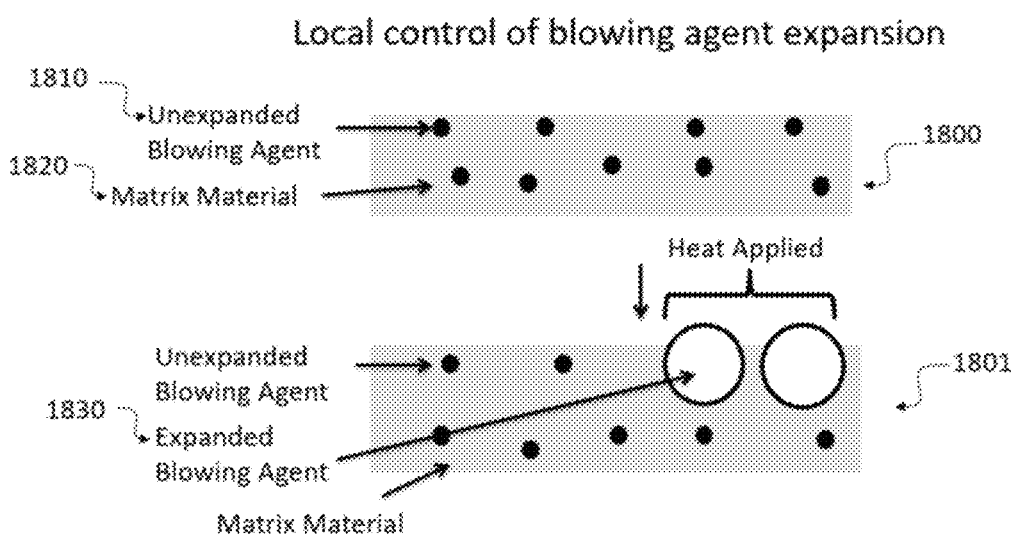
FIG. 18 illustrates a non-limiting schematic diagram of a printed article comprising a blowing agent dispersed throughout the printed article with local blowing agent activation, according to other embodiments of the invention.

In a non-limiting set of embodiments, the printed article (FIG. 18, initial printed article 1800) may initially comprise unexpanded blowing agent (FIG. 18, 1810) prior to heating the printed article, in which unexpanded blowing agent is homogeneously distributed throughout the matrix (FIG. 18, 1820) of the printed article. In this non-limiting set of embodiments, heat is applied locally to at least a first portion of the surface of the printed article such that the resulting printed article (FIG. 18, 1801) has at least the first portion of the surface layer comprising expanded blowing agent (FIG. 18, 1830), resulting in a partially textured surface that may have a matte finish in the at least one portion of the surface layer comprising expanded blowing agent.

A non-limiting set of methods of making article 1800 (FIG. 18) may comprise depositing (e.g., by extrusion through a nozzle) at least a first layer comprising both matrix and blowing agent in a volume percentage as described herein, followed by depositing at least a first surface layer comprising both matrix and blowing agent in a volume percentage as described herein. A non-limiting set of methods of making article 1801 (FIG. 18) may comprise at least one method of the non-limiting set of methods of making article 1800 followed by applying heat to at least a first portion of the surface layer at or above the activation temperature of the blowing agent and applying heat to the entirety of the printed article at or above the curing temperature of the matrix for a duration such that the matrix solidifies and the blowing agent expands in at least the first portion of the surface layer to form article 1801. Unexpanded blowing agent in article 1801 (FIG. 18) results from the blowing agent having an activation temperature above that of the curing temperature of the matrix.

In some embodiments, a blowing agent concentrate may be one of the inputs (e.g., a first fluid) to a mixing nozzle system with a plurality of inputs. In some embodiments, the volume percent of blowing agent incorporated into a given portion of the printed article is digitally controlled. In some embodiments, the entire printed article is heated at or above the activation temperature of the blowing agent and at or above the curing temperature of the matrix, and only at least a first portion of the printed article comprising the blowing agent volumetrically expand and/or achieve a different surface texture from the at least a second portion of the printed article that is free of the blowing agent prior to heating.

In some embodiments, a hybrid approach may be taken, in which a plurality of blowing agents, each with a different activation temperature and/or a different solid particle size, may be incorporated into the printed article. In some embodiments, a low-temperature activating blowing agent may be incorporated that has an activation temperature at or below the curing temperature of the matrix and therefore that is activated during curing of the printed article. In some embodiments, a blowing agent with an activation temperature above the curing temperature of the matrix may be incorporated into the printed article and may be activated by the local application of heat during or after curing the printed article.

In some embodiments, an article that changes shape (e.g., from deposition to its solid cured and/or activated form) may be printed by controlling the ratios of two or more inputs into a mixing nozzle to deposit at least two regions each of which comprises a respective matrix (e.g., an elastomer) adjacent to one another where at least one of the regions contains a blowing agent (e.g., chemical blowing agent) that can be activated at high temperature. The first region may have the same or different components from the second region. Following deposition of the at least two regions, the blowing agent may be activated by heating at least one portion of the article comprising the blowing agent to a temperature greater than or equal to the activation temperature of the blowing agent (and, when applicable, the curing temperature of the matrix), resulting in a differential expansion between the at least two regions that causes physical deformation of the article. In some embodiments, the differential expansion is programmed to cause the article to better conform to a shoe last.

In some embodiments, the blowing agent concentration is varied between the at least two regions by controlling the ratio between two or more input materials to a mixing nozzle, one or more of which input materials comprises the blowing agent. In some embodiments, the stiffness of the matrix (e.g., elastomer) in the first region may differ from the stiffness of the matrix (e.g., elastomer) in the second region (e.g., by varying the concentration of crosslinking agent between the first region and the second region). In some embodiments, the differential expansion of the two or more regions is controlled by the stiffness difference between the two regions with respect to the matrix (e.g., elastomer) that encapsulates the blowing agent. In some embodiments, the differential expansion is controlled by both a difference in stiffness of the matrix and a difference in blowing agent concentration between the two or more regions. In some embodiments, the differential expansion is controlled by a difference between the first region and the second region of the density, blowing agent concentration, pore concentration, pore size, stiffness, heat deflection temperature, coefficient of thermal expansion, and/or filler concentration.

In certain embodiments, the printed article may have a ratio of the concentration of blowing agent in the first region prior to heating, to the concentration of blowing agent in the second region prior to heating, of greater than or equal to 1.05, greater than or equal to 1.1, greater than or equal to 1.2, greater than or equal to 1.3, greater than or equal to 1.5, greater than or equal to 2, or greater than or equal to 5. In some embodiments, a ratio of the concentration of blowing agent in the first region prior to heating, to the concentration of blowing agent in the second region prior to heating, may be less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 10).

In certain embodiments, the printed article may have a ratio of the concentration of crosslinking agent in the first region prior to heating, to the concentration of crosslinking agent in the second region prior to heating, of greater than or equal to 1.05, greater than or equal to 1.1, greater than or equal to 1.2, greater than or equal to 1.3, greater than or equal to 1.5, greater than or equal to 2, or greater than or equal to 5. In some embodiments, a ratio of the concentration of crosslinking agent in the first region prior to heating, to the concentration of crosslinking agent in the second region prior to heating, may be less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 10).

In some embodiments, the activation temperature of the blowing agent may be greater than or equal to 200 degrees Celsius, greater than or equal to 250 degrees Celsius, greater than or equal to 300 degrees Celsius, greater than or equal to 350 degrees Celsius greater than or equal to 400 degrees Celsius, greater than or equal to 450 degrees Celsius, greater than or equal to 500 degrees Celsius, greater than or equal to 550 degrees Celsius, greater than or equal to 600 degrees Celsius, greater than or equal to 650 degrees Celsius, or greater than or equal to 700 degrees Celsius. In some embodiments, the activation temperature of the blowing agent may be less than or equal to 750 degrees Celsius, less than or equal to 700 degrees Celsius, less than or equal to 650 degrees Celsius, less than or equal to 600 degrees Celsius, less than or equal to 550 degrees Celsius, less than or equal to 500 degrees Celsius, less than or equal to 450 degrees Celsius, less than or equal to 400 degrees Celsius, less than or equal to 350 degrees Celsius, less than or equal to 300 degrees Celsius, or less than or equal to 250 degrees Celsius. Combinations of these activation temperatures are also possible (e.g., greater than or equal to 200 degrees Celsius and less than or equal to 750 degrees Celsius).

In some embodiments, the at least one portion of the article may be heated to a temperature greater than or equal to the activation temperature of the blowing agent (and, when applicable, the curing temperature of the matrix) for greater than or equal to 1 minute, greater than or equal to 2 minutes, greater than or equal to 5 minutes, greater than or equal to 30 minutes, or greater than or equal to 60 minutes. In some embodiments, the at least one portion of the article may be heated to a temperature greater than or equal to the activation temperature of the blowing agent for less than or equal to 120 minutes, less than or equal to 60 minutes, less than or equal to 30 minutes, less than or equal to 5 minutes, or less than or equal to 2 minutes. Combinations of these heating durations are also possible (e.g., greater than or equal to 1 minute and less than or equal to 120 minutes).

In some embodiments, an article may comprise a polymeric structure. In some embodiments, the polymeric structure may comprise a polymer. In some embodiments, the polymeric structure may comprise particles (e.g., reinforcing particles) (e.g., comprising a chemical blowing agent). In some embodiments, the polymeric structure has a gradient in volume percent of particles (e.g., reinforcing particles). At least one portion of the polymeric structure in some embodiments may be adhered to a textile. In some cases, the polymeric structure may contain in at least one portion a chemical blowing agent that has not been expanded. In some cases, the polymeric structure may contain in at least one portion pores from chemical blowing agent that has been expanded. In some embodiments, the surface roughness of the polymeric structure may be increased by heating the polymeric structure at a portion containing chemical blowing agent to a temperature greater than or equal to the activation temperature of the blowing agent.

Some embodiments are directed to methods of printing an article, which may include flowing at least two materials into a mixing chamber. In some embodiments, at least one of the materials is polymeric. The method may involve in some embodiments mixing the at least two materials in the mixing chamber containing an impeller to form a mixture. The method may also include depositing the mixture onto a textile. In some embodiments, the mixed material flows through an orifice and onto the surface of a textile.

In some embodiments, the method may involve flowing the at least two materials into the mixing chamber while rotating the impeller in the mixing chamber. In some embodiments, the mixing chamber contains at least a portion of the impeller. The term "mixing chamber" may refer to the volume in which the at least two materials that are mixed together occupy from when they first touch each other, to when they stop being mechanically influenced by active motion of a mixing part (e.g., impeller). In some embodiments, the mixing chamber and the impeller share at least some volume, e.g. the impeller occupies at least some of the dead volume of the mixing chamber.

In some embodiments, the method may involve flowing the at least two materials into the mixing chamber through at least three discrete material inlets. In such embodiments, there may be at least three materials flowed into the mixing chamber. In some embodiments, the method may involve flowing the at least two materials into the mixing chamber through at least four discrete material inlets. In such embodiments, there may be at least three or four materials flowed into the mixing chamber.

In some embodiments, the mixture is a liquid. In some embodiments the mixture is in direct fluid communication with the mixing chamber during the time of deposition onto the substrate (e.g., textile). As a non-limiting example, the mixture is not jetted into discrete droplets from a standoff distance from the substrate (e.g., textile), but instead contacts simultaneously an outlet from the mixing chamber (e.g., nozzle orifice) and the substrate (e.g., textile) while the mixture is continuous with itself.

In some embodiments, the method may involve controlling the execution of the method using a controller. The method may involve varying the volumetric flow ratios of the at least two materials based on the spatial location of the mixing chamber with respect to the textile. In some embodiments, the change in the volumetric flow ratios between the at least two materials changes at least one property of the deposited mixture. In some embodiments, at least two of the at least two materials undergo a chemical reaction that changes at least one property of the deposited mixture. In some embodiments, the change in the volumetric flow ratios between the at least two materials changes at least one property of the deposited mixture after a chemical reaction has occurred in the deposited mixture. The change in the volumetric flow ratios between the two or more materials may influence the properties of the deposited structure before all chemical reactions have occurred, after all chemical reactions have occurred, or both before and after chemical reactions. In some embodiments, the at least one property that has changed is selected from the group consisting of tensile elastic modulus, tensile strength, tensile 100% modulus, hardness, viscosity, dynamic yield stress, static yield stress, density, particle concentration, color, opacity, and surface roughness, or a combination thereof.

In some embodiments, the textile onto which the mixture is deposited is substantially flat. In some embodiments, the textile conforms to a substrate that is curved in one or more dimensions (e.g., two or three dimensions). In some embodiments, the textile is supported by a belt that can translate the textile in one or more dimensions (e.g., two or three dimensions). In some embodiments, the textile is handled in a roll to roll process. In some embodiments, the textile itself acts as a belt that can move the textile surface with respect to the mixing chamber. In some embodiments, the textile is a component of a shoe upper. In some embodiments, the textile is a component of apparel. In some embodiments, the textile is a component of a knit shoe upper.

In certain cases, a mixture may be deposited onto an article disposed on a substrate. The article may be a component of an article of footwear (e.g., an upper), or may be an article of footwear (e.g., a shoe). The substrate may be configured to hold the article in an advantageous shape, such as an advantageous shape for footwear applications. In some embodiments, the substrate may be a shoe last. Non-limiting examples of suitable combinations of substrates and articles include lasted three dimensional shoe uppers on shoe lasts and lasted full shoes on shoe lasts. Other types of articles and substrates are also possible.

In some embodiments, at least one of the at least two materials comprises a filler and the article is a polymeric composite. In some embodiments, at least one of the at least two materials comprises isocyanate groups. In some embodiments, at least one of the at least two materials have functional groups (e.g., chemical functional groups) selected from the group consisting of alcohol groups, amine groups, or combinations thereof. In some embodiments, the method may involve flowing a material comprising an isocyanate group through an inlet into the mixing chamber. In some embodiments, the material comprising an isocyanate group is selected from the group consisting of an isocyanate, an isocyanate prepolymer, and a quasi-isocyanate prepolymer, or a combination thereof. In some embodiments, the method may involve flowing a short chain extender through an inlet into the mixing chamber. In some embodiments, the short chain extender has a number average molecular weight of e.g. less than 5000 Dalton, less than 4000 Dalton, less than 3000 Dalton, less than 2000 Dalton, less than 1000 Dalton, or less than 500 Dalton. In some embodiments, the short chain extender has a number average molecular weight of less than 1000 Dalton. In some embodiments, e.g. at least 20%, at least 30%, at least 40%, at least 50%, at least 60%, at least 70%, at least 80%, or at least 90%, or at least 99% of the molecules of the short chain extender have at least two functional groups per molecule. In some embodiments, at least 70%, of the molecules of the short chain extender have at least two functional groups per molecule. In some embodiments, the at least two functional groups per molecule comprise at least two alcohol groups. In some embodiments, the at least two functional groups per molecule comprise at least two amine groups. In some embodiments, the at least two functional groups per molecule comprise at least one alcohol group and one amine group. In some embodiments, the method may involve flowing a higher molecular weight (e.g., number average molecular weight) polyol and/or polyamine through an inlet into the mixing chamber (e.g., molecular weight e.g. greater than 100 Daltons, greater than 200 Daltons, greater than 300 Daltons, greater than 400 Daltons, or greater than 500 Daltons). In some embodiments, e.g. at least 20%, at least 30%, at least 40%, at least 50%, at least 60%, at least 70%, at least 80%, or at least 90% or at least 99% of the molecules have a molecular weight greater than 200 Daltons. In some embodiments, at least 70% of the molecules have a molecular weight greater than 200 Daltons. In some embodiments, the method may involve flowing polyols with a concentration of added fumed silica e.g. greater than 1 percent by weight, greater than 2 percent by weight, greater than 3 percent by weight, greater than 4 percent by weight, greater than 5 percent by weight, greater than 10 percent by weight, greater than 20 percent by weight, greater than 30 percent by weight, greater than 40 percent by weight, greater than 50 percent by weight, greater than 60 percent by weight, greater than 70 percent by weight through an inlet into the mixing chamber. In some embodiments, the method may involve flowing polyols with a concentration of added fumed silica greater than 3 percent by weight through an inlet into the mixing chamber.

In some embodiments, additional material inlets may be utilized to control the insertion of pigments of dyes to control the RGB color of the deposited material. In some embodiments, the method may involve flowing a pigment and/or a particle through an inlet into the mixing chamber. Any of the materials flowed into the mixing chamber may also contain pigments and/or particles. In some embodiments, the pigments and/or particles may be flowed into the mixing chamber while contained in a fluid in a pigment and/or particle concentration of e.g. greater than 1 percent by weight, greater than 2 percent by weight, greater than 3 percent by weight, greater than 4 percent by weight, greater than 5 percent by weight, greater than 10 percent by weight, greater than 20 percent by weight, greater than 30 percent by weight, greater than 40 percent by weight, greater than 50 percent by weight, greater than 60 percent by weight, greater than 70 percent by weight.

In one non-limiting set of embodiments, one material that is flowed into the mixing chamber, Part A, is the curing agent that binds another three materials together. In one non-limiting set of embodiments, there are three different Part B's flowed into the mixing chamber along with Part A: Part B1, which makes the mixture stiff during or after Part B1 is introduced into the mixing chamber; Part B2 makes the mixture soft and low viscosity during or after Part B2 is introduced into the mixing chamber; and Part B3 makes the mixture soft and have high viscosity during or after Part B3 is introduced into the mixing chamber. The volumetric flow rate ratios for B1 to B2 to B3 into the mixing chamber can be controlled to control properties (e.g., stiffness and viscosity) of the mixture. The volumetric flow rate of A into the mixing chamber can be determined, e.g. based on what is necessary to complete all chemical reactions for the ratio of Part B's, and controlled by a controller.

In some embodiments, a 3D-printed material may be formed on an article disposed on a substrate that is configured to interact with a detection system in a manner that promotes alignment of the 3D-printed article (and/or portions thereof) with respect to the article disposed on the substrate and/or precision in the positioning of the 3D-printed article (and/or portions thereof) onto the article disposed on the substrate. For example, the article may comprise one or more features that may be detected by a detector. The detector may be in electronic communication (e.g., by use of a wired and/or wireless connection) with a print head configured to deposit a material onto the substrate and article disposed thereon, and/or may be configured to transmit information to the print head configured to deposit a material onto the substrate and article disposed thereon. In certain cases, the detector may be configured to detect information about the article disposed on the substrate, such as the location of the article (and/or a portion thereof) in space, with respect to the substrate, and/or with respect to the print head; the orientation of the article (and/or a portion thereof) in space, with respect to the substrate, and/or with respect to the print head; and/or one or more qualities associated with the article (e.g., the scale of the article, the skew of the article, the mirroring of the article, whether or not the article has undergone an affine transformation). The detector may send instructions to the print head and/or the substrate based on some or all of the information it detects. For example, the detector may detect that the article is located in an undesirable position, and may send an instruction to the substrate to translate and/or rotate so that the article is located in a desirable position. As a second example, the detector may detect that the article is located in a desirable position, and may send instructions to the print head to print onto the article and/or to translate and/or rotate to a desired position and then print onto the article. As a third example, the detector may detect that the article has undergone a certain amount of skew, and send instructions to the print head to modify its motion with respect to the article to account for the skew. Other types of instructions may also be sent.

When present, a detector configured to detect one of more features of an article disposed on a substrate may be located in any suitable position. The detector may be configured to be stationary (e.g., it may be mounted above the substrate at a fixed position), or may be configured to be translated and/or rotated (e.g., it may be mounted on a gantry on which one or more other features such as the print head may also be positioned). The detector may be configured to have a known position with respect to one or more other components of a deposition system (e.g., a print head, a substrate), and/or may be configured to detect its location with respect to one or more components of the deposition system (e.g., the print head, the substrate). For example, the detector may detect its position with respect to the print head by depositing a material onto the substrate (or an article disposed thereon) and detecting the location of the deposited material.

In some embodiments, a detector configured to detect a feature is an optical detector and an article disposed on a substrate comprises features that may be detected optically. For example, the features may be patterns printed onto an article disposed on the substrate, portions of an article disposed on a substrate that scatter light in a detectable manner, portions of an article disposed on a substrate that absorb light in a detectable manner, and/or portions of an article disposed on a substrate that reflect light in a detectable manner. Other types of features that may be detected optically are also contemplated. One example of a suitable type of optical detector is an optical camera.

In some embodiments, as also described elsewhere herein, an article disposed on a substrate may be a fabric, such as a knitted fabric or a woven fabric. The fabrics may comprise one or more features which include one or more portions that are knitted or woven to form a pattern that may be detectable optically. The feature(s) may either be created inline (e.g., during the knitting or weaving process used to form the fabric), or may be added to the fabric after it has been formed. In some embodiments, the feature(s) may comprise portion(s) of a pattern (e.g., a repeating motif) knitted or woven into the fabric or printed onto the fabric.

In some embodiments, one or more materials deposited onto a substrate (e.g., by a print head such as a nozzle) may comprise reactive functional groups for a period of time after deposition. The reactive functional groups may be configured to react with other articles to which the deposited material is adjacent (e.g., articles of footwear, components of articles of footwear), such as an article onto which the material was deposited, an article added to the deposited material, an article positioned beside the deposited material, an article disposed on the same article onto which the material was deposited, and/or an article that is positioned partially above or below the deposited material and partially beside the deposited material. Reaction between the reactive functional groups in the deposited material and one or more articles to which it is adjacent may result in bond formation between the deposited material and the articles(s), and/or may increase the adhesive strength between the deposited material and the article(s). Examples of such articles include textiles, molded parts, layers, further deposited materials with the same or different chemistry, and the like. In some embodiments, the deposited material may bond with two or more articles to which it is adjacent, and may adhere these articles together through bonds formed by reaction of the reactive functional groups in the deposited material with the articles. Each article adhered together may comprise a deposited material (e.g., a 3D-printed article may be built up by successively depositing layers of materials comprising reactive functional groups on top of each other), some of the articles adhered together may comprise a deposited material (e.g., a deposited material may adhere another deposited material to which it is adjacent to a textile on which they are both disposed), or none of the articles adhered together may comprise a deposited material. In some cases, the articles adhered together may have different physical or chemical properties (e.g., different values of toughness, different values of Young's modulus).

In some embodiments, reactive functional groups that are configured to react with an article to which a deposited material is adjacent (e.g., an article of footwear, a component of an article of footwear) may also be configured to react with other reactive functional groups in the deposited material. Reaction between two complementary sets of functional groups within the deposited material may comprise curing of the material. As the deposited material cures, the number of reactive functional groups within the deposited material may be reduced and the deposited material may become less reactive with any articles to which it is adjacent. In certain cases, tuning the curing time of the deposited material by varying one or more parameters (e.g., temperature at which the deposited material is held after deposition, composition of the deposited material) may be advantageous because it may allow for tuning of the reactivity of the deposited material as a function of time. For example, the curing time may be tuned so that the deposited material is adhesive upon deposition and upon further addition of a second article to the deposited material, but is no longer adhesive during further manufacturing steps and/or when an article of which the deposited material is a part of is in use.

A variety of suitable reactive functional groups and molecules comprising reactive functional groups may be included in a deposited material. In some embodiments, a deposited material may comprise reactive functional groups that are alcohol groups and reactive functional groups that are isocyanate groups, and the alcohol groups and isocyanate groups may react to form a polyurethane. In some embodiments, a deposited material may comprise reactive functional groups that are amine groups and reactive functional groups that are isocyanate groups, and the alcohol groups and isocyanate groups may react to form a polyureas. Non-limiting examples of suitable molecules comprising alcohol groups include difunctional hydroxyl compounds such as 1,4-butanediol, hydroquinone bis(2-hydroxyethyl) ether, neopentyl glycol, diethanolamine, and methyldiethanolamine; trifunctional hydroxyl compounds such as trimethylolpropane, 1,2,6-hexanetriol, and triethanolamine; tetrafunctional hydroxyl compounds such as pentaerythritol; and polyols such as polyether polyols, polyester polyols, polytetrahydrofuran, polycaprolactone polyols, polycarbonate polyols, and polytetramethylene ether glycol-based polyols. Non-limiting examples of suitable molecules comprising amine groups include difunctional amine compounds such as diethyltoluenediamine and dimethylthiotoluenediamine. Non-limiting examples of suitable molecules comprising isocyanate groups include methylenebis(phenyl isocyanate), toluene diisocyanate, hexamethylene diisocyanate, naphthalene diisocyanate, methylene bis-cyclohexylisocyanate, and isophorone diisocyanate. Other types of reactive functional groups, and other types of molecules comprising reactive functional groups are also possible.

In some embodiments, a deposited material may be cured (and/or configured to be cured) at room temperature. In some embodiments, the deposited material may be cured (and/or configured to be cured) at a temperature above room temperature. The deposited material may be configured (and/or configured to be cured) to be cured at a temperature of greater than or equal to 70° C., greater than or equal to 80° C., greater than or equal to 90° C., or greater than or equal to 100° C. The deposited material may be cured (and/or configured to be cured) at a temperature of less than or equal to 110° C., less than or equal to 100° C., less than or equal to 90° C., or less than or equal to 80° C. Combinations of the above-referenced ranges are also possible (e.g., greater than or equal to 70° C. and less than or equal to 110° C.). Other ranges are also possible.

A deposited material may be cured (and/or configured to be fully cured) over any suitable period of time. In some embodiments, the deposited material is fully cured (and/or configured to be cured) over a period of time of greater than or equal to two hours, greater than or equal to four hours, greater than or equal to eight hours, greater than or equal to 12 hours, greater than or equal to 20 hours, greater than or equal to 24 hours, greater than or equal to 36 hours, greater than or equal to 48 hours, greater than or equal to three days, greater than or equal to four days, greater than or equal to five days, or greater than or equal to six days. In some embodiments, the deposited material is fully cured (and/or configured to be fully cured) over a period of time of less than or equal to one week, less than or equal to six days, less than or equal to five days, less than or equal to four days, less than or equal to three days, less than or equal to 48 hours, less than or equal to 36 hours, less than or equal to 24 hours, less than or equal to 20 hours, less than or equal to 12 hours, less than or equal to eight hours, or less than or equal to four hours. Combinations of the above-referenced ranges are also possible (e.g., greater than or equal to two hours and less than or equal to 20 hours, or greater than or equal to 24 hours and less than or equal to one week). Other ranges are also possible. In general, higher curing temperatures result in faster reactions between reactive functional groups. This may cause the time over which the deposited material is fully cured (and/or configured to be fully cured) to decrease. For example, a material may be fully cured over a period of time of greater than or equal to a few days and less than or equal to one week when cured at room temperature but may be fully cured over a period of time of greater than or equal to two hours and less than or equal to 20 hours at a temperature of greater than or equal to 70° C. and less than or equal to 110° C.

A deposited material may be deposited at any degree of curing. In some embodiments, the deposited material is at least 25% uncured upon deposition, at least 30% uncured upon deposition, at least 40% uncured upon deposition, at least 50% uncured upon deposition, at least 60% uncured upon deposition, at least 70% uncured upon deposition, at least 80% uncured upon deposition, or at least 90% uncured upon deposition. In some embodiments, the deposited material is at most 95% uncured upon deposition, at most 90% uncured upon deposition, at most 80% uncured upon deposition, at most 70% uncured upon deposition, at most 60% uncured upon deposition, at most 50% uncured upon deposition, or at most 40% uncured upon deposition. Combinations of the above-referenced ranges are also possible (e.g., at least 30% uncured upon deposition and at most 95% uncured upon deposition). Other ranges are also possible.

In some embodiments, an article (e.g., an article of footwear, a component of an article of footwear) is positioned adjacent to a deposited material (e.g., deposited on the deposited material, deposited adjacent the deposited material, laminated to the deposited material, etc.) before it has fully cured. The article may be positioned adjacent to the deposited material before at least 25% of the deposited material has cured, before at least 30% of the deposited material has cured, before at least 40% of the deposited material has cured, before at least 50% of the deposited material has cured, or before at least 60% of the deposited material has cured. The article may be positioned adjacent to the deposited material before at most 70% of the deposited material has cured, before at most 60% of the deposited material has cured, before at most 50% of the deposited material has cured, before at most 40% of the deposited material has cured, or before at most 30% of the deposited material has cured. Combinations of the above-referenced ranges are also possible (e.g., before at least 25% of the deposited material has cured and before at most 70% of the deposited material has cured). Other ranges are also possible.

In certain embodiments, an article (e.g., an article of footwear, a component of an article of footwear, an article of apparel such as a sports bra, a component of an article of apparel such as a sports bra) as described herein may be produced on a multi-axis deposition system, and/or a method as described herein may include at least one step that is performed on a multi-axis deposition system. In general, and as described further below, multi-axis deposition systems include a print head and a substrate. The print head may be any suitable print head configured to deposit a material onto the substrate. The substrate may be any suitable substrate onto which a material may be deposited; in some embodiments, one or more articles (e.g., a component of an article of footwear, an upper, a sock liner) may be disposed on the substrate. In certain embodiments, one or both of the print head and substrate may be translated along one or more axes and/or rotated around one or more axes. Translation and/or rotation of the print head and/or substrate may enable the position of the print head with respect to the substrate to be changed prior to, during, and/or after a printing process. In some cases, translation and/or rotation of the print head and/or the substrate may allow the print head to deposit material onto a wide variety of substrate surfaces and/or allow the print head to deposit material onto the substrate at a wide variety of angles. In some embodiments, the print head may be configured to be rotated and/or translated such that it can deposit material onto each surface of the substrate.

Figure 20:
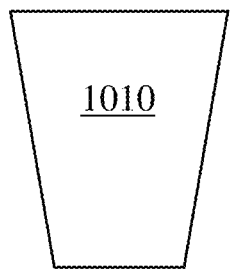
FIG. 20 is a schematic depiction of a print head and a substrate, according to certain embodiments of the invention.
Figure 20:
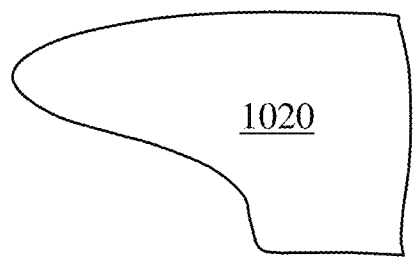

FIG. 20 shows one non-limiting embodiment of a multi-axis deposition system 1000 comprising print head 1010 and substrate 1020. The print head, substrate, and multi-axis deposition system will be described in further detail below.

A print head in a multi-axis deposition system may be any suitable print head configured to deposit a material of interest onto the substrate. In some embodiments a multi-axis deposition system may comprise two or more print heads. Non-limiting examples of suitable print heads include a direct write head, a mixing nozzle, an ink jet head, a spray valve, an aerosol jet print head, a laser cutting head, a hot air gun, a hot knife, an ultrasonic knife, a sanding head, a polishing head, a UV curing device, an engraver, an embosser, and the like. In some embodiments, it may be advantageous for the multi-axis deposition system to comprise a first print head that is comprises a mixing nozzle and a second print head that does not comprise a mixing nozzle. As described elsewhere herein, in some embodiments, the print head may be configured to accept one or more material inputs (e.g., one material input, two material inputs, etc.). When two or more material inputs are present, the inputs may be substantially the same or they may differ. In some embodiments, the print head may be configured to mix two or more reactive material inputs to form a reactive mixture that may be deposited onto a substrate while the first and second material inputs are reacting and/or after the first and second material inputs have reacted. For example, the print head may be configured to mix a polyol and an isocyanate to form a reactive polyurethane mixture. Other examples of suitable reactive mixtures include reactive polyurea mixtures, reactive mixtures comprising reactive polyurethane and reactive polyurea blends, reactive mixtures comprising epoxy groups and amine groups, and reactive silicone mixtures.

A substrate in a multi-axis deposition system may be any suitable substrate capable of receiving the material deposited by the print head. In some cases, the substrate may have a shape that enables facile deposition of the material of interest in a morphology of interest by the print head. As an example, the substrate may have a shape that substantially corresponds to the morphology of interest, such as a footwear last for footwear applications (e.g., as shown in FIG. 20), a bra cup for sports bra applications and/or for bra lining applications, an article substantially corresponding to the shape of a knee for knee brace applications, an article substantially corresponding to the shape of an ankle for ankle brace applications, an article substantially corresponding to the shape of a wrist for wrist brace applications, an article substantially corresponding to the shape of a shoulder for shoulder brace applications, and/or an article substantially corresponding to the shape of an arm for arm band applications. As another example, the substrate may be a mold or a portion of a mold. As a third example, the substrate may comprise a portion that is curved, and/or the substrate as a whole be curved. For instance, the substrate may have a spherical shape, or a hemispherical shape. As a fourth example, the substrate may comprise two or more surfaces that are joined at facets. In some such cases, the substrate may be a platonic solid or may comprise a portion that is a platonic solid. In some embodiments, the substrate may be substantially flat. Other types of substrates are also possible.

In some embodiments, a multi-axis deposition system may comprise a substrate that is removable. The substrate may be configured to be positioned in the multi-axis deposition system during material deposition and removed after material deposition. In some embodiments, a multi-axis deposition system may comprise multiple substrates that may be added to the multi-axis deposition system prior to material deposition and/or removed from the multi-axis deposition system after material deposition. Each substrate may have a different shape (e.g., a different shoe size, a different cup size, a mold for a different type of apparel), or two or more substrates may have substantially the same shape.

As described above, one or more articles may be disposed on the substrate prior to material deposition and/or during material deposition using a multi-axis deposition system. The article(s) disposed on the substrate may be configured to be positioned on the substrate during material deposition and, optionally, removed from the substrate after material deposition. In some embodiments, a multi-axis deposition system may be configured to deposit material onto a multiple articles successively, each of which may be added to the multi-axis deposition system prior to material deposition and/or removed from the multi-axis deposition system after material deposition. For example, a textile (e.g., a non-flat textile, an upper, a woven textile, a knit textile) may be disposed on the substrate prior to material deposition, during material deposition, and/or after material deposition. In some embodiments, a multi-axis deposition system may be employed to deposit a reactive mixture as described above onto a textile to form a 3D-printed material on the textile and/or on a succession of textiles sequentially added to the substrate.

It should be noted that the print head(s) and the substrate in a multi-axis deposition system comprising both a print head and a substrate may be oriented with respect to each other in other ways than that shown in FIG. 20. As an example, a print head may be disposed over the center of the substrate in some embodiments and over the edge of the substrate in other embodiments. As another example, a print head may be oriented so that it deposits material on the substrate at a 90° angle to the substrate in some embodiments and so that it deposits material on the substrate at another angle to the substrate (e.g., 45°, 30°, or other angles) in other embodiments. As a third example, the substrate may present a bottom surface (e.g., a portion of a last on which a sole would be disposed) to a print head in some embodiments and may present a side or top surface (e.g., a portion of a last on which an upper would be disposed) in other embodiments. In some cases, the print head(s) and/or the substrate may be configured to be translated and/or rotated around one or more axes, as described further below. In such cases, the absolute positions of the print head(s) and the substrate may be varied during operation of the multi-axis system, and/or the relative position of the print head(s) with respect to the substrate may be varied during operation of the multi-axis system.

As described above, a multi-axis deposition system may comprise one or more print heads that may be configured to be translated along one or more axes. In some embodiments, one or more print heads may be configured to be translated along one axis, along two axes, or along three axes. In certain cases, the axes may be perpendicular to each other. In other cases two or more of the axes are not perpendicular to each other (e.g., they may intersect at an angle between 45° and 90°). For example, in some embodiments the print head may be configured to be translated vertically, and/or translated in one or more directions perpendicular to the vertical direction. As another example, in some embodiments one or more print heads may be configured to be translated in a direction perpendicular to the substrate, and/or in one or more directions parallel to the substrate. As a third example, in some embodiments one or more print heads may be configured to be translated at a 45° angle with respect to the substrate. In some cases, each axis of translation may independently be controlled by separate motors. In some embodiments, one or more print heads may not be configured to be translated.

In some embodiments, one or more print heads in a multi-axis system may be configured to be rotated around one axis, around two axes, or around three axes. In some embodiments, one or more print heads may be configured to be rotated around more than three axes (e.g., around more than four axes, around more than six axes, around more than eight axes, around more than 10 axes, or around more than 12 axes). In certain cases, the axes may be perpendicular to each other. For example, in some embodiments the print head may be configured to be rotated around a vertical axis, and/or rotated around one or more axes perpendicular to the vertical axis. As another example, in some embodiments one or more print heads may be configured to be rotated around an axis perpendicular to the substrate, and/or around one or more axes parallel to the substrate. In some cases, each axis of rotation may independently be controlled by separate motors. In some embodiments, one or more print heads may not be configured to be rotated. In some embodiments, the print head may be configured to be stationary.

In some embodiments, a substrate in a multi-axis system may be configured to be translated along one axis, along two axes, or along three axes. In certain cases, the axes may be perpendicular to each other. In other cases two or more of the axes are perpendicular to each other (e.g., they may intersect at an angle between 45° and 90°). For example, in some embodiments the substrate may be configured to be translated vertically, and/or translated in one or more directions perpendicular to the vertical direction. As another example, in some embodiments the substrate may be configured to be translated in a direction perpendicular to the print head, and/or in one or more directions parallel to the print head. As a third example, in some embodiments the print head may be configured to be translated at a 45° angle with respect to the substrate. In some cases, each axis of translation may independently be controlled by separate motors. In some embodiments, the substrate may not be configured to be translated.

In some embodiments, a substrate in a multi-axis system may be configured to be rotated around one axis, around two axes, or around three axes. In certain cases, the axes may be perpendicular to each other. In some embodiments, the substrate may be configured to be rotated around more than three axes (e.g., around more than four axes, around more than six axes, around more than eight axes, around more than 10 axes, or around more than 12 axes). For example, in some embodiments the substrate may be configured to be rotated around a vertical axis, and/or rotated around one or more axes perpendicular to the vertical axis. As another example, in some embodiments the substrate may be configured to be rotated around an axis perpendicular to the print head, and/or around one or more axes parallel to the print head. In some cases, each axis of rotation may independently be controlled by separate motors. In some embodiments, the substrate may not be configured to be rotated. In some embodiments, the substrate may be configured to be stationary.

In some embodiments, a multi-axis deposition system may comprise one or more features that aid rotation and/or translation of a print head and/or a substrate. As an example, in some cases the print head may be attached to a print head arm that facilitates motion. When two or more print heads are present, each print head may be positioned separate print head arms or two or more print heads may be positioned on the same print head arm. In some cases, two or more print head arms may be attached to a single gantry. The print head arms may be capable of facilitating translation and/or rotation of the print head. In some embodiments, the print head(s) may be attached to single print head arms; in other embodiments, the print head(s) may be attached to multiple print head arms that are attached at joints that allow for rotation and/or translation. In some cases, one or more motors may facilitate motion of one or more components of the print head arm(s). As another example, in some cases the substrate may be attached to a substrate arm that facilitates motion. The substrate arm may be capable of facilitating translation and/or rotation of the substrate. In some embodiments, the substrate may be attached to a single substrate arm; in other embodiments, the substrate may be attached to multiple substrate arms that are attached at joints that allow for rotation and/or translation. In some cases, the substrate may be attached to a robot arm. In some cases, one or more motors may facilitate motion of one or more components of the substrate arm(s). In certain embodiments, the print head may be attached to a print head arm and the substrate may be attached to a substrate arm.

Figure 21:
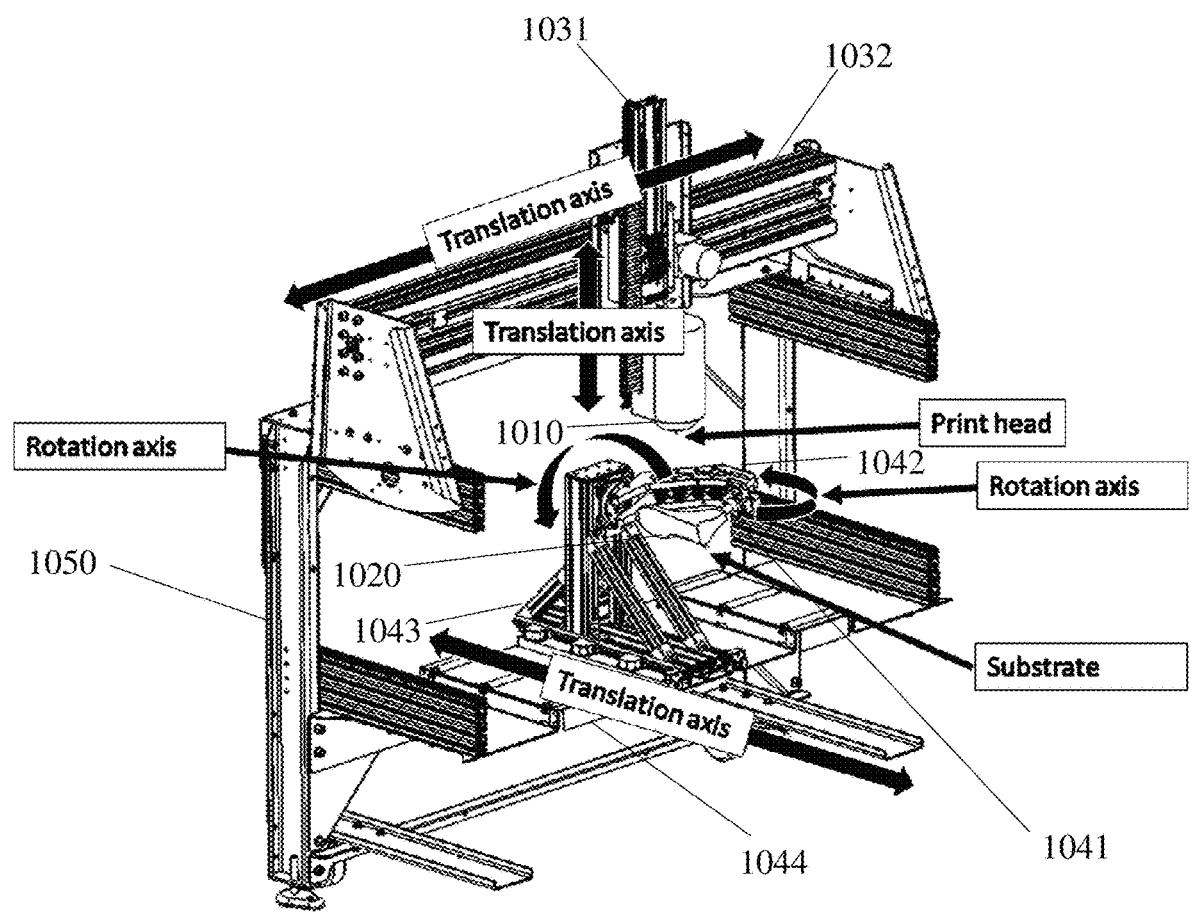
FIGS. 21-23 are schematic depictions of a multi-axis deposition system, according to certain embodiments of the invention.
Figure 22:
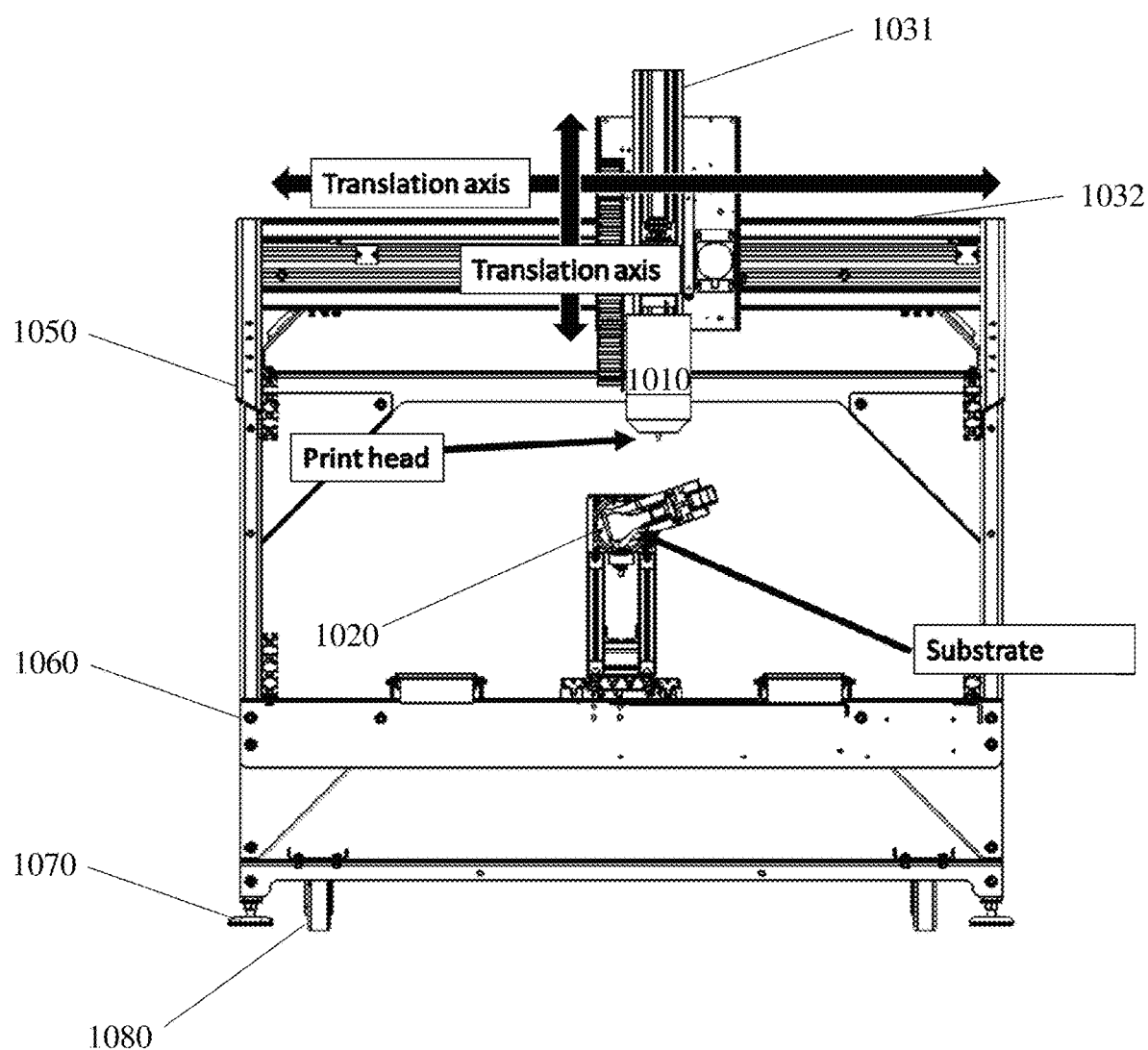
Figure 23:
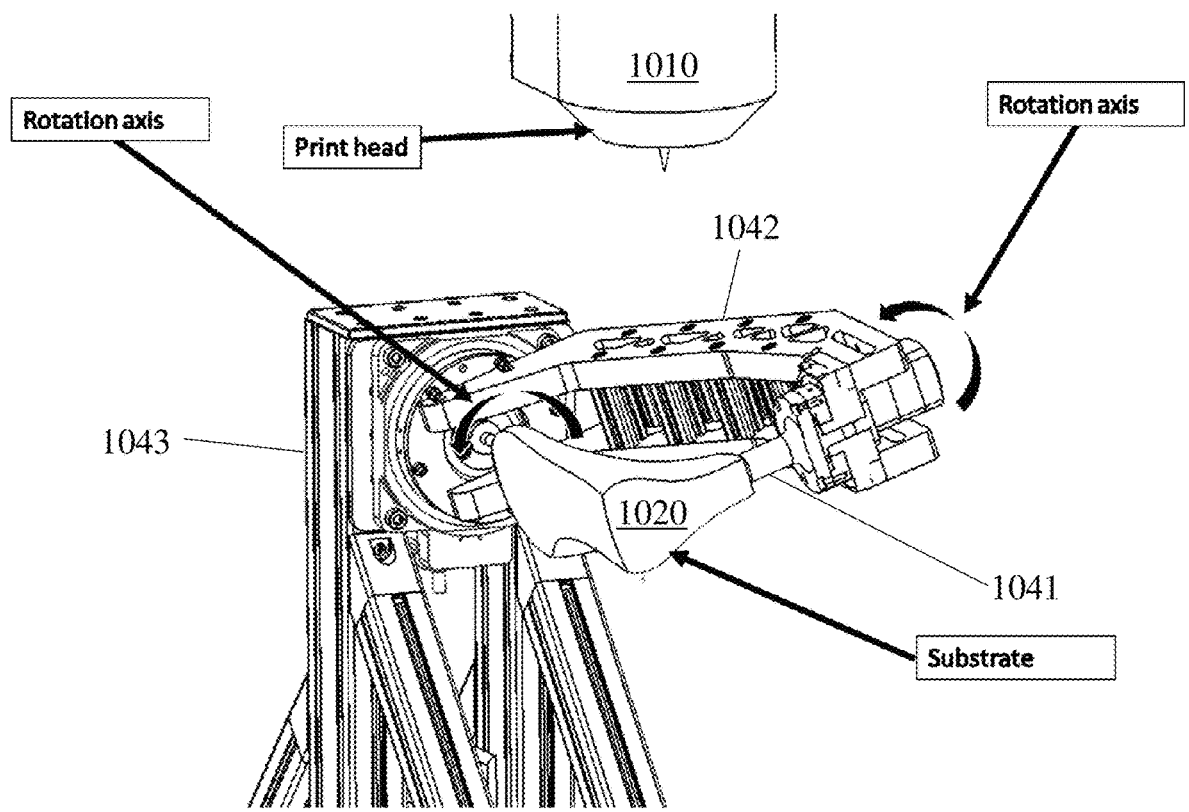

FIGS. 21-23 show various views of a non-limiting embodiment of a multi-axis deposition system showing various combinations of axes around which a print head and substrate therein may be configured to be rotated and/or translated. FIG. 21 shows a perspective view of the system as a whole, FIG. 22 shows a cross-sectional view of the system as a whole, and FIG. 23 shows a close up perspective view of the print head and the substrate. It should be understood that these figures do not show all possible combinations of print head and substrate motion, and that all combinations of print head motion and substrate motion described above are contemplated.

In FIGS. 21-23, the multi-axis deposition system includes print head 1010 and substrate 1020. Print head 1010 in FIGS. 21-23 is attached to first print head arm 1031, which is attached to second print head arm 1032 by a first print head joint configured to allow translation of first print head arm 1031 along a first print head translation axis and along a second print head translation axis. Second print head arm 1032 is also attached to gantry 1050, which supports the second print head arm. In some embodiments, the second print head arm is attached to the gantry by screws and held in a stationary position (as is shown in FIGS. 21-23). In other embodiments, the second print head arm is configured to be translated along one or more axes and/or rotated around one or more axes. The print head may be translated along the first print head translation axis by translating the first print head arm along the first print head translation axis, and the print head may be translated along the second print head translation axis by translating the first print head arm along the second print head translation axis. In certain cases, such as that shown in FIGS. 21-23, the second print head arm may be a track along which the first print head arm may be translated and/or the first print head joint may comprise a track along which the first print head arm may be translated. In other embodiments, other types of joints and print head arms may be employed.

Substrate 1010 in FIGS. 21-23 is attached to first substrate arm 1041, which is attached to second substrate arm 1042 by a first substrate joint configured to allow rotation of first substrate arm 1041 around a first substrate rotation axis. Second substrate arm 1042 is attached to third substrate arm 1043 by a second substrate joint configured to allow rotation of second substrate arm 1042 around a second substrate rotation axis. The substrate may be rotated around the first substrate rotation axis by rotating the first substrate arm around the first substrate rotation axis, and around the second substrate rotation axis by rotating the second substrate arm around the second substrate rotation axis. In some embodiments, one or more of the substrate arms may curved (e.g., second substrate arm as shown in FIGS. 21-23). Third substrate arm 1043 is attached to support 1044 by a third substrate joint configured to allow translation of the third arm along a first substrate translation axis. The substrate may be translated along the first substrate translation axis by translating the third arm along the first substrate translation axis. In certain cases, such as that shown in FIGS. 21-23, the third substrate arm may be a track along which the second substrate arm may be translated. In other embodiments, other types substrate arms may be employed.

In some embodiments, a multi-axis system may comprise further features in addition to some or all of those described above. For example, the multi-axis system may be encased in a frame or enclosure. FIG. 22 includes frame 1060 with feet 1070 and wheels 1080. The feet may aid stable positioning of the frame on a surface (e.g., a floor, a desktop, a lab bench). The wheels may promote facile repositioning of the frame in different locations. In some embodiments, one or more components (e.g., the frame, one or more arms) may be formed from standardized parts, such as T-slotted framing. Other types of standardized parts, and/or non-standard parts, may also be employed.

Certain combinations of print head motion and substrate motion may be especially advantageous. For example, as shown in FIGS. 21-23, a print head may be configured to be translated vertically and in a first horizontal direction, and the substrate may be configured to be translated along a second horizontal direction perpendicular to the first horizontal direction and rotated around two distinct axes. As another example, a print head may be configured to be translated in three perpendicular directions and the substrate may be configured to be rotated around two distinct axes. As a third example, a print head may be configured to be stationary and the substrate may be configured to be translated in three perpendicular directions and rotated around two distinct axes. As a fourth example, a print head may be configured to be translated around three distinct rotation axes and along three distinct translation axes, and the substrate may be configured to be stationary. Other combinations of print head motion and substrate motion are also possible.

In some embodiments, a multi-axis system may have one or more features that make it suitable for 3D-printing materials of interest. For example, the multi-axis system may be configured to deposit a material onto a substrate as a continuous stream or as a continuous filament. In other words, the substrate may be in fluid communication with the print head via the material during deposition. In certain cases, the multi-axis system may be employed to deposit a continuous stream or filament that extends from a first side of a last or a material disposed on the last (e.g., an upper, a 3D-printed material disposed on an upper) across the bottom of the last or material disposed on the last to the opposing side of the last or material disposed on the last. In some cases, the multi-axis system may be employed to print each portion of an article of footwear except for the upper.

In some embodiments, a multi-axis system may be configured to 3D-print materials with one or more advantageous properties. For example, the multi-axis system may be configured to 3D-print materials with a feature size of greater than or equal to 100 microns, greater than or equal to 200 microns, greater than or equal to 500 microns, greater than or equal to 1 mm, greater than or equal to 2 mm, greater than or equal to 5 mm, greater than or equal to 10 mm, greater than or equal to 20 mm, greater than or equal to 50 mm, greater than or equal to 1 cm, or greater than or equal to 2 cm. In some embodiments, the multi-axis system may be configured to 3D-print materials with a feature size of less than or equal to 5 cm, less than or equal to 2 cm, less than or equal to 1 cm, less than or equal to 5 mm, less than or equal to 2 mm, less than or equal to 1 mm, less than or equal to 500 microns, or less than or equal to 200 microns. Combinations of the above-referenced ranges are also possible (e.g., greater than or equal to 100 microns and less than or equal to 5 cm). Other ranges are also possible.

As discussed herein, a 3D printer may be provided that is capable of printing a material (e.g., a composite) that is formed by combing two or more other materials (e.g., a polymer and particles, e.g., reinforcing particles) to create a 3D object, such as an article of a shoe. Additionally (or alternatively), such 3D objects may comprise a gradient structure with at least one non-uniform property (e.g., color, average stiffness, average Shore A hardness, average pore size, and average density). The inventors have appreciated that existing techniques for generating printer instructions for a 3D printer, such as those implemented in conventional slicer software applications, may be unable to accurately determine appropriate printer settings (e.g., a ratio of two or more inputs to a mixing chamber and/or nozzle, a spin speed of an impeller in the mixing nozzle, sequencing of material into a mixing chamber and/or nozzle, valving to change material inputs into the mixing chamber and/or nozzle, total cumulative flowrate of all inputs to a mixing chamber, vertical position of a print head relative to the substrate, speed of movement of the print head, amount of reverse pumping following a movement command, temperature of the print head, temperature of a substrate onto which the article is printed, and the calibration setting for a material inlet pump) to properly print such materials. Accordingly, aspects of the present disclosure relate to a computer program that is configured to generate printer settings for printing such materials in uniform and/or gradient structures of a 3D object.

The computer program may be configured to receive object information, such as a design file for a 3D object (e.g., from a computer-aided design (CAD) program) and/or a print path for printing a 3D object (e.g., from a slicer application) with information indicative of target material properties at various points along the print path, and output print instructions that may be provided to a 3D printer to accurately create the 3D object. The computer program may generate the print instructions by, for example, identifying a target material that is to be deposited, identifying the input materials required to create the target material, and identifying the printer settings to print the target material using the input materials. Once the appropriate set of printer settings have been identified, print instructions may be generated using the identified set of printer settings. For example, print instructions may be generated that comprise a print path for the print head to follow and printer settings information indicative of the appropriate printer settings at a plurality of points along the print path.

The computer program may comprise a set of instructions that may be executed by a computer system comprising a processor (e.g., a hardware processor or a virtual processor) and a memory (e.g., a non-transitory computer readable medium). For example, the computer program may comprise a set of instructions stored in a non-transitory computer readable medium that programs at least one processor coupled to the non-transitory computer readable medium. It should be appreciated that the computer system may be communicatively coupled to a 3D printer and/or integrated with the 3D printer.

Figure 24:
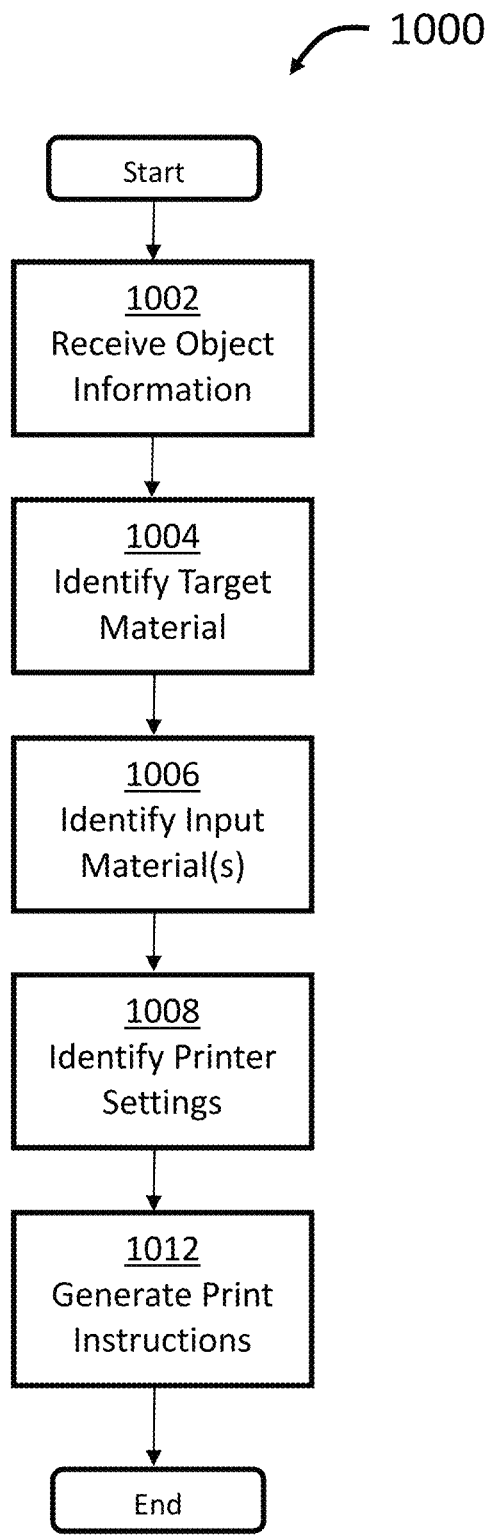
FIG. 24 is a non-limiting flow diagram of a method for generating print instructions from object information, in accordance with some embodiments of the invention.

In some embodiments, the computer program may comprise a plurality of instructions that program at least one processor to perform a method 1000 in FIG. 24. As shown, the method 1000 comprises an act 1002 of receiving object information, an act 1004 of identifying target material to be printed, an act 1006 of identifying input materials to form the target material, an act 1008 of identifying printer settings to print the target material, and an act 1012 of generating print instructions.

In act 1002, the system may receive object information associated with a 3D object. The object information may be, for example, a design file for a 3D object to be printed. The design file may comprise information indicative of one or more properties of the 3D object such as shape, material composition, and/or color. The design file may be in any of a variety of formats. Example formats include: Drawing Interchange Format (DXF), COLLAborative Design Activity (COLLADA), STereoLithography (STL), Initial Graphics Exchange Specification (IGES), and Virtual Reality Modeling Language (VRML). Alternatively (or additionally), the object information may comprise a print path for a print head to follow to print the 3D object (e.g., generated by a slicer application) and information indicative of the desired material properties at various points along the print path. For example, the object information may comprise a print path comprising a plurality of points and metadata associated with one or more (or all of) the plurality of points indicative of a desired material property at the point (e.g., color, average stiffness, average Shore A hardness, average pore size, average density, etc.). In some implementations, the metadata may be directly associated with one or more points in the plurality of points. In other implementations, the metadata may be stored in another format and overlaid onto the print path to determine the material properties at a given point. For example, the metadata may be desired color information stored in an image comprising a plurality of pixel values that may be overlaid onto the print path. In this example, the pixel value that aligns with a given point in the print path may be the metadata associated with the respective point.

In act 1004, the system may identify a target material to be printed based on the object information. For example, the object information may comprise information regarding the target material (e.g., in metadata) and the system may directly identify the target material from the received object information.

In act 1006, the system may identify input material(s) to create the target material. For example, the 3D printer may print the target material in the object by mixing a first material with a second material. In this example, the system may identify the first and second materials. The system may identify this information by, for example, retrieving information stored in a memory of the computer system regarding the input materials required to create the target material in the object.

In act 1008, the system identifies one or more printer settings for printing the target material using the identified input materials. In some embodiments, the system may identify one or more printer settings required to print the target material at a plurality of discrete points in the object (e.g., along the print path). In instances where the printer settings deviate between discrete points (e.g., to print a gradient structure in the object), the system may employ interpolation techniques (e.g., linear interpolation and cubic interpolation) to smooth shifts in printer settings between the discrete points. In one example for illustration, the system may identify that the mixing ratio of two materials needs to be 40/60 at a first point in a gradient structure and a 50/50 ratio at a second point in the gradient structure. In this example, the system may fit a linear curve between the first and second points to create a smooth ramp between a 40/60 ratio and a 50/50 ratio. Thereby, the system may create a set of printer settings to employ along the print path as the print head moves from the first point to the second point.

In act 1012, the system may generate the print instructions using the identified printer settings in act 1008. The print instructions may comprise, for example, a print path for a print head to follow to print the 3D object along with printer settings at a plurality of points along the print path (e.g., generated in act 1008). The print instructions may be, for example, G-code instructions. Once the print instructions have been generated, the system may transmit the print instructions to a 3D printer (and/or one or more other components of a 3D printer in embodiments where the computer system is integrated with the 3D printer).

As mentioned, certain aspects of the present invention generally relate to the printing of materials, using 3-dimensional printing and other printing techniques, including the printing of foams and other materials and/or the modulation of material composition and material properties through space and/or time. In some embodiments, a foam may be prepared by mixing materials within a nozzle, such as a microfluidic printing nozzle, which may be used to direct the resulting product onto a substrate. The nozzle may be controlled, for example, using a computer or other controller, in order to control the deposition of material onto the substrate. In some cases, gases or other materials may be incorporated into the material within the nozzle, e.g., to form a foam. However, it should be understood that the present invention is not limited to only foams; for example, other materials, including composites that comprise particles (e.g., reinforcing particles), are also included in other embodiments of the invention.

For instance, certain aspects of the invention are generally directed to devices for 3D-printing. Generally, in 3D-printing, material is controllably deposited, e.g., on a substrate, to create a product. The material may be deposited in a pattern defining the product, or that can be manipulated to create the product, e.g., by removing portions of the pattern. In some cases, a printing nozzle, such as a microfluidic printing nozzle, may be used to direct material onto a substrate. The nozzle may be controlled, for example, using a computer or other controller, in order to control the deposition of material onto the substrate.

One example of an embodiment of the invention is now described with respect to FIG. 1. As will be discussed in more detail below, in other embodiments, other configurations may be used as well. In this figure, a device 10 for printing an article is shown, using techniques such as 3D printing. The device may include a nozzle 15, through which material is directed at a substrate through outlet 18, e.g., through a valve. The substrate may be planar, or in some cases, the substrate may have a different shape. The substrate may thus be any suitable target for a material exiting the nozzle. For instance, the substrate may include a mold to which the material is applied. Nozzle 15 in FIG. 1 is generally depicted as being conical or funnel-shaped, although it should be understood that this is by way of example only, and the nozzle may have any suitable shape able to direct a material at a substrate.

One or more fluids may flow into the nozzle, and in some embodiments, mixed within the nozzle, e.g., within a mixing chamber within the nozzle to form the material to be deposited on the substrate. In some cases, active mixing may be used to mix fluids within the nozzle. For example, as is shown in FIG. 1, an impeller 20 may be spun to cause mixing within the nozzle. The impeller may have any size or shape, as discussed below. In some cases, the impeller, when spun, may substantially conform to the mixing chamber, or at least a part of the mixing chamber. Thus, for example, material flowing through the nozzle may be disrupted through spinning of the impeller (depicted in FIG. 1 as arrow 25), thereby causing mixing of the material to occur.

In some embodiments, as discussed herein, the speed of the impeller may be controlled, e.g., by a computer or other electronic controller, to control the mixing and/or direction of material exiting the nozzle. For example, the controller may control a valve or other apparatus to control the exiting of material from the nozzle, for example, as the nozzle moves relative to a substrate (or equivalently, as the substrate moves relative to the nozzle). Control of nozzle mixing and the position of the nozzle relative to the substrate may thus be used to control 3D-printing of a material onto the substrate.

In addition, in some embodiments, the material within the nozzle may be subjected to heating or cooling. This may, for example, be used to control mixing and/or reaction within the material, to keep the temperature at substantially the temperature of the surrounding environment (e.g., at room temperature), to prevent the surrounding environmental conditions and/or the heat generated by friction of the impeller and exotherm of the material curing from affecting the reaction or the printing parameters, or the like. Any method may be used to heat or cool the material within the nozzle. For example, heating or cooling may be applied to the nozzle itself, and/or to material within the nozzle. Non-limiting examples include electrical heating, Peltier cooling, application of infrared light, or other techniques such as those discussed herein.

As mentioned, one or more fluids may enter the nozzle to be mixed together. The fluids may enter via a common inlet, and/or via separate inlets, for example, as is illustrated in FIG. 1 with inlets 31, 32, and 33. Although 3 inlets are illustrated in this figure, this is by way of example only, and in other embodiments, more or fewer inlets are also possible. The inlets may independently be at the same or different distances away from an outlet of the nozzle. In some cases, the fluids may react upon contact with each other; thus, the fluids are kept separate prior to entrance into the nozzle, for example, using one or more inputs and/or valves to control contact of the fluids with each other. For example, one or more valves may be present on one or more of the inlets to control the flow of fluid through the inlets, e.g., into the nozzle. Examples of valves that can be used include needle valves, ball valves, gate valves, butterfly valves, or other suitable types of valves. Additionally, other types of apparatuses to control fluid flow may also be used, in addition to and/or instead of valves.

As a non-limiting example, in one set of embodiments, two or more fluids may be mixed together to form product on a substrate, for example, a foam or other article, such as a composite. In some cases, a material (e.g., a precursor to the foam) may be deposited on a substrate in a partially fluid state, where the material is able to harden to form the product on the substrate. For instance, the material may have a viscosity of less than 1,000,000 cP, less than 500,000 cP, less than 300,000 cP, less than 100,000 cP, less than 50,000 cP, less than 30,000 cP, less than 10,000 cP, less than 5,000 cP, less than 3,000 cP, less than 1,000 cP, less than 500 cP, less than 300 cP, less than 100 cP, less than 50 cP, less than 30 cP, or less than 10 cP. In some cases, the material may have a viscosity of at least 10 cP, at least 30 cP, at least 50 cP, at least 100 cP, at least 300 cP, at least 500 cP, at least 1,000 cP, at least 3,000 cP, at least 5,000 cP, at least 10,000 cP, at least 30,000 cP, at least 50,000 cP, at least 100,000 cP, at least 300,000 cP, at least 500,000 cP, or at least 1,000,000 cP. Combinations of any of these viscosities are also possible; for example, the viscosity of a material may be between 100 cP and 500 cP. The material may form a product passively (e.g., upon drying of the material, completion of a reaction forming the product, etc.), and/or additional steps may be taken to encourage formation of the product. As various non-limiting examples, heat may be applied to the material and/or to the substrate, light (e.g., ultraviolet light) may be applied to the material to cause a chemical reaction, etc.

In some embodiments, a foam may be prepared by mixing a polymer, a cross-linking reagent, and a cell-forming agent, e.g., within a printing nozzle such as is shown in FIG. 1. These may be added sequentially or simultaneously in various embodiments, e.g., as discussed herein. For instance, in FIG. 1, a cross-linking agent may be added to the nozzle via inlet 31, a cell-forming agent may be added via inlet 32, and a polymer may be added via inlet 33. In some cases, these may be flowable at the temperatures in which they enter the nozzle. In some cases, control of these may be controlled using one or more valves or other apparatuses on any of these inlets, optionally controlled by a computer or other controller. In addition, in some embodiments, one or more of the fluids flowing into the nozzle may contain particles (e.g., reinforcing particles).

One example of a suitable polymer is polyurethane; one example of a cross-linking reagent is isocyanate; and one example of a cell-forming agent is water (which can react with the isocyanate to produce carbon dioxide as the foam forms). Other examples of each of these are discussed in more detail below. In addition, it should be understood that other fluids or reactants may be combined to form a foam, and the invention is not limited to only embodiments that include a polymer, a cross-linking reagent, and a cell-forming agent; see below for additional non-limiting examples. For example, as discussed below, a foam may be prepared using a polymer and a cell-forming agent, but not necessarily a cross-linking agent. In some embodiments, other additives may also be introduced, for example, surfactant, silicone surfactant, UV stabilizer, catalyst, pigment, nucleation promotors, fillers for better abrasion resistance, chemical foaming agents, etc. In addition, other products besides foam may be formed in other embodiments. For example, in some cases, a composite is formed that comprises particles (e.g., reinforcing particles); for example, the composite may include polyurethane or other polymers described herein, as well as particles (e.g., reinforcing particles) such as rubber particles. In some cases, the composite is a foam, although it need not be in other cases.

Figure 2:
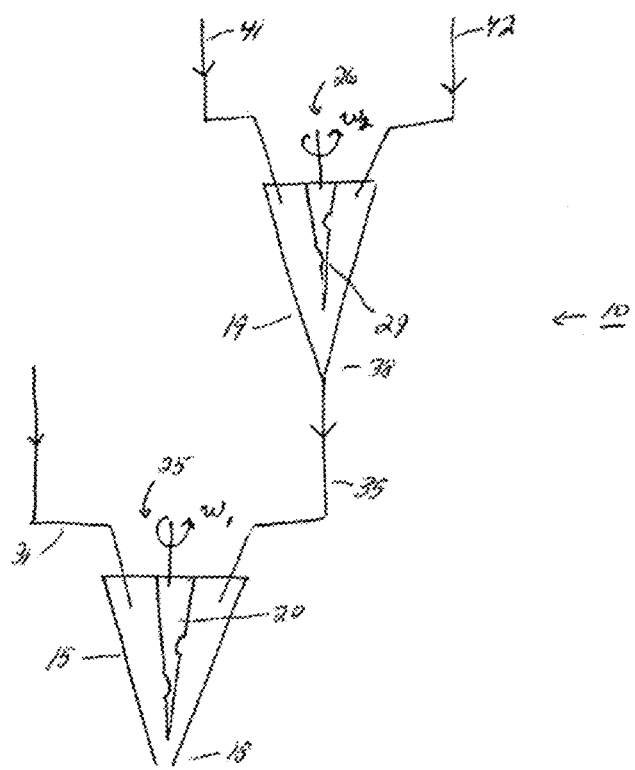
FIG. 2 illustrates a system comprising a nozzle and a mixing chamber, in another embodiment of the invention.

As mentioned, if more than two fluids or reactants are used, they may, in some embodiments, be introduced into the same nozzle, as is shown in FIG. 1. However, in other embodiments, one or more of the fluids or reactants may be mixed to form a mixture (for example, in a first mixing chamber), which can then be mixed with another fluid or reactant (e.g., in a nozzle such as discussed herein). A non-limiting example of a two-stage process is shown in FIG. 2. In this figure, system 10 includes a nozzle 15 and a mixing chamber 19. First nozzle 15 may be a nozzle such as discussed above with respect to FIG. 1. For instance, first nozzle 15 may contain an impeller 20, an outlet 18, and have one, two, or more inputs, e.g., inputs 31 and 35 as shown in this figure.

In some cases, one or more of the inputs to first nozzle 15 may be a mixing chamber, such as mixing chamber 19, having an output 38 which fluidly communicates to inlet 35 of nozzle 15 in this figure. In some cases, mixing chamber may have a similar shape to nozzle 15 (e.g., mixing chamber 19 may be a nozzle), although this is not a requirement. Mixing chamber may have, in some embodiments, one or more inputs (e.g., inputs 41 and 42). In addition, in some cases, mixing nozzle 19 may include an impeller 29, or another suitable mixing apparatus. In this example, impeller 29 causes mixing via spinning (depicted in FIG. 1 as arrow 26). The mixing may be active or passive, and may be the same or different as in nozzle 15. In some cases, even more stages may be used, in series and/or parallel, to provide material for input into a nozzle. For instance, a non-limiting example of a 3-stage serial process can be seen in FIG. 3. In addition, in some cases, partial or no mixing of fluids may occur within mixing chamber 19, e.g., the fluids may be brought into contact, and some partial or incidental mixing may occur, while more vigorous mixing may occur within first nozzle 15.

Figure 4:
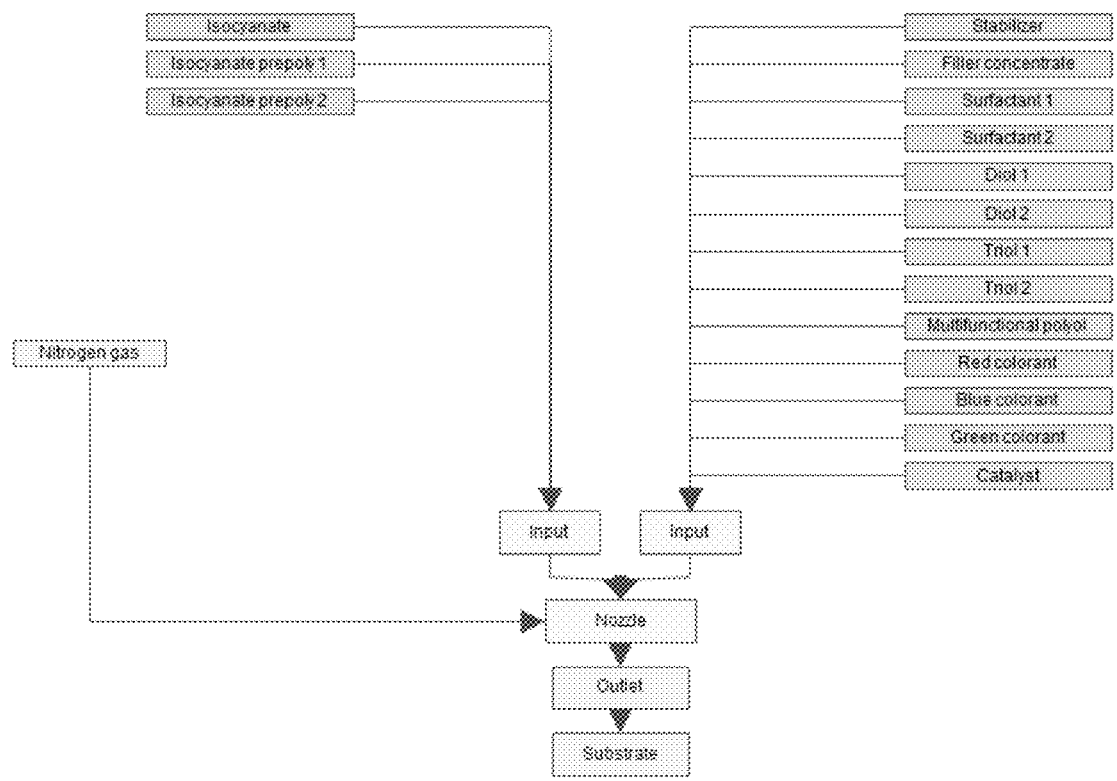
FIG. 4 illustrates a variety of inputs that can be mixed, in accordance with certain embodiments of the invention.

A more specific example is provided in FIG. 4. In this figure, three inputs are provided to a nozzle, e.g., to a mixing chamber of a nozzle. These inputs are provided by way of illustration only, and may vary in different embodiments of the invention. In this figure, a first input may be one or more of a variety of isocyanates, while a second input may include any one or more of a variety of inputs, including stabilizers, filler concentrate, surfactants, diols, triols, multifunctional polyols, colorants, catalysts, etc. These may be provided as inputs to a nozzle, in which mixing occurs, as shown in this figure. In some cases, a cell-forming agent, such as a gas or a blowing agent, may also be added, and these may be substantially homogenously mixed together. In some cases, these may form a foam or froth, e.g., comprising a plurality of relatively small bubbles of gas dispersed within a material, e.g., substantially uniformly distributed. This may then be deposited through the outlet onto a substrate, e.g., controlled by a controller, which may control deposition using a valve or other suitable apparatus. In other cases, as mentioned, composites or other articles may also be formed.

The above discussion describes certain non-limiting examples of various embodiments of the present invention that can be used to produce 3-dimensionally printed foams and other products (e.g., composites), as well as articles made using such techniques. However, other embodiments are also possible. Accordingly, more generally, various aspects of the invention are directed to various systems and methods for 3D-printing foams and other objects as described herein.

As mentioned, certain aspects of the invention are generally directed to foams. Such foams and other articles described herein may be used in a variety of applications, such as footwear. The foam, if present, may be a material comprising a matrix and pores disposed within the matrix. Pores may be randomly distributed throughout the foam, or may be positioned at regular and/or pre-determined intervals. The material present within the pores of a foam is typically of a different phase than the material forming the matrix of the foam (e.g., a foam may comprise pores that comprise gas within a matrix that comprises a liquid and/or a solid). As would be understood to one of ordinary skill in the art, in a closed-cell foam, the cells of the foam are typically isolated or separated from each other. By contrast, in an open-cell foam, the cells of the foam are interconnected with each other; for example, they may be formed in an interconnected fashion, or the cells may be ruptured or become interconnected during or after formation of the foam. These conditions are typically more violent foaming conditions than those resulting in a closed-cell foam.

The foam may be formed from a variety of polymers and gases. The gases may be introduced into materials to form the foam in a number of ways, including into the foam components prior to entrance into the mixing nozzle (e.g. frothed components), during the mixing of components (e.g., active frothing), upon exiting the print nozzle (e.g. release of pressure or spike in temperature to generate gas), generated during printing (e.g. water-blown polyurethanes), generated in a post process after printing is complete by thermally, or otherwise, activating a chemical additive within the material (e.g. blowing agent), etc. In addition, in some cases, a gas may be introduced by providing a liquid that forms a gas, e.g., upon a decrease in pressure or an increase in temperature. For instance, a liquid such as butane may be kept under pressure and/or cooled prior to introduction into the nozzle or the mixing chamber; a change in temperature and/or pressure may cause the liquid to form a gas. Without wishing to be bound by theory, closed cell foams and open cell foams may have different properties (e.g., closed cell foams may have different values of density, stiffness, hardness, and the like than otherwise equivalent open cell foams) and may be suitable for different applications. In some embodiments, closed cell foams may have properties that are better suited to footwear applications than open cell foams.

In some cases, the foams may be prepared to be lightweight, tough, elastic, and/or soft, e.g., using techniques such as those discussed herein. For example, polyurethane foams can be made into a variety of different applications such as shoe soles, cushions, pads, insulation, etc. The properties of the foam can be varied widely, as discussed herein. As an example, similar raw materials can be used to create a piece of rigid insulation, a memory foam pillow, a low density elastic foam pad for a seat cushion, or a high density foam outsole of a shoe. Further non-limiting examples of 3D printed shoes may be seen in a U.S. provisional patent application filed on Feb. 27, 2017, entitled "Systems and Methods for Three-Dimensional Printing of Footwear and Other Articles," incorporated herein by reference in its entirety.

In some cases, foams may be prepared as discussed herein using various inputs and mixing the inputs using an active mixing nozzle, as described herein. For instance, the foam density may be varied by varying the amount of added gas, the amount of added water (e.g., in water-blown foam applications), the amount of added blowing agent, etc. As another example, the foam density constant may be held constant, but the cross-link density or isocyanate content may be varied to change properties such as the elasticity, elongation, or stiffness of the foam.

In some cases, as discussed herein, a foam precursor, prior to curing, may have different rheological properties than the starting raw materials without gas content. For example, a mixture of low viscosity fluids, gases, and/or surfactants, etc. having Newtonian flow behavior before foaming can be used to produce a precursor having non-Newtonian flow characteristics, e.g., with a yield stress, or shear-thickening or shear-thinning behavior. This may be used herein to produce a precursor having a rheological profile suitable for printing, e.g., on a substrate. Fluids such as incompressible Newtonian fluids or gases can be introduced into a nozzle (e.g., prior to mixing) in a controlled fashion and precisely metered onto a substrate during deposition. In some cases, the foaming process may start within the nozzle, and this process may affect the final mechanical properties of the foam.

Accordingly, certain aspects are generally directed to systems and methods for producing a foam or other products as discussed herein. In some cases, a foam may include a plurality of cells (which may include open and/or closed cells) within a polymer or other suitable matrix. Accordingly, certain embodiments described herein are directed to systems and methods able to 3D-print a material on a substrate that is able to form a foam. For instance, the material, at 3D-printing, may have properties that allow it to flow, e.g., from a nozzle, onto a substrate. The material may also contain a gas therein (and/or a gas precursor) that can form the cells of the foam, e.g., upon solidification of the material to form the foam.

In some embodiments of the invention, a material is formed via mixing of two, three, or more fluids to form a precursor, which is 3D-printed onto a substrate and allowed to solidify to form a foam or other product, such as a thermoplastic, an elastomer, a rigid thermoset, or the like. A variety of fluids may be reacted to form a precursor to the foam, as is discussed in further detail herein. In some embodiments, a microfluidic printing nozzle is used to prepare the material prior to deposition onto a substrate. In some embodiments, more than one fluid may be introduced into the nozzle, and the fluids can be mixed within the nozzle to produce the material to be deposited onto the substrate.

In one set of embodiments, a nozzle is used to direct a material (e.g., a precursor) onto a substrate. The nozzle can have any suitable shape. The nozzle may have any suitable shape having an outlet able to direct material at a substrate. For instance, the nozzle may be conical, pyramid-shaped, funnel-shaped, cylindrical, or the like. The nozzle may also have any suitable size. In some cases, the nozzle may include one or more mixing chambers or other regions in which two fluids come into contact with each other, and can be mixed together, e.g., actively or passively. The nozzle or the mixing chamber may have a volume that is less than 20 ml, less than 18 ml, less than 16 ml, less than 14 ml, less than 12 ml, less than 10 ml, less than 8 ml, less than 6 ml, less than 5 ml, less than 4 ml, less than 3 ml, less than 2 ml, less than 1 ml, less than 0.5 ml, less than 0.3 ml, less than 0.1 ml, etc., and/or a volume that is at least 0.1 ml, at least 0.3 ml, at least 0.5 ml, at least 1 ml, at least 2 ml, at least 3 ml, at least 4 ml, at least 5 ml, at least 6 ml, at least 8 ml, at least 10 ml, at least 12 ml, at least 14 ml, at least 16 ml, at least 18 ml, at least 20 ml, etc.

In addition, fluids may be introduced into the nozzle, and product produced within the nozzle, at relatively high rates. For example, in certain embodiments, the rate of printing of product may be at least 0.1 mL/min, at least 0.3 mL/min, at least 0.5 mL/min, at least 1 mL/min, at least 3 mL/min, at least 5 mL/min, at least 10 mL/min, at least 30 mL/min, at least 50 mL/min, at least 100 mL/min, at least 300 mL/min, at least 500 mL/min, at least 1 L/min, at least 3 L/min, at least 5 L/min, at least 10 L/min, or at least 20 L/min. In some cases, the rate of printing may be no more than 25 L/min, no more than 20 L/min, no more than 15 L/min, no more than 10 L/min, no more than 5 L/min, no more than 3 L/min, no more than 1 L/min, no more than 500 mL/min, no more than 300 mL/min, no more than 100 mL/min, no more than 50 mL/min, no more than 30 mL/min, no more than 10 mL/min, no more than 5 mL/min, no more than 3 mL/min, no more than 1 mL/min, no more than 0.5 mL/min, no more than 0.3 mL/min, or no more than 0.1 mL/min. Combinations of any of these are also possible, e.g., the rate of printing may be between 5 L/min and 20 L/min. In addition, as discussed above, a fluid may contain particles (e.g., reinforcing particles) in some cases. In some cases, particles such as reinforcing particles can be introduced into the nozzle, e.g., without the presence of a fluid. For example, the particles (e.g., reinforcing particles) may enter the nozzle in a substantially dry state in certain embodiments.

Relatively small volumes such as these may be useful in certain embodiments to promote more complete mixing, e.g., such that the fluids and/or solids are substantially mixed together, and/or to promote smaller residence times within the mixer, for example, less than 30 s, less than 25 s, less than 20 s, less than 15 s, less than 10 s, or less than 5 s. In addition, relatively small volumes may be useful to more rapidly stop and/or alter the reactants (and/or additives, if present) within the nozzle or mixing chamber. In some instances, a smaller volume may be easier to control and/or alter the degree of mixing, e.g., to compensate for variable flowrates and system reactivities, or the like.

As mentioned, in certain embodiments of the invention, the nozzle may include a valve, such as a needle valve. In some cases, a valving system may be used to control fluid input into the nozzle and/or material exiting the nozzle. In certain instances, various components of the mixing system that come in contact with the material may be set up with a valving system.

The fluids and/or particles (if present) may be mixed until they are substantially mixed together in certain embodiments, e.g., having a relatively uniform appearance, or are substantially homogenous mixed. For instance, the fluids and/or particles (if present) may be mixed such that the individual fluids are evenly distributed relative to each other (e.g., upon exiting the nozzle). In some cases, after mixing, portions of the exiting mixture do not exhibit large or changing variations in relative distributions or ratios of one fluid relative to other fluids. However, in other cases, the fluids and/or particles (if present) may only be partially mixed together. In some cases, mixing within the nozzle may be passive, e.g., where the flow of fluids and/or particles (if present) into the nozzle causes the mixing of the fluids and/or particles within the nozzle. The nozzle may also contain, in some embodiments, baffles or other impediments to disrupt the flow of fluid and/or particles, e.g., to promote mixing.

As one non-limiting example, the geometry of the nozzle can be determined in certain embodiments for a given material set and flow rate such that the material exits the nozzle with a viscosity higher than the viscosities of any of the individual inputs but has not yet solidified. For instance, various polyols and the isocyanates can be selected to tune the material reactivity to suit the flow rate into the nozzle and the mixing volume, such that the materials begin to react as they are mixed and also remain fluid enough to be able to leave the nozzle at the outlet continuously. Other parameters, such as a catalyst or the temperature, may also be used to tune material reactivity. Non-limiting examples of methods of heating or cooling a nozzle are discussed in more detail below.

In some embodiments, material exiting the nozzle may pass through an opening which structures the printed line (e.g. continuously printing) or dose (e.g. dosing mode). The opening can be one of a variety of geometries including, but not limited to, circular, rectangular, star-shaped, any closed two-dimensional shape, multiple separate shapes (e.g., being fed from the same nozzle), or the like.

In addition, in some embodiments, the nozzle, mixing chamber, and/or the impeller may be at least partially coated with a non-stick surface to prevent material from building up on such surfaces. Examples of suitable coatings include, but are not limited to, polymeric coatings such as polyurethane or epoxy coatings, or ceramic coatings.

Figure 11:
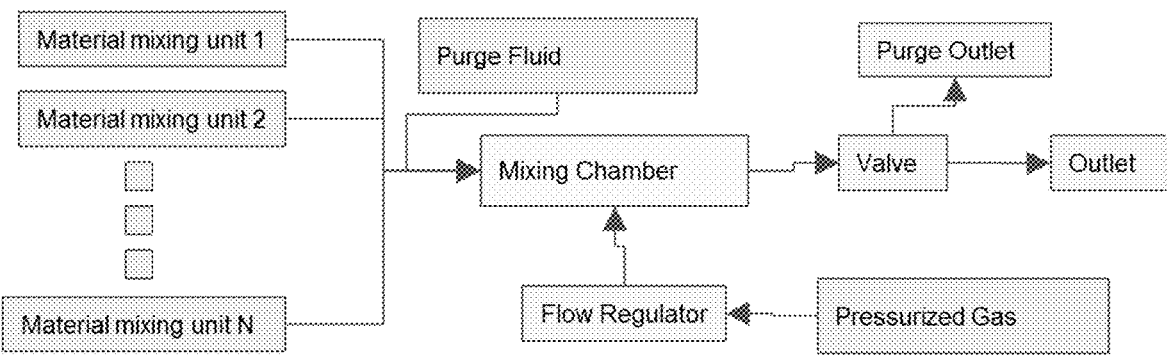
FIG. 11 illustrates an example nozzle architecture, in still another embodiment of the invention.
Figure 12:
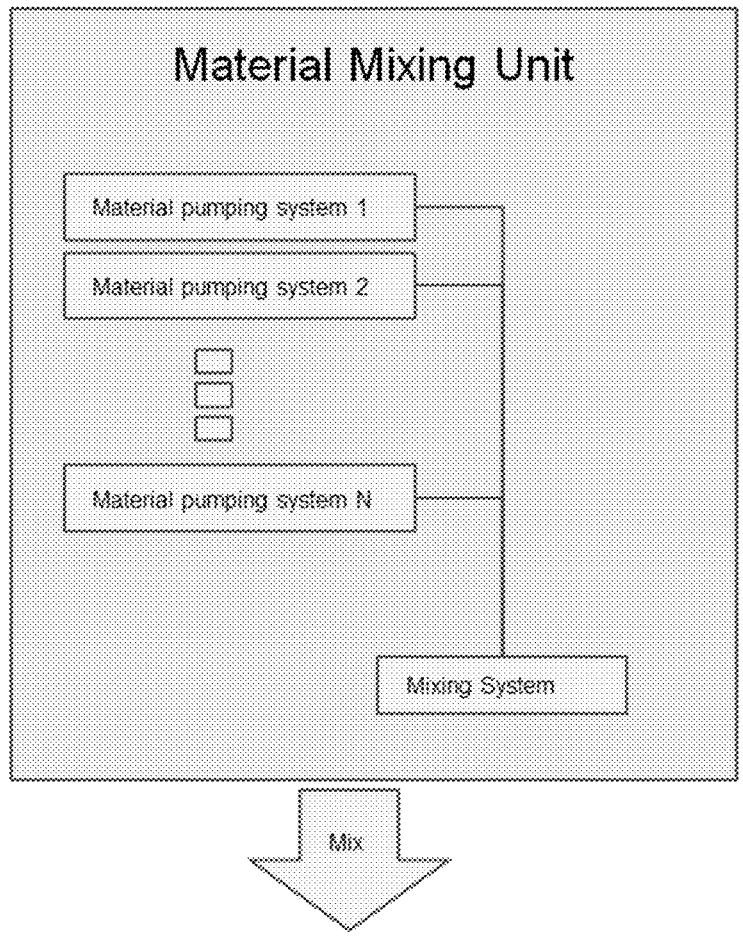
FIG. 12 illustrates an example material mixing unit architecture, in another embodiment of the invention.

One non-limiting example of an architecture for a nozzle can be seen in FIG. 11. In this figure, a plurality of mixing units may be used to mix various fluids, and such mixtures, and/or a purge fluid, may be combined within a mixing chamber (e.g., within a nozzle), along with gas (for example, from a suitable source, such as a pressurized gas tank, controlled using a flow regulator, a valve, or another suitable system. The product, after mixing, may be controllably released through a valve to an outlet, and/or purged (for example, when different materials are mixed, as discussed herein). An example of a material mixing unit can be seen in FIG. 12. A plurality of different pumping systems may be used to combine two or more fluids together within a mixing unit.

Figure 13A:
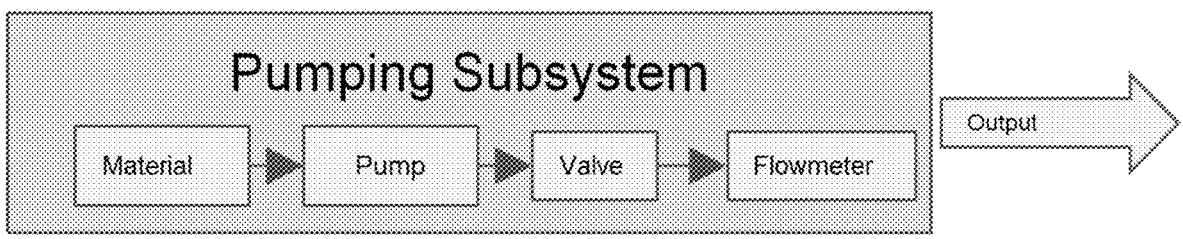
FIGS. 13A-13B illustrate examples of architectures for various subsystems in certain embodiments of the invention.
Figure 13B:
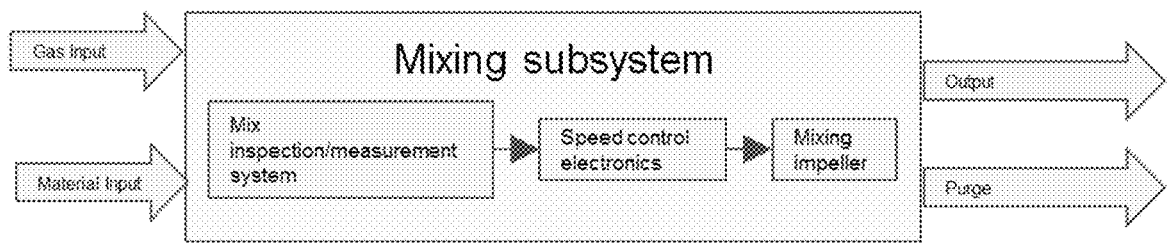

Examples of architectures for various subsystems in certain embodiments of the invention can be seen in FIG. 13. In FIG. 13A, an example architecture for a pumping subsystem is shown. Material may be controlled by a pump and/or a valve, and optionally monitored by a flowmeter or other suitable sensor, e.g., as discussed herein. FIG. 13B illustrates the architecture for a mixing chamber. This may include, for example, one or more inputs (e.g., a gas input or a fluid input), various sensors to for example, inspect or measure mixing, a controller to control the impeller, e.g., the speed and/or position, etc., which may lead to one or more outputs, e.g., a material output and a purge output.

It should be noted that these architectures are by way of example only, and in other embodiments, other architectures may be used, for example, for nozzles, mixing chambers, pumping subsystems, or the like.

In addition, in some embodiments, the composition or one or more of the fluids and/or particles (if present) may be changed during the mixing process, e.g., to produce a change or a gradient in properties in the product. For example, the ratio of two reactants may be changed during mixing, or one reactant may be replaced with another reactant during mixing, etc. In some cases, a first fluid may be changed to a different fluid in a continuous manner, e.g., without interruption. As another non-limiting example, particles (e.g., reinforcing particles) may be added to the nozzle and/or to a fluid entering the nozzle, and changed to different particles (e.g., reinforcing particles), e.g., without interruption.

Non-limiting examples of properties that may change within a product include pore or cell size, density, stiffness, hardness, degree of cross-linking, chemical composition, or the like. The change may be a step change, or a more gradual change, e.g., producing a gradient in a property. For example, a foam or other product may exhibit a first portion having a first property (e.g., average pore size) and a second portion having a second property. Thus, for example, the product may have a first average pore size and a second portion that solidifies into a foam having a second average pore size, wherein the first average pore size is at least 10%, at least 20%, at least 30%, at least 40%, at least 50%, etc. greater than the second average pore size. There may be a gradual or abrupt change between the portions. Other examples of properties that may change within a product include, but are not limited to, average largest dimension of particles (e.g., reinforcing particles), average concentration of particles (e.g., reinforcing particles), surface roughness, compression strength, slip resistance, and abrasion resistance.

As used herein, a portion of an article may refer to any collection of points within the article (i.e., points that are within the portion of space bounded by the external surfaces of the article). Portions of the article are typically, but not always, volumes of space within the article (in some embodiments, a portion may be a surface within an article, a line within an article, or a point within an article). Portions of the article may be continuous (i.e., each point within the portion may be connected by a pathway that does not pass through any points external to the portion) or may be discontinuous (i.e., the portion may comprise at least one point that cannot be connected to at least one other point within the article by a pathway that does not pass through any points external to the portion). Portions of an article may be substantially homogeneous with respect to one or more properties (e.g., one or more properties of the portion may vary with a standard deviation of less than or equal to 1%, 2%, 5%, or 10% throughout the portion), and/or may be heterogeneous with respect to one or more properties (e.g., one or more properties of the portion may vary with a standard deviation of greater than or equal to 1%, 2%, 5%, or 10% throughout the portion).

In some embodiments, one or more properties of a mixture that is 3D-printed from a nozzle may change as a function of time and/or nozzle position with respect to the substrate. For instance, the composition of one or more components and/or the wt % of one or more components within the mixture may change as a function of time. In some embodiments, one or more physical parameters of the nozzle and/or the substrate may change as a function of time. As an example, the temperature of the nozzle and/or the substrate may change as a function of time. Without wishing to be bound by theory, the temperature of the nozzle and the temperature of the substrate may affect the types of reactions that occur between various components (e.g., cross-linking reactions, foaming reactions, reactions within the nozzle, reactions on the substrate) and/or the rates at which these reactions occur. This may in turn affect the chemical structure of the mixture (e.g., the composition of the mixture, the degree of cross-linking of the resultant foam) during and/or after printing, and/or affect one or more physical properties of the mixture (e.g., the viscosity of the mixture, the average pore size of the resultant foam, the density of the resultant foam, the stiffness of the resultant foam, the hardness of the resultant foam) during and/or after printing. In some embodiments, changes in substrate or nozzle temperature during printing may allow for different portions of the 3D-printed article (e.g., those printed at different times and/or in different positions on the substrate) to have different chemical or physical properties. In some embodiments, the portions with different chemical and/or physical properties may be printed in a single continuous process, and/or may together form a single integrated material.

In one set of embodiments, active mixing processes may be used to mix the fluids. For example, an impeller or other mixing apparatus may be used to mix fluids within the nozzle, e.g., in a mixing chamber within the nozzle. (However, it should be understood that an impeller is not necessarily required in all embodiments.) The impeller, if present, may have any shape or size able to cause the mixing of fluids. For instance, the impeller may include one or more vanes, blades, propellers, paddles, holes, and/or cavities, or the like, which may be used to cause movement (e.g., spinning) of fluids within the nozzle. In one embodiment, an impeller may include internal channels that allow a gas or fluid to enter through the impeller into the mixing chamber or nozzle. For instance, the nozzle may include a spindle having one or more openings that allow gas or other fluids to be released.

In addition, the impeller may be fabricated out of any suitable material, e.g., metal, ceramic, a polymer, or the like. In some cases, the impeller itself may be 3D-printed. The impeller may be controlled using any suitable technique, e.g., by mechanically, electrically, and/or magnetically the impeller. In some cases, more than one impeller or other mixing apparatus may be used. Non-limiting examples of other mixing apparatuses and techniques include turbines or the application of ultrasound or additional fluids into the nozzle.

In addition, in some cases, no impeller or other mixing apparatus is used; for example, passive mixing techniques, such as controlling channel geometries or input flows, may also be used. For instance, ratios and/or compositions of incoming fluids may be controlled to control mixing, e.g., within a nozzle or mixing chamber. Combinations of mixing systems may also be used in certain embodiments, including combinations of active systems, or combinations of active and passive systems, for example, including any of the active or passive systems described herein.

In some cases, an impeller (or other mixing apparatus) may sweep through the nozzle or the mixing chamber such that the closest distance between the impeller as it travels and the wall of the nozzle or mixing chamber is less than 10 mm, less than 5 mm, less than 3 mm, less than 1 mm, less than 0.5 mm, less than 0.3 mm, less than 0.1 mm, less than 0.05 mm, less than 0.0.3 mm, less than 0.01 mm, less than 0.005 mm, etc. In some cases, the impeller may come into contact with the wall, although in other cases, the impeller may be at least 1 mm, at least 3 mm, at least 5 mm, or at least 10 mm away from the wall as it travels. In some cases, the impeller or other mixing apparatus may be one that substantially conforms to the shape of the nozzle or the mixing chamber in which the impeller or other mixing apparatus is located. For instance, the impeller may, upon rotation, sweep through a volume that is at least 50%, at least 60%, at least 70%, at least 80%, at least 90%, or at least 95% of the volume of the nozzle or the mixing chamber.

The impeller, if used, may be rotated at any suitable speed. For example, the impeller may be rotated at a speed of at least 5 rpm, at least 10 rpm, at least 20 rpm, at least 30 rpm, at least 40 rpm, at least 50 rpm, etc. In some cases, much higher rotation speeds may be used, e.g., at least 100 rpm, at least 200 rpm, at least 300 rpm, at least 500 rpm, at least 750 rpm, at least 1000 rpm, at least 2000 rpm, at least 3000 rpm, at least 5000 rpm, at least 7500 rpm, or at least 10,000 rpm. Higher rpm speeds may be useful in certain embodiments to create a froth or a foam. In some (but not all) embodiments, the impeller may be rotated at an rpm speed that is at least 16 times the residency time of the material in the mixing chamber or the impeller (for example, if the residency time is 10 seconds, then the rpm speed may be at least 160 rpm). In some cases, the impeller may be rotated at variable speeds. For instance, the impeller may be rotated at different speeds to control the formation or various properties of the foam or other product, and/or the impeller may be rotated to control the rate at which a material is deposited onto a substrate from the nozzle. In addition, in some cases, the impeller may be rotated at a speed that increases or decreases with respect to time. In some cases, changing the rotation speed of the impeller with respect to time may be used to alter a property of the foam or other product, e.g., from a first portion to a second portion. An example of a system that can be used to control the speed of the impeller can be seen in Int. Pat. Apl. Pub. No. WO 2016/164562, incorporated herein by reference.

In addition, in some embodiments, the impeller may be at least partially coated with a non-stick surface to prevent material build-up, as discussed herein.

In some cases, the impeller shape has a shape that allows it to fill the majority of the volume of the mixing chamber, such that the mixing volume is relatively small. When the mixing volume is relatively small, the material may have a relatively short residency time in the mixer, and the material properties or gradient structures can be varied quickly. In some cases, the free volume of the mixing chamber or nozzle (i.e., the volume therein not occupied by the impeller) may be less than 20 ml, less than 18 ml, less than 16 ml, less than 14 ml, less than 12 ml, less than 10 ml, less than 8 ml, less than 6 ml, less than 5 ml, less than 4 ml, less than 3 ml, less than 2 ml, less than 1 ml, less than 0.5 ml, less than 0.3 ml, less than 0.1 ml, etc. Thus, for example, in some embodiments, the impeller has a conical shape, e.g., if the mixing chamber or nozzle has a conical shape. In addition, in some cases, the impeller may be positioned such that the impeller as it travels has a distance from the wall of the nozzle or mixing chamber as discussed herein.

In one set of embodiments, the position of the impeller can be controlled or altered, for example, before or during mixing. The impeller may be actuatable with respect to the position of the mixing chamber, e.g., such that the mixing volume can be changed at any point to account for variable flowrate, thus keeping the residency time in the mixing chamber constant. For example, an actuator or servo may be able to move the impeller laterally within the mixing chamber, or towards an outlet, for example, during mixing or rotation of the impeller. In addition, in some cases, the impeller speed can be varied, such that the material experiences a fixed number of impeller rotations per residency time in the mix chamber.

In certain embodiments, the impeller can be used as a valve. For example, the end of the impeller may be directed into the outlet of the nozzle to block and close the nozzle, thereby preventing or controlling flow out of the chamber. For instance, the impeller may be directed forward (into the outlet) to prevent flow, and/or moved various distances relative to the outlet to allow different flows of fluid out of the nozzle.

In one set of embodiments, the nozzle and/or the mixing chamber may be heated or cooled. In some cases, the temperature of mixing may be controlled, for instance, to allow for uniform mixing, to facilitate reaction of fluids therein (e.g., to an optimum or desired temperature), to remove excess heat (e.g., contributed by a chemical reaction, the spinning of an impeller, etc.), or the like. Various methods can be used to add heat or remove heat from the nozzle or the mixing chamber. For example, a heat source may be positioned to deliver heat to the nozzle or mixing chamber, or to one or more fluids entering therein. Examples of heat sources include electrically resistive heaters, infrared light sources, or heating fluids (e.g., which can transmit heat using a heat exchanger or the like). In some cases, more than one heat source may be used. Similarly, a variety of cooling sources can be used in some embodiments to remove heat from the nozzle or mixing chamber. Non-limiting examples include Peltier coolers or cooling fluids (e.g., which can remove heat using a heat exchanger or the like).

Heating and/or cooling may, for example, be used to control mixing and/or reaction within the material, to keep the temperature at substantially the temperature of the surrounding environment (e.g., at room temperature), to prevent the surrounding environmental conditions and/or the heat generated by friction of the impeller and exotherm of the material curing from affecting the reaction or the printing parameters, or the like. In some cases, the temperature may be altered by at least 5° C., at least 10° C., at least 15° C., at least 20° C., or by other ranges such as those discussed herein. In other embodiments, however, the temperature may be controlled or altered by no more than 20° C., no more than 15° C., no more than 10° C., no more than 5° C., etc. relative to the incoming fluids or the surrounding environmental conditions.

In addition, in some embodiments, one or more sensors may be present, e.g., within the nozzle or mixing chamber, within an outlet, within the substrate, or within sensing communication of the nozzle, mixing chamber, outlet, and/or substrate. Such sensors may be used to determine a property of the incoming fluids, the mixing process, and/or the exiting material (for example, the flowrate), e.g., qualitatively and/or quantitatively. In some cases, such information may be used to control the process, e.g., by controlling the flow of fluid into the nozzle or mixing chamber, the mixing speed (e.g., of an impeller), the flow exiting an outlet, the opening and closing of a valve at the outlet, or the like. Non-limiting examples include temperature sensors (e.g., thermocouples, infrared cameras, or the like), pressure transducers, photodiodes, colorimetric sensors, etc. In addition, more than one sensor can be used in some cases.

Fluid, or solid particles, or a semi-solid paste, may be introduced into the nozzle or mixing chamber from one, two, three, or more inputs, in one set of embodiments. The inputs may independently have the same or different distances from the outlet of the nozzle or mixing chamber. As an example, two inputs may be near the top of a nozzle or mixing chamber, e.g., to allow two fluids to mix, and additional inputs may be lower, e.g., to introduce additional components (for instance, additives) as the fluids flow down the mixing chamber. As various non-limiting examples, this may be useful to allow reactions to occur in a certain order, to build viscosity first before starting to foam, to mix surfactants before adding filler, to mix ingredients prior to adding a catalyst, or the like.

In some embodiments, one or more of the inlets may be controlled using one or more valves or other apparatuses. In some cases, the valves may be controlled using a computer or other controller, e.g., as discussed herein. Thus, for example, valves may be used to control flow into (and/or out of) the nozzle. In some cases, valves may be used to control the flow of fluids through channel intersections, e.g., to keep fluids from reacting or curing too early (e.g., by creating a cured skin at the interface of an inactive channel). Examples of valves that can be used include, but are not limited to, needle valves, ball valves, gate valves, butterfly valves, and the like. The valves can independently be controlled, e.g., by electrical actuation, pneumatic actuation, or the like. In addition, in some cases, an impeller (if present) may be used as a needle valve, e.g., in conjunction with an outlet, as discussed herein.

The entering fluid may be gas, a liquid, a viscoelastic material, and/or any other flowable or deformable material. In some cases, the fluid may also contain particles such as reinforcing particles, including those discussed above. In addition, the entering fluid may include combinations of any of these in certain embodiments. In some cases, two or more fluids may be mixed prior to delivery, e.g., as discussed in detail herein. However, in some cases, two or more fluids may not be mixed prior to delivery. For instance, two or more inlets into the nozzle or mixing chamber may be used to introduce two or more separate fluids. These fluids can then be mixed in the nozzle or mixing chamber.

The fluids may be delivered using any suitable technique, and the same or different techniques may be used to delivery different fluids. For instance, fluids may be delivered passively (i.e., by gravitational flow), or actively (for example, by using pumps such as progressive cavity pumps, auger pumps, gear pumps, or the like). In some embodiments, the fluids may delivered using input channels that may have features to create turbulent flow and/or to cause passive mixing, e.g., as fluid flows through the channels. This may be useful, for example, in causing some mixing (for example, of a fluid with an additive) in order to occur prior to entry into a nozzle or mixing chamber such as described herein. In some cases, as mentioned, the nozzle may also include particles such as reinforcing particles, which may be incorporated into the final product, e.g., as a composite material.

In some cases, active mixing may be used to control the delivery of different fluids and/or particles (if present). This may be useful, for example, for mixing fluids entering in at different flowrates (e.g., as in a 4:1 or 10:1 ratio), different viscosities, or the like. For example, in some cases, fluids that may be used include fluids that have relatively high viscosities, or viscoelastic solids that exhibit a yield stress, etc.

In some cases, a gas and a liquid may be mixed within the nozzle, e.g., as discussed above, to produce a froth. The gas may be added to the nozzle, and/or generated within the nozzle. The froth may comprise bubbles or pockets of gas dispersed within the fluid. The bubbles within the froth may be dispersed relatively uniformly or homogenously, or may have a relatively small average size. For example, the average bubble size within the froth may be less than 10 mm, less than 5 mm, less than 3 mm, less than 1 mm, less than 500 micrometers, less than 400 micrometers, less than 300 micrometers, less than 200 micrometers, less than 100 micrometers, less than 50 micrometers, less than 30 micrometers, less than 10 micrometers, less than 5 micrometers, etc. in average or characteristic diameter and/or the average bubble size may be at least 1 micrometer, at least 2 micrometers, at least 3 micrometers, at least 4 micrometers, at least 5 micrometers, at least 10 micrometers, at least 30 micrometers, at least 50 micrometers, at least 100 micrometers, at least 300 micrometers, at least 500 micrometers, at least 1 mm, at least 3 mm, at least 5 mm, etc. The bubbles may also exhibit a relatively uniform distribution of sizes, for example, such that at least 80%, at least 90%, or at least 95% of the bubbles within a sample of froth have an average diameter that is between 80% and 120%, or between 90% and 110% of the average bubble diameter. The gas may be introduced as one of the fluids entering the nozzle, and/or generated through chemical reaction of fluids within the nozzle. Non-limiting examples of gases that may be used include air, carbon dioxide, nitrogen, argon, or the like. In some cases, the froth may be deposited onto a substrate, e.g., as discussed herein. The froth may, in some embodiments, comprise at least 20%, at least 30%, at least 40%, or at least 50% by volume of gas. In addition, in some cases, the froth may also contain particles (e.g., reinforcing particles).

In some cases, the nozzle may include more than one fluid that can be mixed with the gas. For example, in one embodiment, reactive fluids or fluids that contain surfactants that facilitate the introduction of the gas as bubbles in the fluids may be used. Examples of surfactants are discussed in more detail below. In some cases, mixing may occur relatively rapidly (for example, by spinning the mixing impeller at high velocity), and the froth would be in its near final form upon exiting the mixing nozzle. The froth may then be deposited or hardened to form a foam. The density of the froth (or the subsequent foam) can be varied by varying the ratio of the gas to the liquid. The mean bubble size in the froth (or the foam) can be varied, for example, by changing the impeller rotational velocity and/or the residence time in the nozzle or mixing chamber. The mechanical properties of the foam can also be changed, for example, by varying fluid compositions entering the nozzle during the formation process (for example, the ratio of isocyanate to polyol).

In some cases, producing froths or other materials containing gas within the nozzle, e.g., by mixing within the nozzle, may allow control over the froth or subsequent product that is formed. For instance, rheological properties may be controlled or altered by controlling mixing and/or the introduction of fluids within the nozzle. Froth development also may be at least somewhat independent of reaction rates, as it can be partially controlled by controlling external factors such as the mixing rate, e.g., at least in embodiments where no gas is produced by reaction (although in other embodiments, gases that contribute to the froth may desirably be produced by reaction).

In one set of embodiments, a material (for example, a froth), when deposited onto a substrate, may have a variety of rheological properties. For instance, the material may be substantially fluid and able to flow, e.g., to conform a mold or other substrate to which it is deposited. In some cases, the material may have a viscosity of less than less than 1,000 cP, less than 500 cP, less than 300 cP, less than 100 cP, less than 50 cP, less than 30 cP, or less than 10 cP. The material may also be Newtonian or non-Newtonian. In other embodiments, however, the material may exhibit some degree of solidity or elasticity, e.g., having a non-zero yield stress, and/or by exhibiting at least some resistance to a distorting influence or deforming force that is applied to the material. In some cases, the material may be sufficiently solid as to be able to define or hold a shape. For instance, the material may be sufficiently solid such that it deforms from its original shape by less than 10% (by volume) after deposition on a substrate, e.g., within 30 seconds after printing onto the substrate.

The substrate may be any suitable target for a material exiting a nozzle. In some cases, the substrate is planar, although in other cases, the substrate is non-planar. For instance, the substrate may be a mold (e.g., the mold of a shoe), to which a material may be introduced. In some cases, the material may be relatively fluid and able to conform to contours within the substrate (e.g., if the substrate is a mold). However, in other cases, the material may be relatively solid, e.g., having a defined shape, upon deposition onto the substrate, such as is discussed herein.

In some cases, the substrate may also be heated or cooled, e.g., to promote or inhibit a reaction, to cause solidification to occur, or the like. In some cases, the temperature may be altered by at least 5° C., at least 10° C., or by other ranges such as those discussed herein. Any method may be used to heat or cool the substrate. For example, heat or cooling sources may be used to apply heat or cooling to the substrate, the substrate may be contained within a heated or cooled environment, or a source of a heated or cooled fluid may be used to heat or cool the substrate, e.g., via a heat exchanger).

In one embodiment, radiant light or infrared radiation may be applied to the substrate for heating.

As a non-limiting example, in one embodiment, a two-stage foaming system that implements two foaming types may be used. For example, using mechanical frothing in the nozzle may be used to mix a Newtonian liquid with a blowing agent into a printable viscoelastic foam formulation. After deposition, the polymer in the foam may be completely or partly cured. The temperature of the polymer can be raised to drive the decomposition of the blowing agent, and the subsequent expansion of the foam.

As another non-limiting example, a nozzle involving mechanical frothing may be used to create a foam having a yield stress that behaves viscoelastically. After deposition, the foam may be heated to achieve further expansion of the foam. This secondary expansion can be carried out, for example, using an agent, such as azodicarbonamide. For example, one or more inputs can be used to deliver a polyol loaded with surfactant and a blowing agent into a nozzle, which are then mixed together, e.g., such that a froth is formed.

Figure 3:
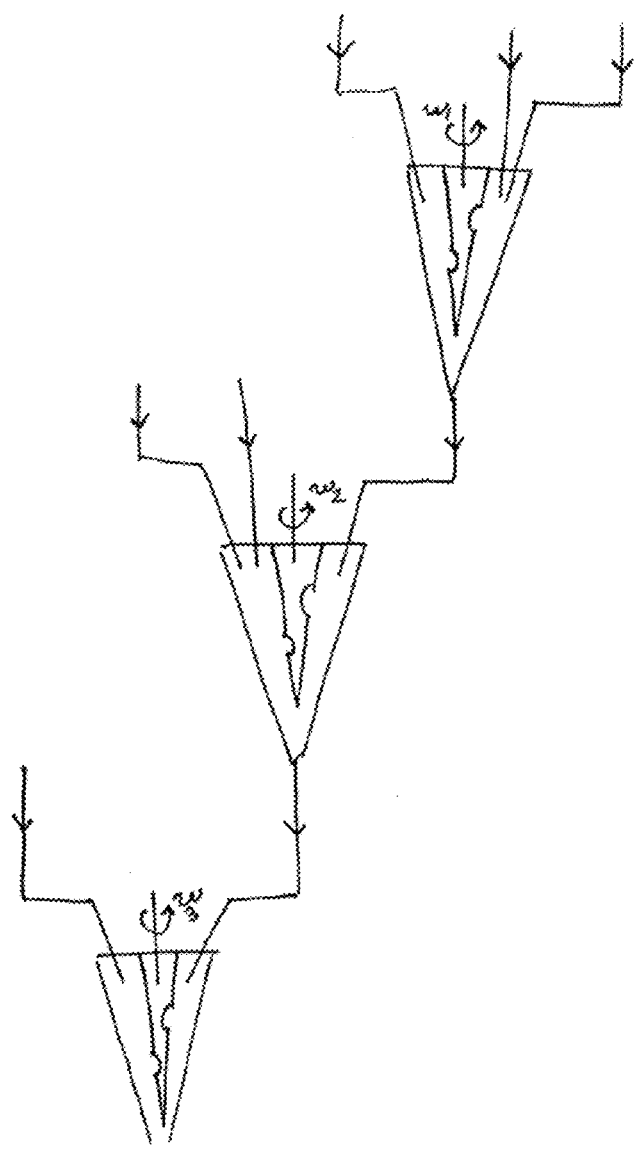
FIG. 3 illustrates a system comprising multiple mixing chambers, in yet another embodiment of the invention.

In some aspects, two or more fluids may be mixed prior to introduction into a nozzle. In some cases, the fluids may be mixed in a second nozzle or mixing chamber (e.g., separate from the first nozzle), and in some cases, a series of mixing chambers may be used, in any arrangement, e.g., in series and/or parallel. Thus, in some embodiments, more than one stage of mixing or combining fluids may be used. As non-limiting example, FIG. 2 shows a mixing chamber that outputs into an input of a printing nozzle, while FIG. 3 shows two mixing chambers in series with a printing nozzle. In one set of embodiments, the mixing chambers may be in nozzles similar to the printing nozzles described herein, e.g., having any of the dimensions described herein with respect to printing nozzles, and optionally with an impeller, e.g., as described herein with respect to printing nozzles. However, in other embodiments, the mixing chambers may have substantially different shapes and/or sizes. If two, three, or more impellers are present, the impellers may be independently controlled in some instances.

Mixing within a mixing chamber may be relatively complete, or may be partial in some cases. In addition, in some cases, no mixing may occur in a mixing chamber, other than incidental mixing or diffusion (for example, as two fluids come into contact with each other). As noted above, more vigorous mixing can occur within the printing nozzle, which may lessen the need for complete mixing to occur upstream. However, in other embodiments, more complete mixing may occur within one or more mixing chambers upstream of the printing nozzle.

In some aspects, one or more purge fluids may be used to purge one or more of the inlets, outlets, nozzles, and/or mixing chambers, etc. For example, a purge fluid may be passed through one or more of these when they are not actively being used to mix or print, and/or to clear fluids so that different fluids can be used. For instance, a purge fluid may flow through an inlet when switching the inlet from a first fluid source to a second fluid source, e.g., to purge residual fluid from the first fluid source that may be present. The purge fluid may flow through the nozzle in some cases, and/or be removed prior to the nozzle. Non-limiting examples of purge fluids include gases such as air, carbon dioxide, nitrogen, argon, or the like, and/or liquids such as water (which may be pure, contain one or more additives such as surfactants in some cases, etc.). Purge fluids could also be a non-reactive paste such as petrolium jelly or a viscous silicone oil or paraffin wax, or an aqueous or alcohol based gel such as pluronic or carbopol. Combinations of purge fluids may also be used in some embodiments.

As a non-limiting example of use of a purge fluid, a nozzle may have a first inlet and a second inlet, in which two fluids (A and B) are reacted together to produce a first product. The nozzle may also be used to produce a second product also formed from two fluids (A' and B'), where one or both of A' and B' are different than A and B. Both A and A' may be introduced using the first inlet, while B and B' may be introduced using the second inlet. To avoid contamination of A with A' and/or B with B', one or more purge fluids may be introduced between introducing A and A' to the nozzle and/or B and B' to the nozzle. In some cases, sufficient purge fluid may be introduced to clear the entire nozzle or mixing chamber between different fluids, although in other cases, some degree of contamination may be deemed to be acceptable, e.g., the purge fluid may be used to reduce but not completely eliminate contamination. The introduction of more than one fluid into an inlet may be controlled using any suitable technique; e.g., one or more fluid sources may be able to be placed in fluid communication with an inlet, where control of such fluid communication may be controlled using one or more valves (e.g., needle valves or other valves such as those discussed herein), which in some cases may be controlled using a computer or other controller.

Figures 5, 6:
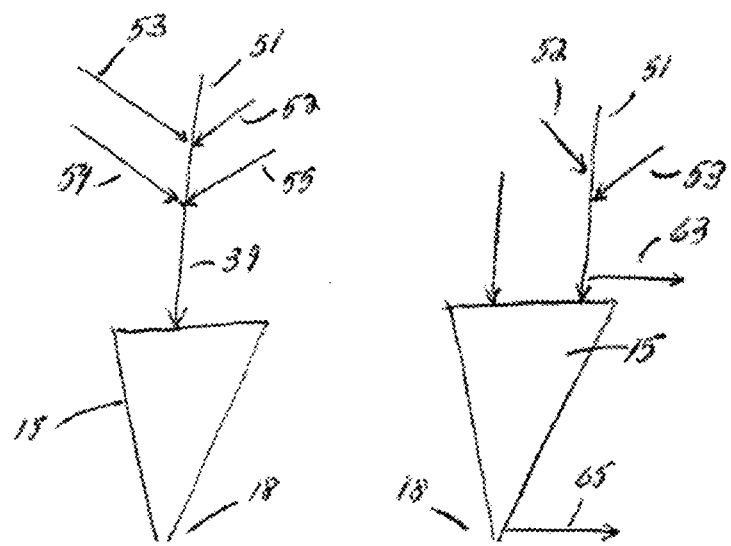
FIG. 5 illustrates a system comprising a single input, in accordance with another embodiment of the invention.
FIG. 6 illustrates an input comprising a purge system, in still another embodiment of the invention.

As a non-limiting example, FIG. 5 illustrates the use of a nozzle or mixing chamber with only one input. In this figure, nozzle 15 includes an outlet 18 and a single input 39. However, in fluidic communication with input 39 are a plurality of different sources of fluid 51, 52, 53, 54, and 55. (Five sources are provided here by way of example only, but more or fewer sources may be used in other embodiments.) In this figure, source 51 may be, for example, a purge fluid, while sources 52, 53, 54, and 55 may be sources of various fluids or reactants to be introduced into nozzle 15. As a non-limiting example, different combinations of reactants may be introduced into the nozzle from the different sources of fluid, while purge fluid from source 51 may be used to purge inlet 39 between different fluids, e.g., to reduce contamination.

FIG. 6 illustrates a system in which a purge fluid may be withdrawn at various locations. In this figure, nozzle 15 includes an inlet 31 in fluid communication with a source of purge fluid 51 and a sources of other fluids 52 and 53. (Two are shown here for explanatory purposes, but more or fewer sources may be used in other embodiments.) Also shown in this figure are outlets 63 and 65, in addition to outlet 18 of the nozzle. The flow of fluid may be controlled by one or more valves or other apparatuses, e.g., controlled by a computer or other controller. Thus, in this example, a purge fluid may be introduced from fluid source 51 and controllably withdrawn using outlet 63 (i.e., without entering nozzle 15), outlet 65 (i.e., passing through nozzle 15 but not outlet 18), or outlet 18. Other purge configurations are also possible in other embodiments.

In various aspects, a variety of foams or other products (such as composites) may be produced. For example, in some embodiments, a foam may be created from a foam precursor comprising a polymer and a cross-linking agent. The polymer can comprise polyol such as a low number average molecular weight diol, high number-average molecular weight diol, a low number-average molecular weight triol, a high number-average molecular weight triol, or a high number-average molecular weight monol. For instance, a high molecular weight monol, diol, or triol may have a number-average molecular weight of greater than 300, 400, or 500, while a low molecular weight monol, diol, or triol may have a number-average molecular weight less than 300, 400, or 500. Other examples of polymers include, but are not limited to, epoxies, acrylates, cyanate esters, silicones, polyesters, phenolics, hydrogels, or the like.

In one set of embodiments, the polymer includes a polyurethane, e.g., formed by reacting the polyol with an isocyanate. The polyol may be any suitable polyhydroxy compound. For example, the polyol may be a hydroxy-terminated ester, ether or carbonate diol, or a hydroxyl-terminated polybutadiene polymer. Non-limiting examples of polyalkylene ether glycols include polyethylene ether glycols, poly-1,2-propylene ether glycols, polytetramethylene ether glycols, poly-1,2-dimethylethylene ether glycols, poly-1,2-butylene ether glycol, and polydecamethylene ether glycols. Examples of polyester polyols include polybutylene adipate and polyethylene terephthalate. Examples of polycarbonate diols include polytetramethylene carbonate diol, polypentamethylene carbonate diol, polyhexamethylene carbonate diol, polyhexane-1,6-carbonate diol and poly (1,6-hexyl-1,2-ethyl carbonate)diol. However, many other suitable polyhydroxy compounds can also be used depending upon the desired application. Any suitable polyol, polythiol or polyamine or mixture thereof that is suitable for this purpose may be used, such as, for example, mixed diols comprising a 2,4-dialkyl-1,5-pentanediol and a 2,2-dialkyl-1,3-propanediol. Specific examples of 2,4-dialkyl-1,5-pentanediols include 2,4-dimethyl-1,5-pentanediol, 2-ethyl-4-methyl-1,5-pentanediol, 2-methyl-4-propyl-1,5-pentanediol, 2,4-diethyl-1,5-pentanediol, 2-ethyl-4-propyl-1,5-pentanediol, 2,4-dipropyl-1,5-pentanediol, 2-isoptopyl-4-methyl-1,5-pentanediol, 2-ethyl-4-isoptopyl-1,5-pentanediol, 2,4-diisopropyl-1,5-pentanediol, 2-isopropyl-4-propyl-1,5-pentanediol, 2,4-dibutyl-1,5-pentanediol, 2,4-dipentyl-1,5-pentanediol, 2,4-dihexyl-1,5-pentanediol, and the like. Specific examples of 2,2-dialkyl-1,3-propanediols include 2,2-dipentyl-1,3-propanediol, 2,2-dihexyl-1,3-propanediol and the like.

In some cases, longer-chain or higher molecular weight polyols may be used to produce relatively softer materials because they have more polyol relative to isocyanate. In some cases, the isocyanate can also be underindexed compared to the number of reactive sites on the polyol to make a softer foam that behaves less elastically.

The cross-linking agent, if present, can comprise an isocyanate in some cases, and/or an isocyanate prepolymer. An isocyanate may have more than one functional isocyanate group per molecule and may be any suitable aromatic, aliphatic or cycloaliphatic polyisocyanate. In some cases, the isocyanate is a diisocyanate. One non-limiting example is an organic diisocyanate, such as methylene diphenyl diisocyanate. Additional examples of organic diisocyanates include 4,4'-diisocyanatodiphenylmethane, 2,4'-diisocyanatodiphenylmethane, isophorone diisocyanate, p-phenylene diisocyanate, 2,6-toluene diisocyanate, polyphenyl polymethylene polyisocyanate, 1,3-bis(isocyanatomethyl)cyclohexane, 1,4-diisocyanatocyclohexane, 1,6-hexamethylene diisocyanate, 1,5-naphthalene diisocyanate, 3,3'-dimethyl-4,4'-biphenyl diisocyanate, 4,4'-diisocyanatodicyclohexylmethane, 2,4'-diisocyanatodicyclohexylmethane, and 2,4-toluene diisocyanate, or combinations thereof. In some cases, an isocyanate prepolymer may be used, e.g., in addition to and/or instead of an isocyanate. For instance, where two isocyanates are added to the ends of a polyol, so it still has functionality of two, but with a higher molecular weight.

In addition, it should be understood that a cross-linking agent is not required. For example, in some embodiments a polymer (such as a thermoplastic polyurethane) can be mixed with fillers and frothed in a nozzle or a mixing chamber, then cooled upon exiting to form a foam.

In some embodiments, no foam is produced and a cross-linked product results. As a non-limiting example, a high number-average molecular weight diol may be mixed with an isocyanate (e.g., a diisocyanate, or other isocyanates described herein) and deposited onto a substrate, e.g., to produce a thermoplastic elastomer. In another embodiment, a low number-average molecular weight diol can be mixed with an isocyanate and deposited onto a substrate, e.g., to produce a rigid thermoplastic. In yet another embodiment, a high number-average molecular weight diol and a high number-average molecular weight triol can be mixed, and then the polyol mixture mixed with an isocyanate and deposited onto a substrate, e.g., to produce a flexible thermosetting elastomer with high resiliency.

In some embodiments, the foam precursor comprises a polyurethane, an epoxy, a silicone, a cyanoacrylate, an adhesive, a cyanate ester, a polyester, a polyimide, a phenolic, or another suitable material. In another embodiment, the foam precursor could comprise a decomposeable binder and particles which stabilize the bubble interface. In some cases, the particles may be sintered at the bubble interface to form a non-polymeric foam, e.g., a metal foam or a ceramic foam.

As a non-limiting example of a foam, in one embodiment, a high number-average molecular weight diol and a high number-average molecular weight triol are mixed with a surfactant, and then the polyol-surfactant mixture is mixed with an isocyanate. The foam precursor that results may be mixed with nitrogen, or another gas, and deposited onto a substrate. Mixing techniques such as those discussed herein, e.g., involving more than one stage of mixing or combining fluids, may be used.

As yet another non-limiting example, a high number-average molecular weight diol and a high number-average molecular weight monol are mixed with a surfactant, and then the polyol-surfactant mixture is mixed with an isocyanate. Mixing techniques such as those discussed herein, e.g., involving more than one stage of mixing or combining fluids, may be used. The foam precursor that results is then mixed with nitrogen, or another gas, and deposited onto a substrate. This may be used to produce memory foam, or other types of foam.

As mentioned, in some embodiments, a surfactant may be used to produce a foam or other product as discussed herein. For example, a surfactant may be used to facilitate the introduction of gas into a fluid, the subsequent stability of the bubbles that are formed, and/or the rheology of the foam can be altered or tuned using various surfactants, or altering their concentration, etc. For instance, in one embodiment, a surfactant may be used that comprises a first moiety with affinity for an air-liquid interface, e.g., to facilitate the introduction of gas into a fluid. Non-limiting examples of such surfactants include sodium stearate, sodium dodecyl sulfate, or silicone-based surfactants such as silicone polyethers. Many such surfactants are widely available commercially.

In some cases, a surfactant molecule may be used that allows production of a high yield stress foam, e.g., a foam able to maintain its shape after deposition on a substrate. For example, in some embodiments, a high-yield stress inducing surfactant is one where the end of the surfactant is more soluble in the continuous phase of the foam precursor. The surfactant may have a relatively high molecular weight, and may be non-ionic. Non-limiting examples of such surfactants include surfactants with a molecular weight of greater than or equal to 1500 Daltons. In addition, in some cases, a surfactant molecule may be used that allows production of a low yield stress foam, e.g., a foam unable to maintain its shape after deposition on a substrate, and the foam may conform to the material around it after deposition. In some embodiments, a low-yield stress inducing surfactant is one where the soluble end may be either charged or have a relatively low molecular weight, e.g., such that no entanglement between the surfactants is able to occur. Non-limiting examples of such surfactants include surfactants with a low molecular weight (e.g., silicone surfactants with a low molecular weight). In addition, in some embodiments, different types of surfactants may be used, e.g., a high yield and a low yield surfactant. By varying the relative concentration of the first surfactant and the second surfactant in the mixture, the resultant foam may vary from high yield stress to low or no yield stress, depending upon the application.

In certain embodiments, the first surfactant molecule may comprise a first moiety having an affinity for an air-liquid interface, and a second moiety that comprises a long chain that is soluble in the foam precursor and prone to entanglement. The second surfactant molecule may, in some instances, comprise the same first moiety with affinity for the air-liquid interface, and a second moiety that comprises a short chain with an electrostatic charge. The electrostatic charge may in some cases be such that the cells of the closed-cell foam repel one another and can move freely past one another.

The cell-forming agent, in some embodiments, forms cells within a material such as a foam or froth, as discussed herein. For instance, the cell-forming agent may comprise water, and/or a gaseous material such as air, carbon dioxide, nitrogen, butane, or the like. In some embodiments, the cell-forming agent comprises a blowing agent that is added that can generate a gas, e.g., chemically. The microfluidic printing nozzle may disperse the blowing agent in a material, for example a polymer, to form a two-phase mixture of blowing agent cells within the polymer. Thus, the blowing agent can comprise a material that decomposes into a gas, e.g., at an elevated temperature. In some cases, the blowing agent can comprise a gaseous material that maintains its liquid state by cooling or pressurization, and reverts to its native gas state when the pressure is released or the blowing agent is heated, which may cause the blowing agent to form a gas, e.g., to cause cells in the polymer to grow. The resultant gas may become trapped in cells within the material, e.g., forming a foam.

As an example of use of a blowing agent, the microfluidic printing nozzle may mix a blowing agent with a material, for example a polymer, which may undergo a chemical reaction to cause the formation of a gas. Chemical blowing agents may include generally low molecular weight organic compounds that decompose to release a gas such as nitrogen, carbon dioxide, or carbon monoxide. Non-limiting examples of chemical blowing agents include azo compounds such as azodicarbonamide.

Thus, in some cases, the blowing agent can be used to create foams that form cells by induction by heat, removal of pressure, or the like. For instance, a foam precursor can be mixed with the blowing agent and deposited onto a substrate or part without forming cells until after deposition, or with only partially formed cells. Thus, in some cases, material may be deposited onto a substrate, then induced to form cells by heating the material. After deposition, cells may form within the product, e.g., by induction by heat, removal of pressure, or the like.

As a non-limiting example, a foam may comprise an ethylene-vinyl acetate foam, which may be utilized in footwear or other applications. A blowing agent may be selected such that the agent phase-transitions into a gas at a temperature at which the polymer containing it is soft and malleable. In some cases, the polymer can expand (e.g., expand up to 600%) as the cells form without rupturing, and the resultant material can be cooled to form a solid foam.

As another example, water may be used in another embodiment as a cell-forming agent. For example, a water-blown foam may be produced where water and a surfactant are mixed into a polymer component, which is then mixed with isocyanate or another substance able to react with water, e.g., to produce a gas. For instance, as a non-limiting example, isocyanate chemically reacts with both water and polyol; the reaction of polyols with isocyanate may be used to increase the molecular weight of the polymer, e.g., to form a polyurethane, while the reaction of water with the isocyanate forms carbon dioxide gas. The carbon dioxide gas becomes trapped in the polymer as it solidifies, and a foam is thus created. In some cases, the amount of water may be controlled to control the properties of the resulting foam, such as density or cell size, e.g., during the reaction process.

As yet another non-limiting example, a blowing agent that decomposes very slowly with time may be selected, such that a foam may be very slowly inflated without any heating required. In some cases, this may result in a foam with improved in rebound properties (e.g., compression strength) versus a substantially similar foam where heat was applied to activate the blowing agent, resulting in a higher performing article for use in footwear.

In addition, in some embodiments, a material may be deposited onto a substrate, e.g., to fill a mold, then the mold may be sealed and the blowing agent induced to form a foam, which may then start to fill in the mold as the foam expands.

In some embodiments, additives are introduced into the mixture. They may be introduced at any suitable point, for example, directly into a nozzle or mixing chamber (e.g., through one or more separate inlets), or upstream of the nozzle or mixing chamber (e.g., using a series of mixing chambers, as described herein). In some embodiments, an additive may be added directly to another fluid (e.g., without necessarily requiring a mixing chamber). These additives can comprise particles such as reinforcing particles (e.g., as described herein), hollow glass spheres, hollow elastomer spheres (e.g., hollow polyurethane spheres), a pigment, a metal, a filler such as a thermally conductive filler, a filler having a relative dielectric constant of at least 5, an ultraviolet stabilizer, a filler concentrate, or another suitable additive. Additional examples of additives include surfactants (e.g., silicone surfactants), catalysts, nucleation promotors, fillers for better abrasion resistance, chemical foaming agents, etc. Combinations of these and/or other additives are also possible. As a non-limiting example, a 3D printed closed-cell foam may be produced that incorporates particulate additives comprising a cellular network of cell walls separating empty cells, where the cell walls comprise a polymer composite including filler particles dispersed in a polymer matrix.

As a non-limiting example, hollow glass spheres or hollow elastomer spheres (e.g., hollow polyurethane spheres) may be incorporated into polyurethanes or other polymers as discussed herein to reduce density, increase stiffness, reduce dielectric constant, provide more nucleation sites for bubble formation, or the like. For instance, hollow spheres may be used to decrease weight. Hollow spheres, for example hollow glass spheres or hollow polymer spheres can be varied, e.g., spatially, in order to change the properties of the product. Other examples of particles (e.g., reinforcing particles) that can be used, e.g., in addition to and/or instead of hollow glass spheres include, but are not limited to, rubber particles and other particles described herein.

In one aspect, a foam may be printed (e.g., via 3D-printing) into a structure defining a plurality of cells, i.e., into a foam-like structure. Thus, a foam may be printed as part of a larger foam-like structure, e.g., where the walls of the foam-like structure (e.g., defining cells of the foam-like structure themselves) are foams having cells. The foam-like structure may have open cells, closed cells, or any combination of open and closed cells, independently of the structure of the foam itself forming the foam-like structure.

In one set of embodiments, one or more methods for manufacturing 3D-printed articles as described herein may be advantageous in comparison to other methods for making articles for use in footwear. For example, a footwear manufacturer employing a method as described herein may be able to use fewer processes to create the article than would be employed in other comparable processes (e.g., the manufacturer may use a three-dimensional printer (3D printer) in a single process to make a component that would otherwise be made by a combination of several processes such as injection molding, lamination, and the like). This may allow for more rapid and/or more facile manufacturing. As another example, one or more of the methods described herein may not necessarily require the use equipment that is expensive to manufacture and whose cost is typically recovered only after repeated use (e.g., molds). Some of the methods described herein may instead employ a 3D printer to create articles whose design can be modified as desired with little or no added cost. In some embodiments, it may be economical for methods as described herein to create small batches of 3D-printed articles (e.g., batches of less than 100, less than 50, or less than 10). It is thus possible for manufacturers may employ some of the methods described herein to respond to changing market conditions, to create articles for use in footwear that are designed for individual users or groups of users, etc. In some embodiments, it may be advantageous to use one or more of the methods described herein to fabricate a 3D-printed article at the point of sale and/or to avoid long distance shipping. Other examples may be seen in U.S. Pat. Apl. Ser. No. 62/464,364, entitled "Systems and Methods for Three-Dimensional Printing of Footwear and Other Articles," filed Feb. 27, 2017, incorporated herein by reference in its entirety.

Figure 14A:
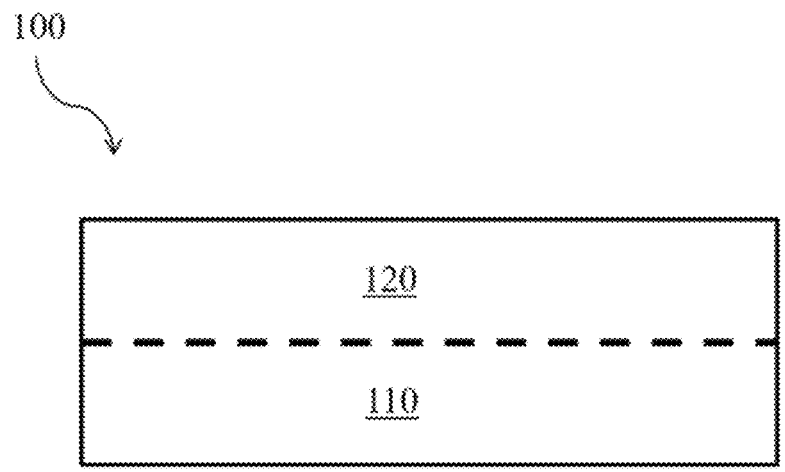
FIGS. 14A-14C illustrate 3D-printed articles according to certain embodiments of the invention.

A non-limiting example of a 3D-printed article for use in footwear is shown in FIG. 14A. In this figure, 3D-printed article 100 comprises first portion 110 and second portion 120. As used herein, a portion of an article may refer to any collection of points within the article (i.e., points that are within the portion of space bounded by the external surfaces of the article). Portions of the article are typically, but not always, volumes of space within the article (in some embodiments, a portion may be a surface within an article, a line within an article, or a point within an article). Portions of the article may be continuous (i.e., each point within the portion may be connected by a pathway that does not pass through any points external to the portion) or may be discontinuous (i.e., the portion may comprise at least one point that cannot be connected to at least one other point within the article by a pathway that does not pass through any points external to the portion). Portions of an article may be substantially homogeneous with respect to one or more properties (e.g., one or more properties of the portion may vary with a standard deviation of less than or equal to 1%, 2%, 5%, or 10% throughout the portion), and/or may be heterogeneous with respect to one or more properties (e.g., one or more properties of the portion may vary with a standard deviation of greater than or equal to 1%, 2%, 5%, or 10% throughout the portion).

In some embodiments, a 3D-printed article may comprise two or more portions, where one or more properties (e.g., average pore size, density, stiffness, stiffness of solid components of the article, Shore A hardness, degree of cross-linking, chemical composition, color, abrasion resistance, thermal conductivity, electrical conductivity, stiffness anisotropy, elastic modulus, flexural modulus, filler content, opacity, conductivity, breathability) of a first portion may differ from one or more properties of a second portion. In some embodiments, the difference in properties between the first portion and the second portion may comprise a gradient of the one or more properties (e.g., the property or properties may vary relatively smoothly from a first value in the first portion to a second value in the second portion). In other embodiments, there may be a sharp change in one or more of the properties at a boundary of one or more of the first portion and the second portion. Other examples include, but are not limited to, average largest dimension of particles (e.g., reinforcing particles), average concentration of particles (e.g., reinforcing particles), surface roughness, compression strength, slip resistance, or abrasion resistance.

It should be understood that while FIG. 14A shows the second portion positioned above the first portion, other arrangements of the first portion with respect to the second portion are also contemplated. For example, the first portion may be positioned beside the second portion, the first portion may surround the second portion, the first portion and the second portion may interpenetrate (e.g., a first portion may comprise a foam that interpenetrates with a second portion that comprises an elastomer), etc. It should also be noted that while FIG. 14A shows the second portion directly adjacent the first portion, this configuration should not be understood to be limiting. In some embodiments, the first portion may be separated from the second portion by one or more intervening portions positioned between the first portion and the second portion. As used herein, a portion that is positioned "between" two portions may be directly between the two portions such that no intervening portion is present, or an intervening portion may be present. Similarly, while FIG. 14A only depicts two portions, it should also be understood that an article may comprise three portions, four portions, or more portions. In some embodiments, portions within a 3D-printed article as described herein may also further comprise sub-portions. Each portion and/or sub-portion may differ from each other (sub-)portion in at least one way (e.g., any two (sub-)portions may comprise at least one property that is different), or one or more (sub-)portions may be substantially similar to other (sub-)portion(s) of the 3D-printed article. In some embodiments, a first portion and a second portion as described herein may be components of a 3D-printed article that is a single integrated material. As used herein, two or more portions that together form a single integrated material are not separated by a separable interface. In some embodiments, a single integrated material may not separate into discrete parts during the course of normal use, and/or may be separated into discrete parts whose morphologies would not be predictable prior to normal use and/or along interfaces that would not be predictable prior to normal use. For instance, a single integrated material may lack seams, lack an adhesive that bonds two or more portions together, and/or lack an interface at which one or more properties (e.g., average pore size, density, stiffness, stiffness of solid components of the article, Shore A hardness, degree of cross-linking, chemical composition, color, abrasion resistance, thermal conductivity, electrical conductivity, stiffness anisotropy, elastic modulus, flexural modulus, filler content, opacity, conductivity, breathability) undergo step changes.

In some embodiments, one or more portions may together form an 3D-printed article with one or more of the following features: macrovoids embedded within the article (e.g., a midsole) without an intersecting interface from overmolding, lamination, or ultrasonic welding; one or more open cell lattices; variations in density across geometries that would be challenging to form by molding; interpenetrating foams and elastomers that may, in some embodiments, not be separated by an interface due to molding or lamination; and/or one or more interfaces between different materials with extreme undercuts (e.g., materials with a negative draft angle, materials which cannot be injection molded using a single mold because they would be unable to slide out of the mold).

Figure 14B:
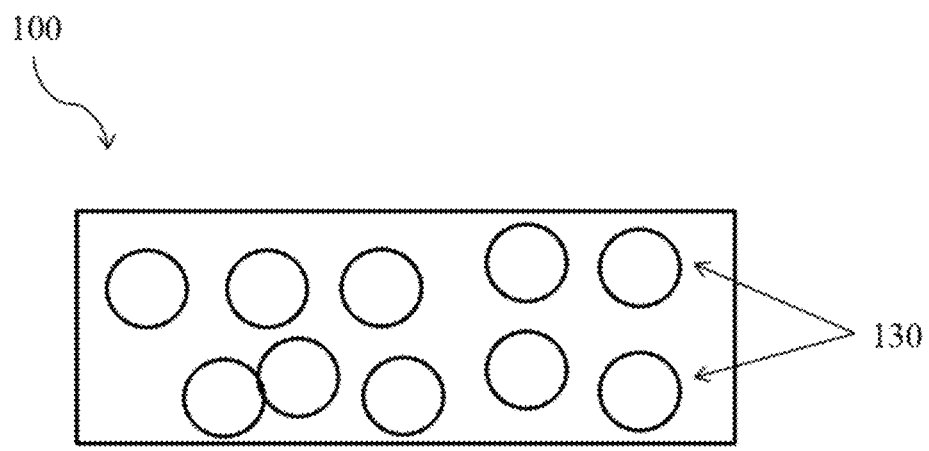

In some embodiments, a 3D-printed article (e.g., a 3D-printed article comprising two or more portions) may be a foam (e.g., a closed cell foam). For instance, FIG. 14B shows one non-limiting embodiment of a 3D-printed article 100 which is a foam comprising pores 130. The foam may be a material comprising a matrix and pores disposed within the matrix. Pores may be randomly distributed throughout the foam, or may be positioned at regular and/or predetermined intervals. The material present within the pores of a foam is typically of a different phase than the material forming the matrix of the foam (e.g., a foam may comprise pores that comprise gas within a matrix that comprises a liquid and/or a solid). As would be understood to one of ordinary skill in the art, in a closed-cell foam, the cells of the foam are typically isolated or separated from each other. By contrast, in an open-cell foam, the cells of the foam are interconnected with each other; for example, they may be formed in an interconnected fashion, or the cells may be ruptured or become interconnected during or after formation of the foam. These conditions are typically more violent foaming conditions than those resulting in a closed-cell foam. The foam may be formed from a variety of polymers and gases. The gases may be introduced into the foam during formation (e.g., physically), and/or generated during formation (e.g., via chemical reaction). In addition, in some cases, a gas may be introduced by providing a liquid that forms a gas, e.g., upon a decrease in pressure or an increase in temperature. For instance, a liquid such as butane may be kept under pressure and/or cooled prior to introduction into the nozzle or the mixing chamber; a change in temperature and/or pressure may cause the liquid to form a gas. Without wishing to be bound by theory, closed cell foams and open cell foams may have different properties (e.g., closed cell foams may have different values of density, stiffness, Shore A hardness, and the like than otherwise equivalent open cell foams) and may be suitable for different applications. In some embodiments, closed cell foams may have properties that are better suited to footwear applications than open cell foams. In some embodiments, a 3D-printed article or a portion thereof may comprise an enclosed open cell foam, or an open cell foam surrounded by a layer of continuous material. In some cases, an enclosed open cell foam may be suitable for use as an air cushion, and/or may have tactile properties that may be varied by varying infill density.

It should also be understood that certain 3D-printed articles described herein may not be foams (i.e., they may not include any pores). For instance, certain embodiments may relate to 3D-printed articles that are not foams and that comprise one or more elastomers. In addition, in some cases, an article may be printed that can then be formed into a foam, e.g., using a chemical reaction to produce a gas within the article.

Figure 14C:
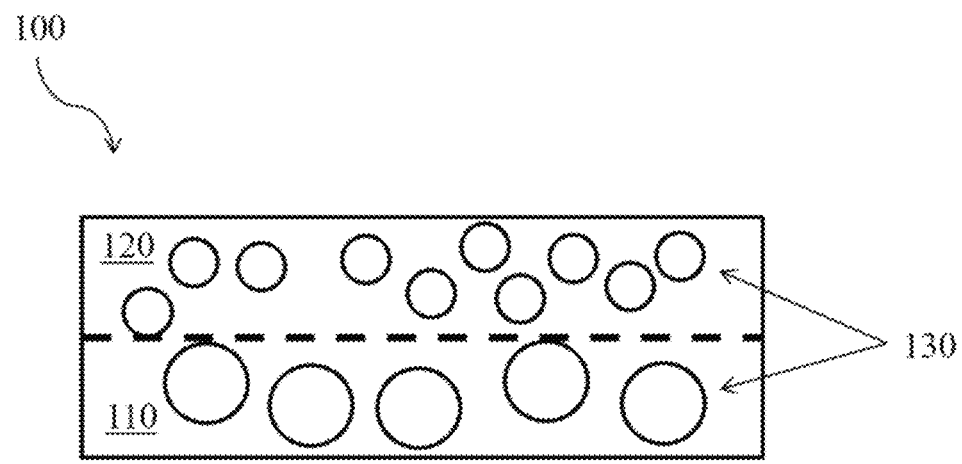

As shown in FIG. 14C, in some but not necessarily all embodiments, a 3D-printed article that is a foam (e.g., a closed-cell foam that is optionally a single integrated material) may comprise one or more portions having different properties. FIG. 14C shows 3D-printed article 100 comprising first portion 110, second portion 120, and pores 130. Although FIG. 14C depicts a 3D-printed article comprising an average pore (or cell) size in the first portion (i.e. a first average pore size) that is different from an average pore (or cell) size in the second portion (i.e., a second average pore size), in some embodiments the first portion and the second portion may have the same average pore size but may comprise differences in other properties (e.g., one or more of the density, stiffness, Shore A hardness, degree of cross-linking, chemical composition may be different in the first portion than in the second portion). Thus the pore sizes are presented here for illustrative portions only. Similarly, although FIG. 14C shows an average pore size in the first portion that is larger than the average pore size in the second portion, in some embodiments the average pore size of the first portion may be smaller than the average pore size of the second portion.

Figure 15:
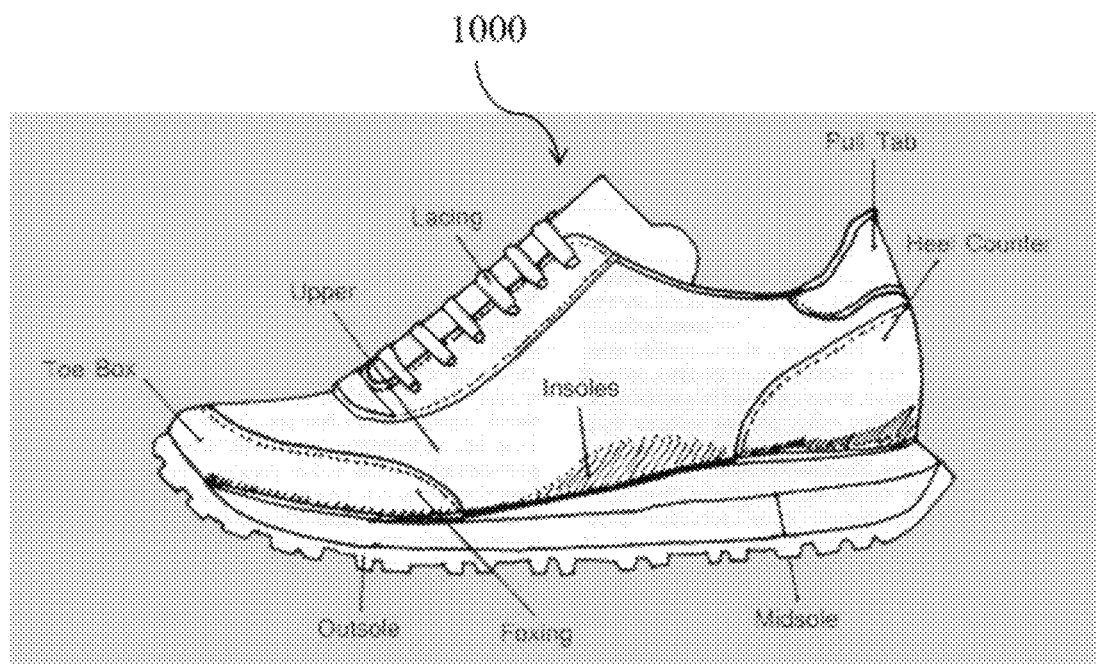
FIG. 15 illustrates an article of footwear according to certain embodiments of the invention.

In some embodiments, a 3D-printed article as designed herein may be suitable for use as a component of one or more articles of footwear. FIG. 15 shows one non-limiting embodiment of an article of footwear 1000. The article of footwear comprises a sole, a toe box, an upper; lacing, a heel counter, and a pull tab. It should be understood that 3D-printed articles suitable for use in footwear may form any of the components or be a portion of any or all of the components shown in FIG. 15. In some embodiments, multiple 3D-printed articles may be positioned on a single article of footwear (e.g., a single article of footwear may comprise a 3D-printed article that is disposed on a sole or is a sole and a 3D-printed article that is disposed on an upper). In some embodiments, the 3D-printed article may be a sole or a sole component, such as an outsole, a midsole, or an insole. In some embodiments, the 3D-printed article may be an article that is printed onto a sole component, such as a midsole and/or insole that is printed onto an outsole (e.g., a commercially available outsole, an outsole produced by a non-3D printing process). In some embodiments, the 3D-printed article may be an article that is printed onto an upper, such as a toe box, a heel counter, an ankle support, and/or a pull tab. The upper may be one component of a fully assembled shoe which lacks the part(s) to be printed, or it may be an upper that has not been assembled with other footwear components. In some embodiments, a 3D-printed article may be a combination of two or more footwear components that are typically provided as separate articles. For example, the 3D-printed article may be able to serve as both a midsole and an insole, or may comprise a midsole and an insole that are a single integrated material. As another example, the 3D-printed article may be able to serve as both an outsole and an insole, or may comprise an outsole and an insole that are a single integrated material. In some embodiments, a 3D-printed article comprising two or more footwear components (e.g., a 3D-printed article comprising a midsole and an insole, a 3D-printed article comprising an outsole and an insole) may be printed using a single integrated process. Although FIG. 15 shows an athletic shoe, 3D-printed articles suitable for use in other types of footwear are also contemplated as described in further detail below. In some embodiments, the 3D-printed article may also or instead be suitable for one or more non-footwear components, such as orthotics and/or prosthetics.

As described above, certain articles as described herein may be formed by a process involving one or more 3D-printing steps. In some embodiments, an article may be formed by a process involving both one or more 3D-printing steps and one or more non-3D-printing steps. For example, an article may be formed by a first 3D-printing step followed by a first non-3D-printing step which is optionally followed by one or more further 3D-printing steps or non-3D-printing steps. For example, a sole or sole component may be 3D-printed into a mold to form a first portion and then a material may be injection molded or compression molded above the first portion to form the second portion. Third, fourth, fifth, and/or higher numbered portions may then optionally be formed on the second portion (by, e.g., 3D-printing). As another example, a non-3D printing step may comprise directly bonding two materials by pressing a first material (e.g., a non-3D-printed material, an upper) into a second 3D-printed material (e.g., a 3D-printed midsole) prior to full curing of the second material. As a third example, an inkjet finishing process may be applied to deposit one or more materials (e.g., one more pigments) on a 3D-printed article or on a material disposed on a 3D-printed article (e.g., a material injection molded or compression molded on a 3D-printed article). In some embodiments, an inkjet finishing process may enhance the surface quality of the article that is subject to it.

In some cases, 3D-printed foams (e.g., closed-cell foams, open-cell foams, etc.) may be prepared as discussed herein using various inputs, as described herein. For instance, the foam density may be varied by varying the amount of added gas, the amount of added water (e.g., in water-blown foam applications), the amount of added chemical blowing agent, etc. As another example, the foam density constant may be held constant, but the cross-link density or isocyanate content may be varied to change properties such as the elasticity, elongation, or stiffness of the foam.

In some embodiments, one or more properties of a mixture that is 3D-printed from a nozzle may change as a function of time and/or nozzle position with respect to the substrate. For instance, the composition of one or more components and/or the wt % of one or more components within the mixture may change as a function of time. In some embodiments, one or more physical parameters of the nozzle and/or the substrate may change as a function of time. As an example, the temperature of the nozzle and/or the substrate may change as a function of time. Without wishing to be bound by theory, the temperature of the nozzle and the temperature of the substrate may affect the types of reactions that occur between various components (e.g., cross-linking reactions, foaming reactions, reactions within the nozzle, reactions on the substrate) and/or the rates at which these reactions occur. This may in turn affect the chemical structure of the mixture (e.g., the composition of the mixture, the degree of cross-linking of the resultant foam) during and/or after printing, and/or affect one or more physical properties of the mixture (e.g., the viscosity of the mixture, the average pore size of the resultant foam, the density of the resultant foam, the stiffness of the resultant foam, the Shore A hardness of the resultant foam) during and/or after printing. In some embodiments, changes in substrate or nozzle temperature during printing may allow for different portions of the 3D-printed article (e.g., those printed at different times and/or in different positions on the substrate) to have different chemical or physical properties. In some embodiments, the portions with different chemical and/or physical properties may be printed in a single continuous process, and/or may together form a single integrated material.

In some cases, as discussed herein, a foam precursor, prior to curing, may have different rheological properties than the starting raw materials without gas content. For example, a mixture of low viscosity fluids, gases, and/or surfactants, etc. having Newtonian flow behavior before foaming can be used to produce a precursor having non-Newtonian flow characteristics, e.g., with a yield stress, or shear-thickening or shear-thinning behavior. This may be used herein to produce a precursor having a rheological profile suitable for printing, e.g., on a substrate. Fluids such as incompressible Newtonian fluids or gases can be controlled introduced into a nozzle (e.g., prior to mixing) and precisely metered onto a substrate during deposition. In some cases, the foaming process may start within the nozzle, and controlled to control deposition of the precursor and/or the final mechanical properties of the foam.

U.S. Pat. Apl. Ser. Nos. 62/464,363 and 62/464,364 are each incorporated herein by reference in its entirety.

The following examples are intended to illustrate certain embodiments of the present invention, but do not exemplify the full scope of the invention.

Example 1

Water-blown polyurethane foam. A mixing nozzle was configured to have two inputs: Input A for an isocyanate pre-polymer, and Input B for a mixture of polyols, surfactants, and water. When the two inputs were combined in the mixing chamber, the water and polyols reacted with the isocyanate to form a polyurethane matrix with a higher number-average molecular weight than the polyols and carbon dioxide that became trapped in the polyurethane matrix to form a foam. Inputs A and B were as follows:

| Component | Description | Amount (g) |
|---|---|---|
| Input A: (one or more of the following components flowed into the mixing nozzle) | | |
| Polytech 20-A | Isocyanate prepolymer | 150 |
| BJB enterprises f-115-a | Isocyanate prepolymer | 150 |
| Polytech F-3 - A | Isocyanate prepolymer | 110 |
| Polyfiber II | Polyethylene fiber (rheological modifier) | 40 |
| Input B: (one or more of the following components flowed into the mixing nozzle, in addition to water) | | |
| Polytech 20-B | Polyol blend for elastomer | 150 |
| BJB enterprises F-115-B | Polyol blend for soft elastomer | 150 |
| Polytech F-3-B | Polyol, water, surfactant blend for foam promotion | 220 |
| 3M S32 glass bubbles | Foam stabilizer and bubble nucleation site | 42 |
| Polyfiber II | Polyethylene fiber (rheological modifier) | 40 |
| Polytech White | White Pigment | 16 |
| Poly UV | UV stabilizer | 3.38 |
| Evonik Tegostab B 8952 | Silicone surfactant for foam stabilizing | 10 |
| Polytek 74/75 part X accelerator | Organometallic catalyst | 15.2 |

Figure 7:
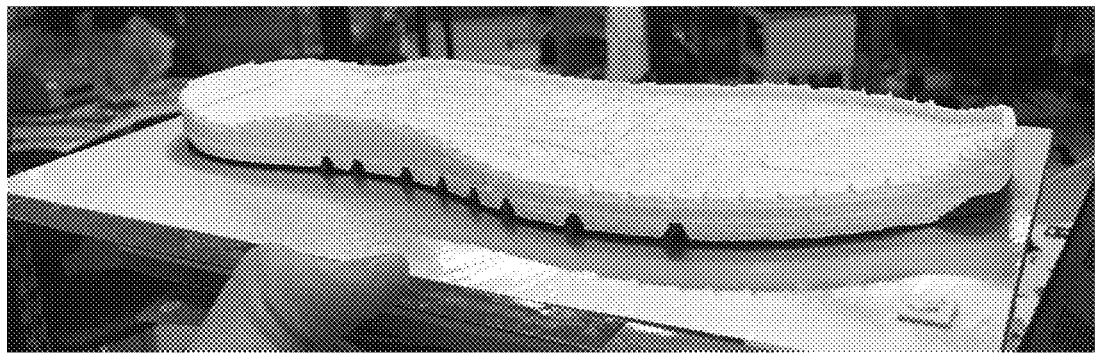
FIG. 7 illustrates a water-blown polyurethane foam in the form of a shoe sole, in one embodiment of the invention.

Such a water-blown polyurethane foam (white, top portion) was co-printed with a non-foaming two-part polyurethane elastomer (blue, bottom portion) to form a shoe sole, as is shown in FIG. 7.

Figure 8:
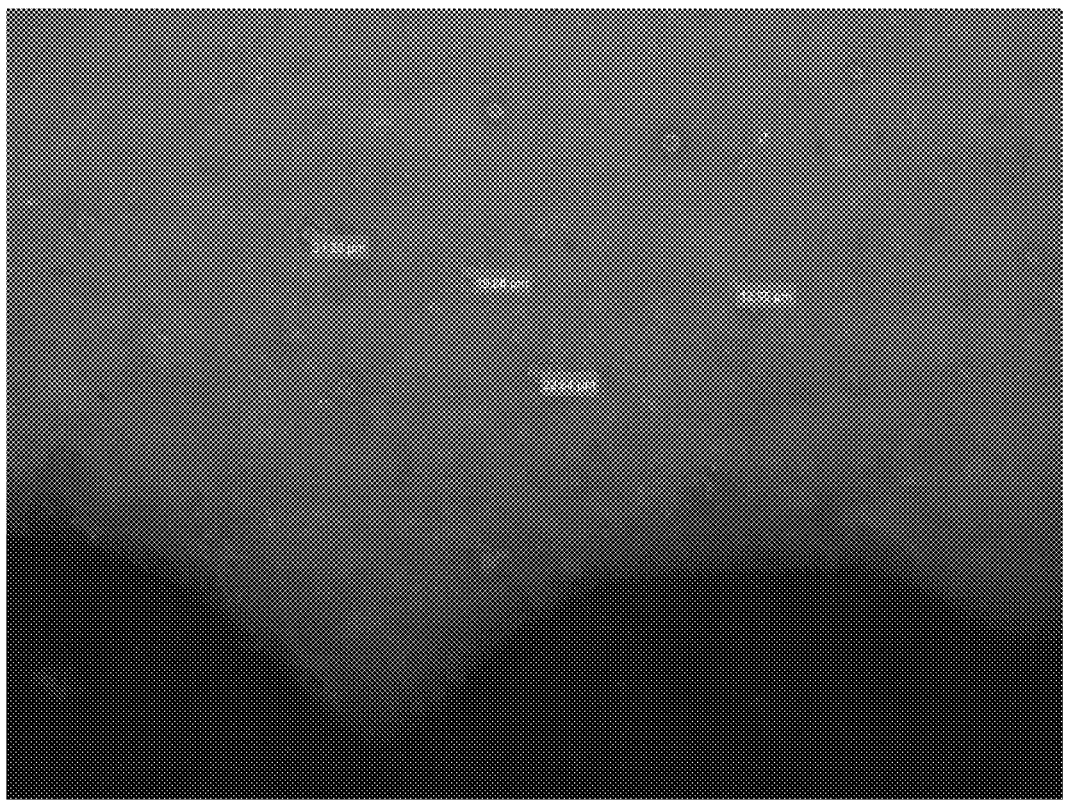
FIG. 8 illustrates a light microscopy image of a cross-section of a 3D-printed filament, in accordance with another embodiment of the invention.

A mean pore size of the foam was characterized by slicing through a 3D-printed filament to obtain a cross-section of the foam and then imaging the cross-section with a light microscope and using image analysis (depicted in FIG. 8 with circles and measurements in microns).

Example 2

Figure 9:
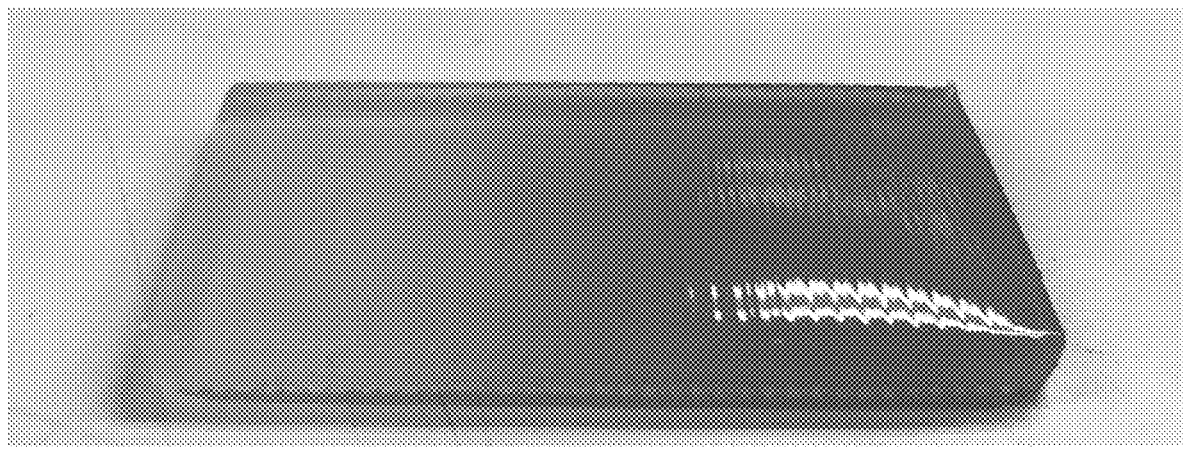
FIG. 9 illustrates an article with a gradient in properties, in yet another embodiment of the invention.

Silicone gradient material. A coupon with a gradient in both stiffness and color was fabricated using a two-input mixing nozzle system, as shown in FIG. 9. The clear-colored silicone (left) was a soft elastomer with a Shore hardness of 10A. The blue colored silicone (right) was a medium hard elastomer with a Shore hardness of 70A. In this example, parts A and B were mixed together to make a precursor to the soft elastomer (Input 1), and parts A' and B' were mixed together to make a precursor to the hard elastomer (Input 2) prior to injecting into the mixing chamber. The coupon was printed with each layer as a single meandering print path where the beginning of the print path (left-most position in FIG. 9) was 100% A and B (e.g. 100% Input 1), and the end of the print path (right-most position in FIG. 9) was 100% A' and B' (e.g. 100% Input 2). The volume ratio of Input 1 to Input 2 was varied continuously from one side of the 3D-printed coupon to the other.

The inputs were as follows:

| Component | Description | Amount (g) |
| --- | --- | --- |
| Input 1, A and B: (two or more of the following components flowed into the mixing nozzle) | | |
| Blue star LSR 4301 A | Part A soft platinum cure silicone elastomer | 74 |
| Blue star LSR 4301 B | Part B soft platinum cure silicone elastomer | 74 |
| Aerosil 300 | Fumed silica (rheological modifier) | 8.9 |
| Input 2, A' and B': (two or more of the following components flowed into the mixing nozzle) | | |
| Quantumn Silicones 229 LV-A | Part A' 60A platinum cure silicone gel | 25.5 |
| Quantumn Silicones 229 LV-B | Part B' 60A platinum cure silicone gel | 25.5 |
| Blue Star LSR 4350 A | Part A' 50A platinum cure silicone elastomer | 8.5 |
| Blue Star LSR 4350 B | Part B' 50A platinum cure silicone elastomer | 8.5 |
| Blue Star LSR 4301 A | Part A' 1A platinum cure silicone elastomer | 10.5 |
| Blue Star LSR 4301 B | Part B' 1A platinum cure silicone elastomer | 10.5 |
| Smooth-on Silc-Pig Blue | Blue pigment | 0.03 |
| Aerosil 300 | Fumed Silica (Rheological modifier) | 6.775 |

Example 3

Mixing cells into a hydrogel. A hydrogel structure is formed using the mixing system. A first input to the mixing nozzle comprises a cross-linking agent for the hydrogel, and a second input to the mixing nozzle comprises an uncross-linked hydrogel precursor. Additional inputs into the mixing nozzle include concentrated cell suspensions of various types, different types of cell media, and concentrates of cell growth factors and chemical signaling agents.

Example 4

Printing a rigid epoxy foam. A mixing nozzle comprises a mixing/frothing chamber and at least three inputs. A first input is a gas such as nitrogen or air. A second input is a bisphenol-A-based resin such as Epon® Resin 828, with an added surfactant that stabilizes bubbles. A third input is a curing agent for epoxy resin such as a diamine like ethylenediamine. The second and third input are added to the mixing chamber to induce the epoxy resin to cross-link into a solid thermoset. The gas input flowrate can be varied along with the impeller speed to create a rigid thermosetting foam with variable dielectric properties due to air content.

Example 5

Mixing therapeutics into a biodegradable matrix material. A multi-input system can be used for creating a therapeutic-impregnated matrix of material such as a pill. Inputs include: a solution of a biodegradable polymer with a high degradation rate; a solution of a biodegradable polymer with a low degradation rate; a solution of a first active therapeutic agent; a solution of a second active therapeutic agent; a sugar or flow inducing agent; or another suitable input.

A pill-like architecture can then be 3D-printed, wherein the composition of the pill can be varied spatially. For example, the external part of the pill could be 3D-printed to contain a first therapeutic agent, and the material printed has a fast degradation profile for a quick release of the first therapeutic agent. Then the internal part of the pill may be printed with a material that degrades slowly, and may contain two different types of therapeutic agents. The external surface of the pill may have a printed inert sugar coating so that no therapeutic release occurs until the pill has passed through the esophagus. This allows the possibility of combining many pills into one. By this process, a 3D-printed pill can have a customized therapeutic release profile that is specific to a patient.

The same methodology to 3D-print pills can be applied to 3D-printed implantable long-term therapeutic release depots. For example, this 3D-printing methodology can be applied towards fabricating a skin tissue graft, wherein drugs, growth factors, antibiotics, and cells can be printed with variable spatial concentration to promote the regrowth of a skin defect such as a severe burn. Printing an implantable therapeutic depot may involve an input that induces polymerization or cross-linking.

Example 6

Printing a rigid epoxy foam: printing a stimuli-responsive structure from a reactive polyurethane system. A system comprising at least four inputs may be used to 3D-print a stimuli-responsive structure, the inputs comprising: an isocyanate cross-linking agent; a polyol mixture wherein the components have low stiffness; a polyol mixture wherein the components have high stiffness; and a chemical blowing agent concentrate dissolved in polyol.

Figure 10:
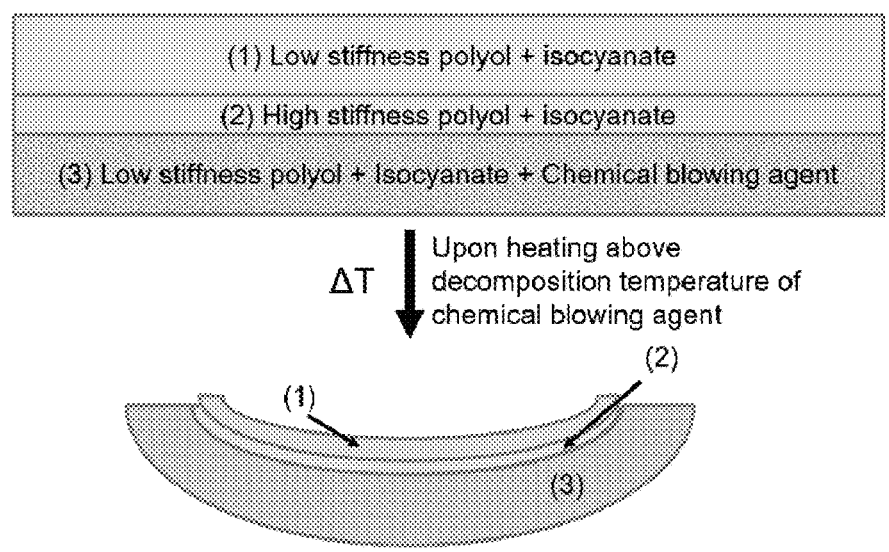
FIG. 10 illustrates a 3D-printed stimuli-responsive trilayer polyurethane system in accordance with another embodiment of the invention.

For example, a tri-layer architecture can be 3D-printed to accomplish the stimuli-responsive property. As shown in FIG. 10, the top layer (1) forms a low-stiffness/high-flexibility elastomer from inputs comprising a low-stiffness polyol mixture and an isocyanate. The middle layer (2) in FIG. 10 forms a high-stiffness elastomer from inputs comprising a high stiffness polyol mixture and an isocyanate. Layer (2) functions as a strain-limiting layer. The bottom layer (3) in FIG. 10 initially forms an elastomer with similar properties to the top layer after printing and partial curing, and is formed from inputs comprising a high flexibility polyol mixture, an isocyanate, and a chemical blowing agent. After the entire structure is printed and partially cured, the structure can be heated above the decomposition temperature of the chemical blowing agent. This causes the bottom layer (3) to expand into a foam. However, since layer (3) is chemically and physically bonded to the middle strain-limiting layer (2) that has higher stiffness, the bottom layer (3) will generally expand, but will expand to a lesser extent at the interface of the strain-limiting material. This differential strain will cause the entire structure to curl. Thus, FIG. 10 illustrates a 3D-printed stimuli-responsive tri-layer polyurethane system, where heating results in curling of the tri-layer structure (Example 6)

The expansion of the bottom material upon decomposition of the chemical blowing agent, coupled with the strong interface with the strain-limiting layer, causes a physical curling of the whole tri-layer structure. Selective placement of the expandable material containing the blowing agent can be utilized to programmatically define deformations in printed parts that will not occur until after the part is printed and heated.

Example 7

This example illustrates the formulation and printing of an outsole material. First, a polyol concentrate was made by mixing the ingredients at the prescribed ratio (Part B Fluid) using a planetary centrifugal mixer. Next, the fillers (Outsole Formulation, Part B) were added to the polyol concentrate and mixed with a planetary centrifugal mixer under vacuum. Finally, the Part B mixture was loaded into a syringe, and used to feed into one side of the active mixing head. The same protocol was done for Part A in a separate container.

Part B Fluid: Polyol Concentrate:

| Component | Amount (g) |
| --- | --- |
| 1,4-Butane diol | 13 (13 wt %) |
| Carpol PGP-2012 -> polyether diol with ethylene oxide cap 2000 Molecular weight Hydroxyl number 56 | 40 (40 wt %) |
| Carpol GP-725 -> Polyether triol with ethylene oxide cap 700 Molecular weight Hydroxyl number 240 | 25 (25 wt %) |
| Carpol GP-6015 -> polyether triol with ethylene oxide cap 6000 molecular weight Hydroxyl number 28 | 22 (22 wt %) |
| molecular sieve/microdessicant | 5 (5 parts per hundred resin) |
| bismuth based organometallic complex (K-KAT XK-618) | 1 |

Part A Fluid: Isocyanate Prepolymer:

BASF Lupranate 5030—polyester and MDI quasi prepolymer with NCO content of 18.9%

Outsole Formulation:

| Component | Description | Amount (g) |
| --- | --- | --- |
| isocyanate prepolymer | Part A | 15 |
| fumed silica | Part A; filler | 0.6 |
| polyol concentrate | Part B | 15 |
| fumed silica | Part B; filler, with PDMS coating | 0.45 |
| ground tire rubber | Part B; filler, with particles size 180 microns | 10 |
| chopped glass fiber | Part B; filler; 1/32 inches long with amino silane coating | 3 |
| silicone oil | Part B; filler; with viscosity of 60,000 cP | 0.45 |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A 3D-printed article for use in footwear, comprising:
a 3D-printed article having a gradient in volume percent of particles between a first portion and a second portion, wherein the 3D-printed article is a single integrated material, and wherein the material comprises polyurethane and/or polyurea.

2. The article of claim 1, wherein the article is adhered to a textile.

3. The article of claim 1, wherein the article is a component of a shoe upper.

4. An article comprising:
a polymeric structure;
particles distributed in the polymeric structure to form a gradient of the weight percent of particles in the polymeric structure; and
a textile adhered to the polymeric structure, wherein the polymeric structure comprises polyurethane and/or polyurea.

5. The article of claim 1, wherein the particles comprise hollow particles with a substantially spherical shape.

6. The article of claim 1, wherein the particles comprise fumed silica.

7. The article of claim 1 wherein the article has at least a 10% change in tensile elastic modulus over a distance of greater than 5 mm.

8. The article of claim 1 wherein the article has at least a 10% change in Shore A hardness over a distance of greater than 5 mm.

9. The article of claim 1 wherein the particles comprise recycled tire rubber.

10. The article of claim 1 wherein the particles are a reflective glass with a substantially spherical shape.

11. The article of claim 1 wherein the article is a component of a shoe outsole.

12. The article of claim 1 wherein the particles are substantially rod shaped.

13. The article of claim 4 wherein the article is a component of an article of apparel.

14. The article of claim 1 wherein the article has at least a 50% change in tensile elastic modulus over a distance less than 20 mm.

15. The article of claim 1 wherein the article has at least a 50% change in tensile elastic modulus over a distance of less than 75 mm, but does not change at a rate greater than 20% change in tensile elastic modulus over a distance of less than 4 mm.

16. The article of claim 4, wherein the article is a component of a bra.

17. The article of claim 2 wherein the article is attached to the textile without the use of an adhesive.

18. The article of claim 1 wherein the article has at least a 10 volume percentage change in particle concentration between the first and second portions.

19. The article of claim 1, wherein the particles are reinforcing particles.

20. The article of claim 4, wherein the particles are reinforcing particles.

* * * * *

UNITED STATES PATENT AND TRADEMARK OFFICE
CERTIFICATE OF CORRECTION

| | |
|---|---|
| PATENT NO. | : 11,497,275 B2 |
| APPLICATION NO. | : 15/907100 |
| DATED | : November 15, 2022 |
| INVENTOR(S) | : Travis Alexander Busbee et al. |

It is certified that error appears in the above-identified patent and that said Letters Patent is hereby corrected as shown below:

On the Title Page

Item (60) Related U.S. Application Data:
Line 1, "62/555,930" should be changed to --62/555,941--
Line 3, "62/555,930" should be changed to --62/555,886--
Line 5, "62/555,930" should be changed to --62/555,874--

Signed and Sealed this
Eighteenth Day of April, 2023

Katherine Kelly Vidal
*Director of the United States Patent and Trademark Office*